United States Patent
Lee et al.

(10) Patent No.: US 10,649,894 B2
(45) Date of Patent: *May 12, 2020

(54) NONVOLATILE MEMORY MODULE AND OPERATION METHOD THEREOF

(71) Applicant: SAMSUNG ELECTRONICS CO., LTD., Suwon-si, Gyeonggi-do (KR)

(72) Inventors: Han-Ju Lee, Hwaseong-si (KR); Youngjin Cho, Seoul (KR); Sungyong Seo, Seongnam-si (KR); Youngkwang Yoo, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,533

(22) Filed: Nov. 19, 2018

(65) Prior Publication Data

US 2019/0354474 A1 Nov. 21, 2019

Related U.S. Application Data

(63) Continuation of application No. 15/083,425, filed on Mar. 29, 2016, now Pat. No. 10,152,413.

(30) Foreign Application Priority Data

Jun. 8, 2015 (KR) .................. 10-2015-0080731
Jun. 8, 2015 (KR) .................. 10-2015-0080748
Jun. 26, 2015 (KR) .................. 10-2015-0091083

(51) Int. Cl.
*G06F 12/02* (2006.01)
*G06F 13/42* (2006.01)
(Continued)

(52) U.S. Cl.
CPC .......... *G06F 12/0246* (2013.01); *G06F 3/061* (2013.01); *G06F 3/0653* (2013.01);
(Continued)

(58) Field of Classification Search
CPC .......... G06F 12/02; G06F 13/42; G06F 12/06; G06F 2212/205; G06F 12/0246;
(Continued)

(56) References Cited

U.S. PATENT DOCUMENTS 5,966,727 A 10/1999 Nishino
7,679,133 B2 3/2010 Son et al.
(Continued)

FOREIGN PATENT DOCUMENTS

JP 3761635 B1 1/2006
JP 2015-038761 A 2/2015
(Continued)

OTHER PUBLICATIONS

DDR4 SDRAM Load Reduced DIMM Design Specification, JEDEC Standard No. 21C, Sep. 2014.

*Primary Examiner* — Steven G Snyder
*Assistant Examiner* — Christopher Daley
(74) *Attorney, Agent, or Firm* — Volentine, Whitt & Francos, PLLC

(57) ABSTRACT

The nonvolatile memory module includes at least one nonvolatile memory device and a device controller configured to receive a storage command from an external device and to perform an operation corresponding to the received storage command. The device controller includes a random access memory (RAM). After completing the corresponding operation, the device controller stores status information in the RAM and then transmits an alert signal to the external device.

20 Claims, 48 Drawing Sheets

(51) Int. Cl.
*G06F 12/06* (2006.01)
*G06F 13/16* (2006.01)
*G06F 3/06* (2006.01)

(52) U.S. Cl.
CPC ........ *G06F 3/0679* (2013.01); *G06F 12/0638* (2013.01); *G06F 13/1673* (2013.01); *G06F 13/4282* (2013.01); *G06F 2212/205* (2013.01); *G06F 2212/7203* (2013.01); *G06F 2212/7208* (2013.01)

(58) Field of Classification Search
CPC .. G06F 12/0638; G06F 3/0679; G06F 3/0653; G06F 3/061; G06F 2212/7208; G06F 2212/7203
See application file for complete search history.

(56) References Cited

U.S. PATENT DOCUMENTS

| | | | |
|---|---|---|---|
| 7,818,478 B2 | 10/2010 | Schroth | |
| 8,312,189 B2 * | 11/2012 | Casper | G06F 13/385 710/3 |
| 8,356,151 B2 | 1/2013 | Arimilli et al. | |
| 8,452,912 B2 | 5/2013 | Lee et al. | |
| 8,553,466 B2 | 10/2013 | Han et al. | |
| 8,559,235 B2 | 10/2013 | Yoon et al. | |
| 8,578,110 B2 | 11/2013 | Fukazawa et al. | |
| 8,606,987 B2 * | 12/2013 | Yang | G06F 12/0246 711/103 |
| 8,654,587 B2 | 2/2014 | Yoon et al. | |
| 8,713,379 B2 | 4/2014 | Takefman et al. | |
| 8,874,831 B2 | 10/2014 | Lee et al. | |
| 8,949,502 B2 | 2/2015 | McKnight et al. | |
| 8,990,488 B2 | 3/2015 | Haywood | |
| 9,430,411 B2 | 8/2016 | Lin et al. | |
| 2010/0205517 A1 | 8/2010 | Lee et al. | |
| 2010/0241793 A1 | 9/2010 | Sugimoto et al. | |
| 2011/0058440 A1 | 3/2011 | Smith et al. | |
| 2011/0233648 A1 | 9/2011 | Seol et al. | |
| 2012/0079171 A1 * | 3/2012 | Ju | G06F 12/0246 711/103 |
| 2012/0102263 A1 | 4/2012 | Aswadhati | |
| 2013/0275665 A1 | 10/2013 | Saraswat et al. | |
| 2014/0122777 A1 | 5/2014 | Oh et al. | |
| 2014/0195480 A1 | 7/2014 | Talagala et al. | |
| 2014/0237205 A1 | 8/2014 | Takefman et al. | |
| 2014/0297919 A1 | 10/2014 | Nachimuthu et al. | |
| 2014/0304475 A1 | 10/2014 | Ramanujan et al. | |
| 2014/0372667 A1 | 12/2014 | Tan et al. | |
| 2015/0039909 A1 | 2/2015 | Tseng et al. | |
| 2015/0046625 A1 | 2/2015 | Peddle et al. | |
| 2015/0095741 A1 | 4/2015 | Lin et al. | |
| 2015/0106556 A1 | 4/2015 | Yu et al. | |
| 2015/0106557 A1 | 4/2015 | Yu et al. | |
| 2015/0106660 A1 | 4/2015 | Chumbalkar et al. | |
| 2015/0113353 A1 | 4/2015 | Tseng | |
| 2015/0134884 A1 | 5/2015 | Lin et al. | |
| 2015/0248935 A1 | 9/2015 | Moshayedi et al. | |

FOREIGN PATENT DOCUMENTS

| | | |
|---|---|---|
| KR | 10-2012-0093869 A | 8/2012 |
| WO | WO 2009/130848 A1 | 10/2009 |

* cited by examiner

NONVOLATILE MEMORY MODULE AND OPERATION METHOD THEREOF

CROSS-REFERENCE TO RELATED APPLICATIONS

This is a Continuation of U.S. application Ser. No. 15/083,425, filed Mar. 29, 2016, in which a claim for priority under 35 U.S.C. § 119 is made to Korean Patent Applications No. 10-2015-0091083 filed Jun. 26, 2015, No. 10-2015-0080748 filed Jun. 8, 2015, and No. 10-2015-0080731 filed Jun. 8, 2015, in the Korean Intellectual Property Office, the entire contents of which are hereby incorporated by reference.

BACKGROUND

The inventive concept described herein relates to a semiconductor memory, and more particularly, relates to a nonvolatile memory module and an operating method thereof.

A semiconductor memory refers to a memory device that is implemented using a semiconductor material such as silicon (Si), germanium (Ge), gallium arsenide (GaAs), indium phosphide (InP), or the like. Semiconductor memory devices are generally divided into two types including a volatile memory device and a nonvolatile memory device.

As a type of nonvolatile memory device, a flash memory is widely used as a storage device in view of advantages such as large capacity, low noise, low power, and the like. In particular, a solid state drive (SSD) which is based on a flash memory is used as mass storage in a personal computer, a notebook, a workstation, a server system, and the like. Typical SSD devices are connected with a computing system based on a Serial Advanced Technology Attachment (Serial ATA or SATA) interface or a Peripheral Component Interconnect Express (PCI-express) interface. However, as the amount of data processed on a computing system increases, data throughput becomes greater than the data bandwidth or communication speed of an interface connected with the SSD devices, thereby causing a data bottleneck. Since the data bottleneck causes a decrease in the performance of the computing system, various techniques are being developed to improve the performance.

SUMMARY

Embodiments of the inventive concept may provide a nonvolatile memory module with improved performance and an operating method thereof.

According to an embodiment of the inventive concept, a nonvolatile memory module may be provided. The nonvolatile memory module may include at least one nonvolatile memory device, and a device controller configured to receive a storage command from an external device and to perform an operation corresponding to the received storage command. The device controller may include a random access memory (RAM), and after completing the corresponding operation, the device controller may store status information in the RAM and may then transmit an alert signal to the external device.

The status information may include information about a completion of the corresponding operation.

After transmitting the alert signal to the external device, the device controller may transmit the status information to the external device in response to a request of the external device.

The device controller may communicate with the external device based on a double data rate (DDR) interface.

According to an embodiment of the inventive concept, an operating method of a nonvolatile memory module which comprises at least one nonvolatile memory device and a memory controller controlling the at least one nonvolatile memory device may be provided. The method may include receiving a storage command from an external device, performing an operation corresponding to the received storage command, storing status information in a RAM of the memory controller after the corresponding operation is completed, and transmitting an alert signal to the external device after the status information is stored in the RAM.

According to an embodiment of the inventive concept, a user system may include a processor and a nonvolatile memory module electrically connected to the processor.

An operating method of the user system may include transmitting a storage command to the nonvolatile memory module by the processor, performing an operation corresponding to the storage command in response to the storage command through the nonvolatile memory module, transmitting an alert signal to the processor, by the nonvolatile memory module, after the corresponding operation is completed, transmitting a RAM command and a RAM address to the nonvolatile memory system, by the processor, in response to the alert signal, and transmitting status information to the processor, by the nonvolatile memory module, in response to the RAM command and the RAM address.

According to an embodiment of the inventive concept, a nonvolatile memory module may include a plurality of nonvolatile memory devices, and a storage controller configured to receive a storage command from an external device and to control the nonvolatile memory devices in response to the received storage command. The storage controller may include an error correction code (ECC) engine configured to detect and correct an error of the received storage command. In the case where the error of the storage command is detected by the ECC engine, the storage controller may transmit an alert signal to the external device.

In the case where the error is not detected or is corrected, the storage controller may perform an operation corresponding to the storage command.

The storage controller may receive a RAM command, a RAM address, and a clock from the external device and may receive a storage command from the external device based on the received RAM address and the received clock.

The storage controller may further include a RAM, and the storage controller may store the received command in the RAM based on the received RAM command, the received RAM address, and the received clock.

The ECC engine may detect and correct an error of a storage command stored in the RAM.

The ECC engine may detect and correct an error of the storage command based on an error correction code corresponding to the storage command provided from the external device.

The storage controller may further include a multi-purpose register. If the error is detected or is not corrected, the storage controller may write ECC information about the error in the multi-purpose register.

After transmitting the alert signal to the external device, the storage controller may transmit the ECC information written in the multi-purpose register to the external device under control of the external device.

After transmitting the alert signal to the external device, the storage controller may transmit the ECC information written in the multi-purpose register to the external device through a serial bus under control of the external device.

The storage controller and the external device may communicate with each other based on a DDR interface.

The storage controller may further receive write data from the external device, and the ECC engine may detect and correct an error of the write data. If an error of the write data is not detected or corrected, the storage controller may transmit an alert signal to the external device.

At least one of the nonvolatile memory devices may include a three-dimensional memory array.

According to an embodiment of the inventive concept, an operating method of a nonvolatile memory module which includes at least one nonvolatile memory device, and a storage controller controlling the at least one nonvolatile memory device may be provided. The operating method may include receiving a storage command from an external device, detecting and correcting an error of the received storage command through an error correction code (ECC) engine, and performing an operation corresponding to the storage command if an error of the storage command is not detected and transmitting an alert signal to the external device if an error of the storage command is detected.

The receiving of the storage command may include receiving a RAM command, a RAM address, and a clock from the external device, and storing a storage command received from the external device in a RAM included in the storage controller in response to the RAM command, the RAM address, and the clock.

The detecting and correcting may include detecting and correcting an error of the received storage command based on an error correction code provided from the external device.

The nonvolatile memory module and the external device may communicate with each other based on a DDR interface.

According to an embodiment of the inventive concept, an operating method of a user system which includes a processor and a nonvolatile memory module electrically connected to the processor may include transmitting, by the processor, a storage command to the nonvolatile memory module, transmitting, by the nonvolatile memory module, an alert signal to the processor if the error is detected, and resending, by the processor, the storage command to the nonvolatile memory module in response to the alert signal.

The transmitting of the storage command may include transmitting, by the processor, a RAM command, a RAM address, and a clock to the nonvolatile memory module, and transmitting, by the processor, a data signal and a data strobe signal, in which the storage command is included, to the nonvolatile memory module.

According to an embodiment of the inventive concept, a nonvolatile memory module may include a plurality of nonvolatile memory devices, a buffer memory configured to store data for controlling the nonvolatile memory devices, and a device controller configured to control the nonvolatile memory devices based on the data of the buffer memory, to receive an activated save signal from an external processor, to flush the data of the buffer memory onto the nonvolatile memory devices in response to the activated save signal, and to inactivate the save signal after flushing of the data of the buffer memory is completed.

The external processor and the nonvolatile memory system may communicate with each other based on a predetermined interface.

The predetermined interface may be a double data rate (DDR) interface.

The nonvolatile memory module may be a dual in-line memory module (DIMM).

The device controller may include a RAM configured to store a storage command, a storage address, and write data received from the external processor, and a RAM controller configured to control the RAM based on the RAM command, the RAM address, and the clock from the external processor.

The device controller may further include a controller configured to control the nonvolatile memory devices based on the storage command and the storage address stored in the RAM.

The device controller may include a save signal driver configured to operate in response to the activated save signal.

While the flushing is performed, the device controller may control the save signal driver such that the save signal maintains an active state.

The save signal driver may include a first control transistor including a first electrode receiving the save signal, a second electrode connected with a ground terminal, and a control electrode receiving a control signal.

While the flushing is performed, the device controller may control the control signal such that the first control transistor maintains a turn-on state, and after the flushing is completed, the device controller may control the control signal such that the first control transistor is turned off.

The nonvolatile memory module may further include an auxiliary power device configured to supply an auxiliary power to the nonvolatile memory devices, the buffer memory, and the device controller during the flushing.

The nonvolatile memory module may further include a serial presence detect chip (SPD) including device information about the nonvolatile memory module.

The serial presence detect chip may transmit the device information to the external processor in response to a request of the external processor.

The serial presence detect chip may transmit the device information to the external processor based on an I2C communication.

The nonvolatile memory module may further include a data buffer circuit transmitting and receiving a data signal and a data strobe signal to and from the device controller or the external processor.

The device controller may control the data buffer circuit.

At least one of the nonvolatile memory devices may include a three-dimensional memory array which includes a plurality of memory cells each having a charge trap layer.

According to an embodiment of the inventive concept, a nonvolatile memory module may include a plurality of nonvolatile memory devices, a buffer memory configured to store data for managing the nonvolatile memory devices, and a device controller configured to control the nonvolatile memory devices based on the data of the buffer memory. An operating method of the nonvolatile memory module may include receiving an activated save signal from an external processor, flushing the data of the buffer memory onto the nonvolatile memory devices in response to the activated save signal, and inactivating the save signal after flushing of the data of the buffer memory is completed.

The nonvolatile memory module and the external processor may communicate with each other based on a DDR interface.

The flushing of the data of the buffer memory may include maintaining an active state of the save signal while the flushing is performed.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Below, embodiments of the inventive concept will be described with reference to accompanying drawings to describe the embodiments of the inventive concept in detail to the extent that one skilled in the art can implement the scope and spirit of the inventive concept.

A nonvolatile memory system according to the inventive concept may provide an alert signal Alert_n to a processor (i.e., a host) after completing an operation corresponding to a storage command received from the processor. The processor may receive status information from the nonvolatile memory system in response to the alert signal Alert_n. Thus, the processor does not need to periodically poll the nonvolatile memory system to check the status information, and thus the performance of the nonvolatile memory system may be improved.

Figure 1:
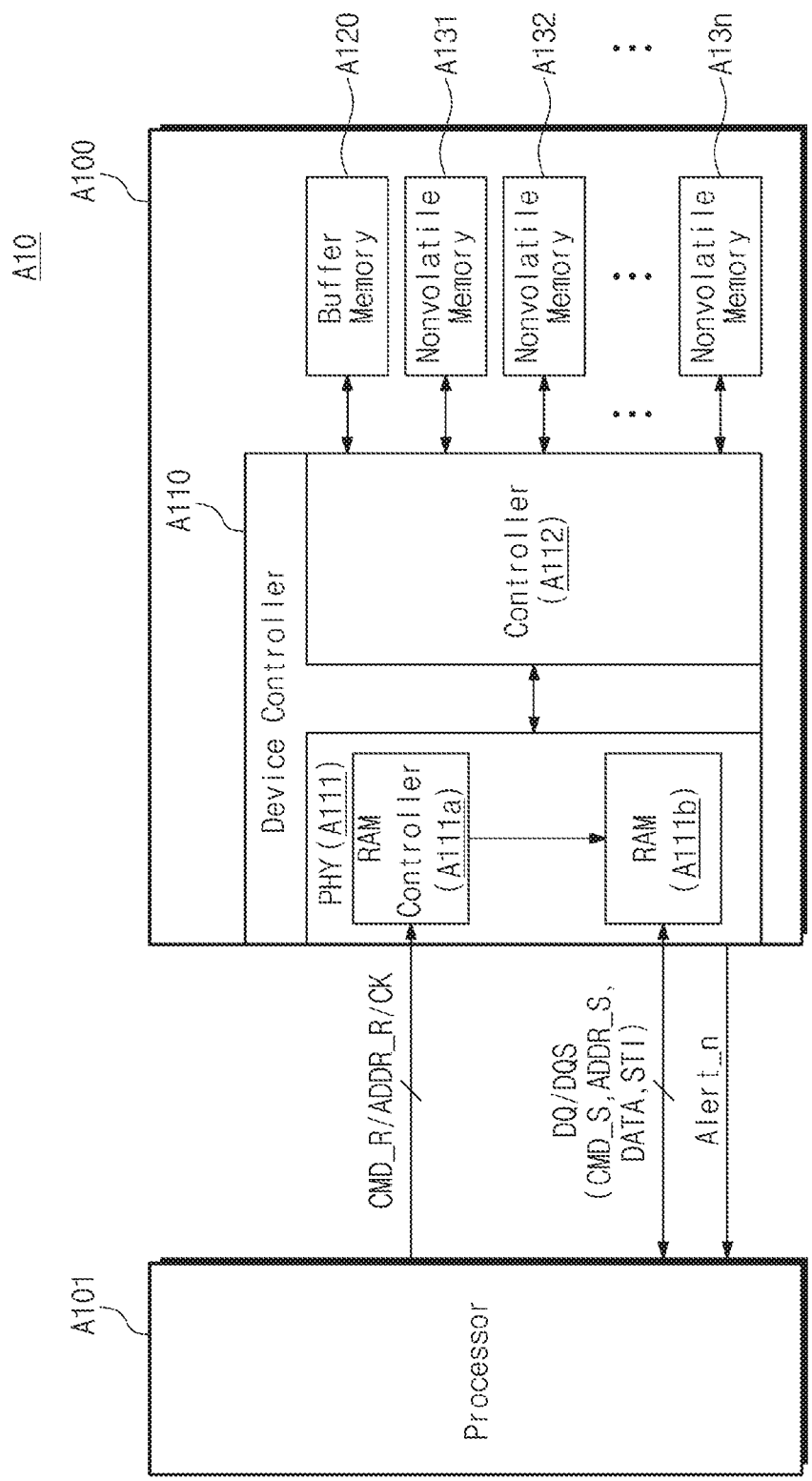
FIG. 1 is a block diagram illustrating a user system according to an embodiment of the inventive concept.
Figure 2:
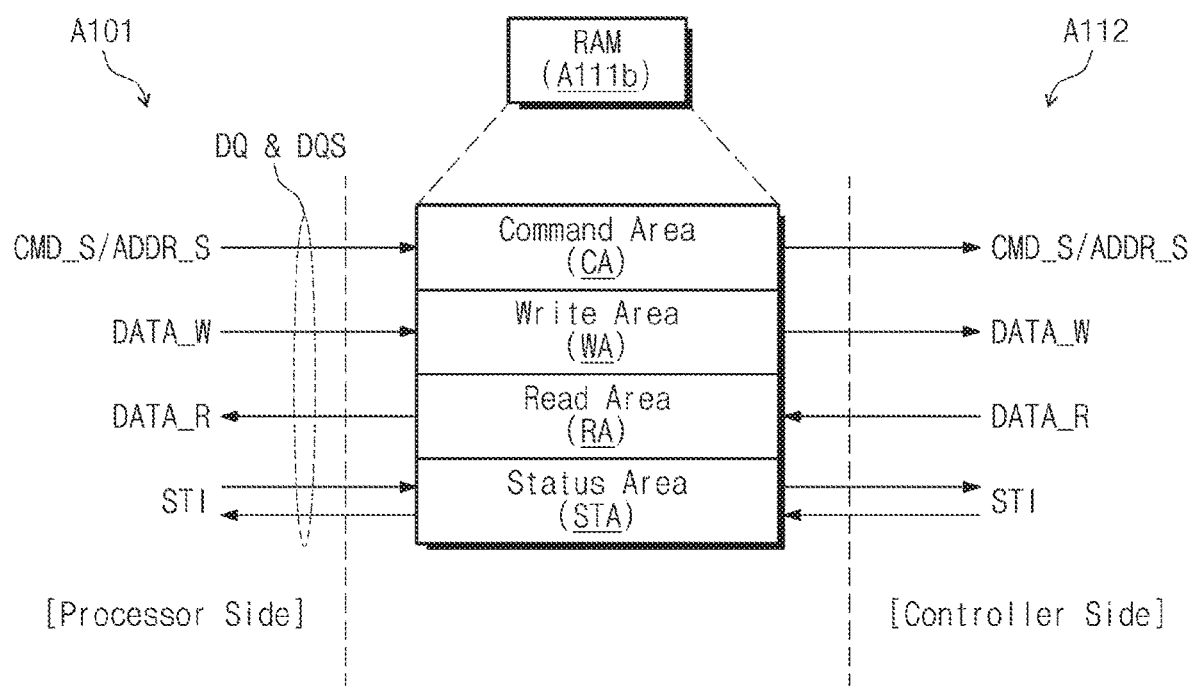
FIG. 2 is a diagram for describing a RAM of FIG. 1.

FIG. 1 is a block diagram illustrating a user system according to an embodiment of the inventive concept. FIG. 2 is a diagram for describing a RAM of FIG. 1. Referring to FIGS. 1 and 2, a user system A10 may include a processor A101 and a nonvolatile memory system A100. In example embodiments, the user system A100 may include one of a computer, a portable computer, a ultra-mobile personal computer (UMPC), a workstation, a server computer, a net-book, a personal digital assistant (PDA), a portable computer, a web tablet, a wireless phone, a mobile phone, a smartphone, a digital camera, a digital audio recorder, a digital audio player, a digital picture recorder, a digital picture player, a digital video recorder, a digital video player, a device capable of transmitting or receiving information in a wireless environment, various electronic devices including a home network.

The processor A101 may process data or may control components included in the user system A10. For example, the processor A101 may drive various operating systems and may execute various applications on an operating system. The processor A101 may write data at the nonvolatile memory system A100 or may read data stored in the nonvolatile memory system A100.

In example embodiments, the processor A101 may provide the nonvolatile memory system A100 with a RAM command CMD_R, a RAM address ADDR_R, and a clock CK. The processor A101a may exchange a data signal DQ and a data strobe signal DQS with the nonvolatile memory system A100. In example embodiments, the data signal DQ may be a signal which includes a storage command CMD_S, a storage address ADDR_S, data, and status information STI.

In example embodiments, the RAM command CMD_R and the RAM address ADDR_R may be a command and an address which are used to control a RAM A111b included in a physical layer A111 of the nonvolatile memory system A100. The storage command CMD_S and the storage address ADDR_S may be a command for controlling nonvolatile memory devices A131 to A13n included in the nonvolatile memory system A100.

In example embodiments, the RAM command CMD_R, the RAM address ADDR_R, the clock CK, the data signal DQ, and the data strobe signal DQS which are exchanged between the processor A101 and the nonvolatile memory system A100 may comply with a protocol which is defined by an interface between the processor A101 and the nonvolatile memory system A100. In example embodiments, an interface between the processor A101 and the nonvolatile memory system A100 may be based on a double data rate (DDR) interface or a registered dual in line memory module (RDIMM) interface or a load reduced DIMM (LRDIMM) interface. For example, the RAM command CMD_R, the RAM address ADDR_R, and the clock CK may be signals in accordance to the protocol defined by the DDR interface.

However, the scope and spirit of the inventive concept may not be limited thereto. For example, the interface between the processor A101 and the nonvolatile memory system A100 may include at least one of DDR, DDR2, DDR3, DDR4, low power DDR (LPDDR), universal serial bus (USB), multimedia card (MMC), embedded MMC, peripheral component interconnection (PCI), PCI-express (PCI-E), advanced technology attachment (ATA), serial-ATA, parallel-ATA, small computer small interface (SCSI), enhanced small disk interface (ESDI), integrated drive electronics (IDE), firewire, universal flash storage (UFS), nonvolatile memory express (NVMe), or the like.

The nonvolatile memory system A100 may include a device controller A110, a buffer memory A120, and a plurality of nonvolatile memory devices A131 to A13n. In example embodiments, the nonvolatile memory system A100 may store data, which is received from the processor A101 through the data signal DQ and the data strobe signal DQS, in at least one of the nonvolatile memory devices A131 to A13n in response to the storage command CMD_S and the storage address ADDR_S received from the processor A101 through the data signal DQ and the data strobe signal DQS. Alternatively, the nonvolatile memory system A100 may provide the processor A101 with data, stored in at least one of the nonvolatile memory devices A131 to A13n, through the data signal DQ and the data strobe signal DQS in response to the storage command CMD_S and the storage address ADDR_S received from the processor A101 through the data signal DQ and the data strobe signal DQS.

In example embodiments, although not shown, the nonvolatile memory system A100 may have the form of a dual in-line memory module (DIMM) and may be mounted on a DIMM socket electrically or directly connected with the processor A101.

The device controller A110 may include a physical layer 111 and a controller A112. The physical layer A111 may include a RAM controller A111a and a RAM A111b. The physical layer A111 may be electrically directly connected with the processor A101 and may provide an interface between the processor A101 and the controller A112.

In response to the RAM command CMD_R, the RAM address ADDR_R, and the clock CK received from the processor A101, the RAM controller A111a may store in the RAM A111b information or data received through the data signal DQ and the data strobe signal DQS or may provide information or data stored in the RAM A111b to the processor A101 through the data signal DQ and the data strobe signal DQS. In example embodiments, the RAM A111b may include a multi-port RAM such as dual port SRAM or a shared RAM. That is, the processor A101 or the controller A112 may access the RAM A111b through independent ports, respectively.

In example embodiments, as illustrated in FIG. 2, the RAM A111b may include a command area CA, a write area WA, a read area RA, and a status area SA. Each of the command area CA, the write area WA, the read area RA, and the status area SA may be selected according to the RAM command CMD_R, the RAM address ADDR_R, and the clock CK which are received from the processor A101.

The command area CA of the RAM A111b may store the storage command CMD_S which is received from the processor A101 through the data signal DQ and the data strobe signal DQS, under control of the RAM controller A111a. The controller A112 may read the storage command CMD_S stored in the command area CA of the RAM A111b. In example embodiments, the storage command CMD_S may include the storage address ADDR_S, and the storage command CMD_S and the storage address ADDR_S may be stored in the command area CA.

The write area WA of the RAM A111b may store write data DATA_W which is received through the data signal DQ and the data strobe signal DQS, under control of the RAM controller A111a. The controller A111b may read write data DATA_W stored in the write area WA of the RAM A111b.

The read area RA of the RAM A111b may store read data DATA_R under control of the controller A112. The read area RA of the RAM A111b may be provided to the processor A101 through the data signal DQ and the data strobe signal DQS.

The status area STA of the RAM A111b may store the status information STI received from the processor A101 through the data signal DQ and the data strobe signal DQS or may transmit the stored status information STI to the processor A101. Under control of the controller A112, the status area STA of the RAM A111b may provide the controller A112 with the stored status information STI or may store the status information STI received from the controller A112.

The controller A112 may communicate with the physical layer A111. The controller A112 may control the buffer memory A120 and the nonvolatile memory devices A131 to A13n, respectively. In the case where the storage command CMD_S is written in the RAM A111b of the physical layer A111, the controller A112 may perform an operation corresponding to the storage command CMD_S written in the RAM A111b. For example, in the case where the storage command CMD_S stored in the RAM A111b is a write command, the controller A112 may read write data DATA_W written in the write area WA of the RAM A111b and may program the read write data DATA_W in at least one of the nonvolatile memory devices A131 to A13n. In the case where the storage command CMD_S stored in the RAM A111b is a read command, the controller A112 may read data, corresponding to the storage address ADDR_S, from the nonvolatile memory devices A131 to A13n and may write the read data at the read area RA as read data DATA_R. In example embodiments, after the write operation and the read operation are completed, the controller A112 may write status information STI, indicating operation completion, at the status area STA.

In example embodiments, in the case where the status information STI is written in the status area STA of the RAM A111b as a write operation or read operation about the storage command CMD_S is completed, the device controller A110 may provide the alert signal Alert_n to the processor A101. In more detail, the controller A112 may write the status information STI at the status area STA and may then activate the alert signal Alert_n. In example embodiments, the alert signal Alert_n may be provided to the processor A101 through the physical layer A111. Although not shown, the alert signal Alert_n may be provided to the processor A101 through the RAM controller A111a. Alternatively, the alert signal Alert_n may be provided to the processor A101 through a separate driver device. For descriptive convenience and ease of illustration, below, it may be assumed that the alert signal Alert_n is driven by the controller A112 and is provided to the processor A101 from the controller A112. Furthermore, the alert signal Alert_n may be activated logically high or low by the RAM controller A111a, but for descriptive convenience, it may be assumed that the controller A112 provides or transmits the alert signal Alert_n. That is, that the alert signal Alert_n is provided or transmitted may mean that the alert signal Alert_n is activated during a specific time or iteratively activated during a specific period. However, the scope and spirit of the inventive concept may not be limited thereto.

Although not shown, the controller A112 may access the RAM A111b through a specific system bus or an internal system bus. Although not shown, the controller A112 may further include hardware or software components such as an error correcting code (ECC) engine, a scrambler, a data buffer, a flash translation layer, and the like. The controller A112 may descramble data read from the RAM A111b through the scrambler or may scramble data to be written in the RAM A111b. The controller A112 may detect and correct an error of data read from the RAM A111b through the ECC engine or may add an ECC code to data to be written in the RAM A111b. The controller A112 may temporarily store data read from the RAM A111b in a data buffer or may temporarily store data read from the nonvolatile memory devices A131 to A13n in the data buffer.

The controller A112 may perform an address translation operation through the flash translation layer. For example, the storage address ADDR_S may be a logical address. The controller A112 may convert a storage address ADDR_S received from the processor A101 through the flash translation layer into a physical address of the nonvolatile memory devices A131 to A13n. In example embodiments, a physical location where write data DATA_W is to be stored or a physical location where read data DATA_R is to be stored may be determined according to the address translation operation. In example embodiments, the physical location may indicate a physical address about the nonvolatile memory devices A131 to A13n.

The buffer memory A120 may be used as a working memory, a buffer memory, or a cache memory of the device controller A110. The buffer memory A120 may include various information required to operate the nonvolatile memory system A100. In example embodiments, the buffer memory A120 may include data for managing the nonvolatile memory devices A131o A13n. For example, the buffer memory A120 may include a mapping table between a physical address of the nonvolatile memory devices A131 to A13n and the storage address ADDR_S received from the processor A101 through the data signal DQ and the data strobe signal DQS. In example embodiments, the buffer memory A120 may include random access memories such as DRAM, SRAM, PRAM, MRAM, RRAM, FeRAM, and the like.

Each of the nonvolatile memory devices A131 to A13n may be connected with the device controller A110 through a plurality of channels CH1 to CHn, respectively. Each of the nonvolatile memory devices A131 to A13n may store or output data under control of the device controller A110. Each of the nonvolatile memory devices A131 to A13n may be implemented with nonvolatile memory elements such as electrically erasable and programmable ROM (EEPROM), NAND flash memory, NOR flash memory, phase-change RAM (PRAM), resistive RAM (ReRAM), ferroelectric RAM (FRAM), spin-torque magnetic RAM (STT-MRAM), and the like. For descriptive convenience, it may be assumed that each of the nonvolatile memory devices A131 to A13n is a NAND flash memory.

As described above, after writing the status information STI at the status area STA, the nonvolatile memory system A100 may activate the alert signal Alert_n or may provide the alert signal Alert_n to the processor A101. The processor A101 may read the status information STI of the status area STA of the nonvolatile memory system A100 in response to the alert signal Alert_n and may verify whether an operation corresponding to the storage command CMD_S is completed and information of the nonvolatile memory system A100, based on the status information STI. This may mean that the performance of the nonvolatile memory system is improved.

Figure 3:
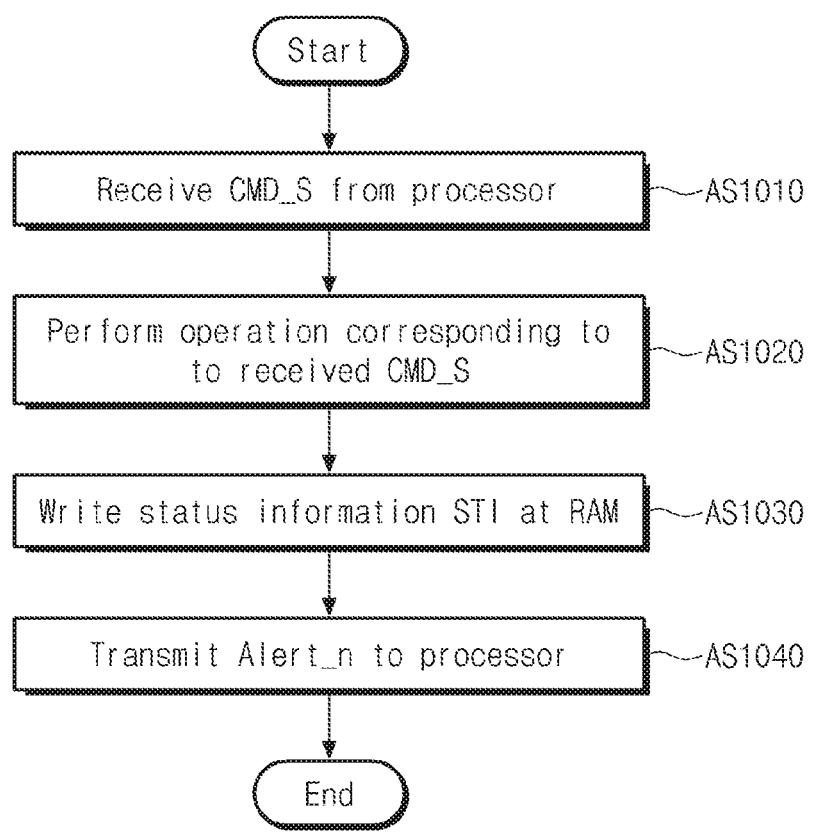
FIG. 3 is a flow chart illustrating an operation of a nonvolatile memory system of FIG. 1.

FIG. 3 is a flow chart illustrating an operation of a nonvolatile memory system of FIG. 1. Referring to FIGS. 1 to 3, in step AS1010, the nonvolatile memory system A100 may receive a storage command CMD_S from the processor A101. For example, as described with reference to FIGS. 1 and 2, the nonvolatile memory system A100 may receive the storage command CMD_S from the processor A101 through a data signal DQ and a data strobe signal DQS. In example embodiments, the nonvolatile memory system A100 may further receive a storage address ADDR_S or write data DATA_W.

In step AS1020, the nonvolatile memory system A100 may perform an operation corresponding to the received storage command CMD_S. For example, in the case where the received storage command CMD_S indicates a read operation, the nonvolatile memory system A100 may read data written in the nonvolatile memory devices A131 to A13n and may write the read data in the RAM A111b. Alternatively, in the case where the received storage command CMD_S indicates a write operation, the nonvolatile memory system A100 may store write data written in the write area WA at the nonvolatile memory devices A131 to A13n. In example embodiments, the storage command CMD_S may be a command corresponding to various other operations (e.g., erasing, merging, and the like) other than the read and write operations.

In step AS1030, the nonvolatile memory system A100 may write status information at the RAM A111b. For example, as described with reference to FIGS. 1 and 2, the nonvolatile memory system A100 may write the status information STI at the status area STA of the RAM A111b after completing an operation corresponding to the received storage command CMD_S. In example embodiments, the status information STI may include information associated with whether an operation corresponding to the received storage command CMD_S is completed.

In step AS1040, the nonvolatile memory system A100 may transmit an alert signal Alert_n to the processor A101. For example, the nonvolatile memory system A100 may write the status information STI in the status area STA of the RAM A111b and may then transmit the alert signal Alert_n to the processor A101 such that the processor A101 reads the written status information STI.

In example embodiments, the processor A101 may read the status information STI written in the status area STA in response to the alert signal Alert_n.

Figure 4:
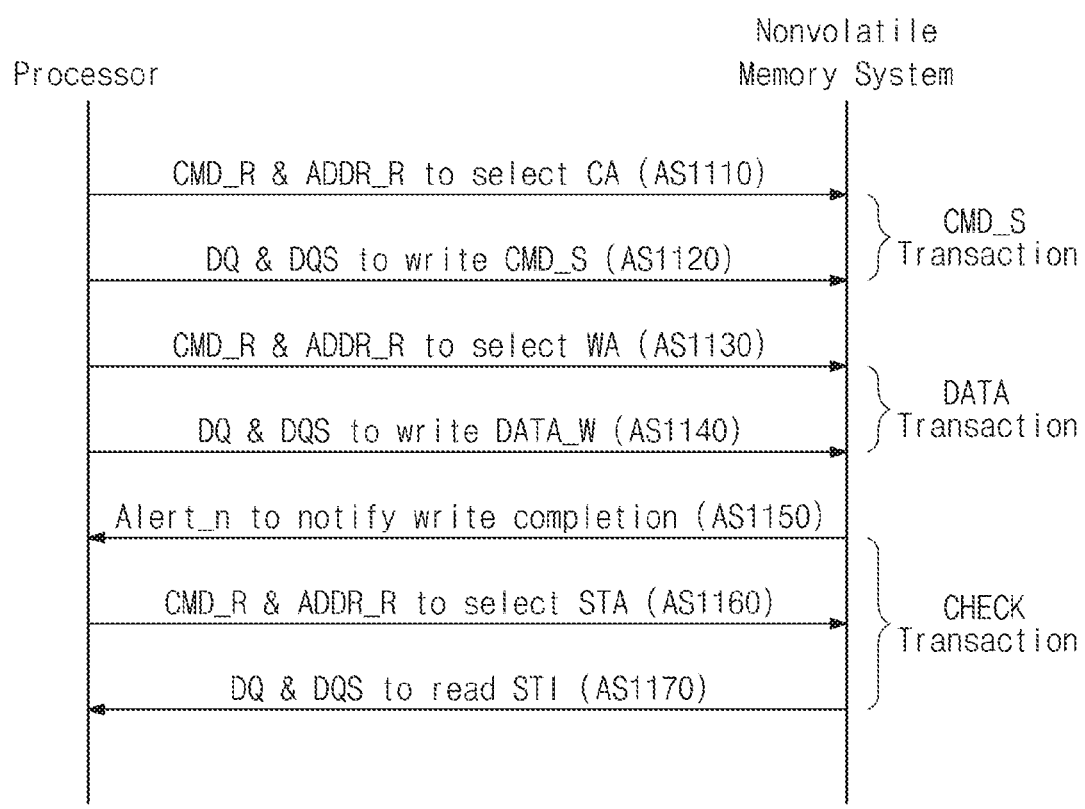
FIG. 4 is a flow chart for describing a write operation of a user system illustrated in FIG. 1.

FIG. 4 is a flow chart for describing a write operation of a user system illustrated in FIG. 1. A write operation about the nonvolatile memory system A10 will be described with reference to FIG. 4. Referring to FIGS. 1 and 4, in step AS1110, the processor A101 may provide the nonvolatile memory system A100 with a RAM address CMD_R and a RAM address ADDR_R for selecting a command area CA of the RAM A111. In step AS1120, the processor A1120 may transmit, to the nonvolatile memory system A100, a data signal DQ and a data strobe signal DQS for writing a storage command CMD_S.

For example, the RAM command CMD_R of step AS110 in FIG. 4 may be a command for writing the storage command CMD_S at the RAM A111b. The RAM address ADDR_R of step AS1110 may be an address corresponding to a command area CA. The storage command CMD_S may be a write command about the nonvolatile memory devices A131 to A13n in the nonvolatile memory system A100 and may be included in the data signal DQ and the data strobe signal DQS of AS1120. In example embodiments, steps AS1110 and AS1120 may compose storage command transaction (CMD_S transaction), and the storage command CMD_S may be stored in the command area CA through operations of steps AS1110 and AS1120.

In step AS1130, the processor A101 may provide the nonvolatile memory system A100 with a RAM address CMD_R and a RAM address ADDR_R for selecting a write area WA. In step AS1140, the processor A101 may transmit, to the nonvolatile memory system A100, the data signal DQ and the data strobe signal DQS for writing the write data DATA_W.

For example, the RAM command CMD_R of step AS1130 in FIG. 4 may be a command for writing the write data DATA_W at the RAM A111b. The RAM address ADDR_R of step AS1130 may be an address corresponding to the write area WA. The write data DATA_W may be included in the data signal DQ and the data strobe signal DQS of step AS1140. In example embodiments, steps AS1130 and AS1140 may compose write data transaction (DATA_W transaction), and the write data DATA_W may be stored in the write area WA through operations of steps AS1130 and AS1140.

In step AS1150, the nonvolatile memory system A100 may transmit an alert signal Alert_n to the processor A101 to notify write completion. For example, as described above, the nonvolatile memory system A100 may read the storage command CMD_S written in the command area CA of the RAM A111b and may program the write data, written in the write area WA, at the nonvolatile memory devices A131 to A13n in response to the read storage command CMD_S. After the programming is completed, the nonvolatile memory system A100 may write the status information STA at the RAM A111b. Afterwards, the nonvolatile memory system A100 may transmit the alert signal Alert_n to the processor A101. Alternatively, the nonvolatile memory system A100 may activate the alert signal Alert_n.

In step AS1160, the processor A101 may provide the nonvolatile memory system A100 with the RAM address CMD_R and the RAM address ADDR_R for selecting a status area STA. For example, the processor A101 may recognize that the status information STI is written at the status area STA of the nonvolatile memory system A100, based on the received alert signal Alert_n. The processor A100 may provide the nonvolatile memory system A100 with the RAM address CMD_R and the RAM address ADDR_R to read the status area STA of the nonvolatile memory system A100 in response to the received alert signal Alert_n. In example embodiments, the RAM command CMD_R of step AS1160 may be a read command for reading the status area STA, and the RAM address ADDR_R of step AS1160 may be an address corresponding to the status area STA.

In step AS1170, the nonvolatile memory system A100 may transmit the status information STI to the processor A101 through the data signal DQ and the data strobe signal DQS. For example, the nonvolatile memory system A100 may provide the processor A101 with the status information STI of the status area STA corresponding to the RAM address ADDR_R in response to the RAM command CMD_R and the RAM address ADDR_R of step AS1160. At this time, the nonvolatile memory system A100 may transmit the status information STI to the processor A101 through the data signal DQ and the data strobe signal DQS. In example embodiments, operations of steps AS1150 to AS1170 may compose check transaction.

Figure 5:
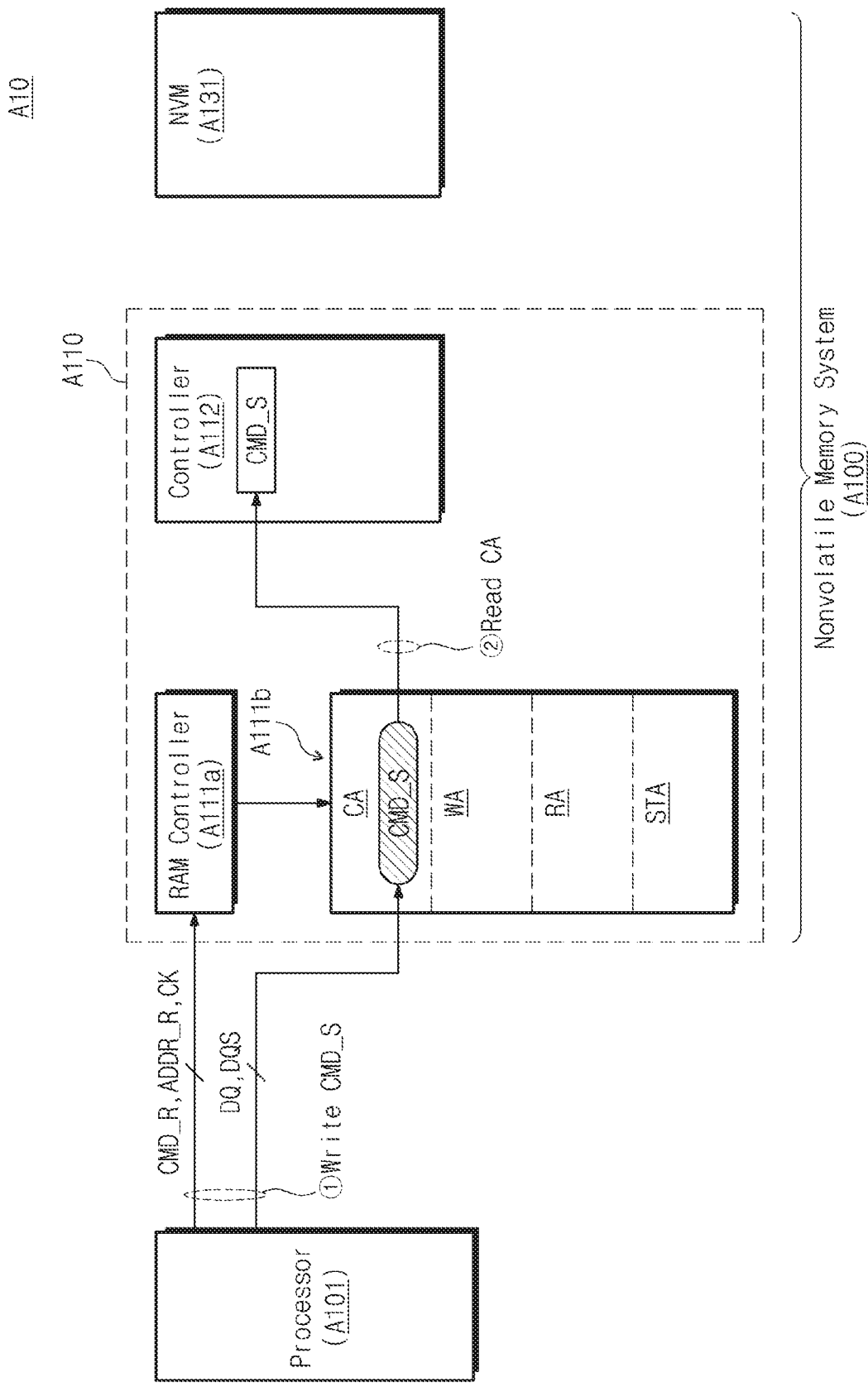
FIGS. 5 to 7 are diagrams for describing a write operation of FIG. 4 in detail.
Figure 6:
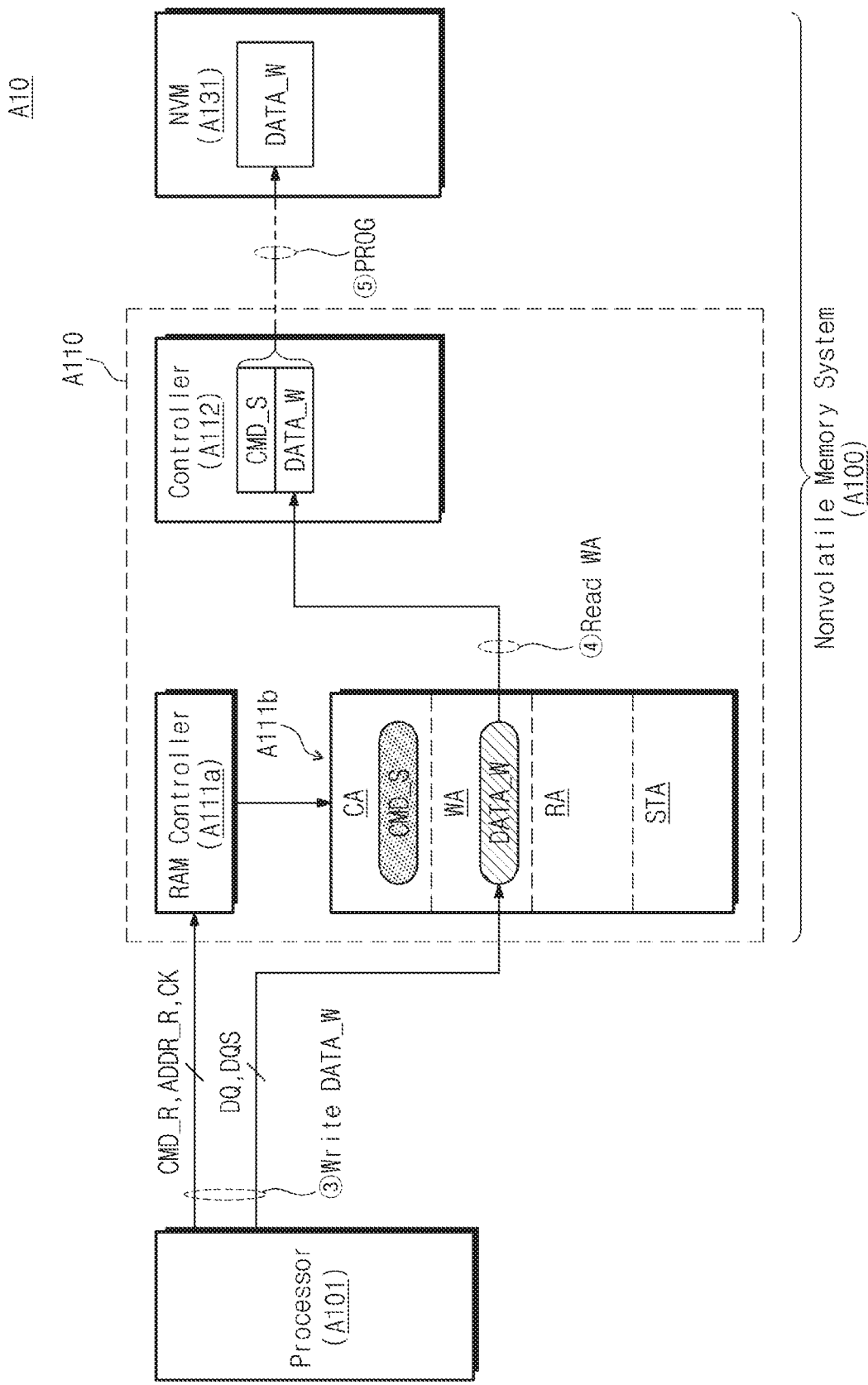
Figure 7:
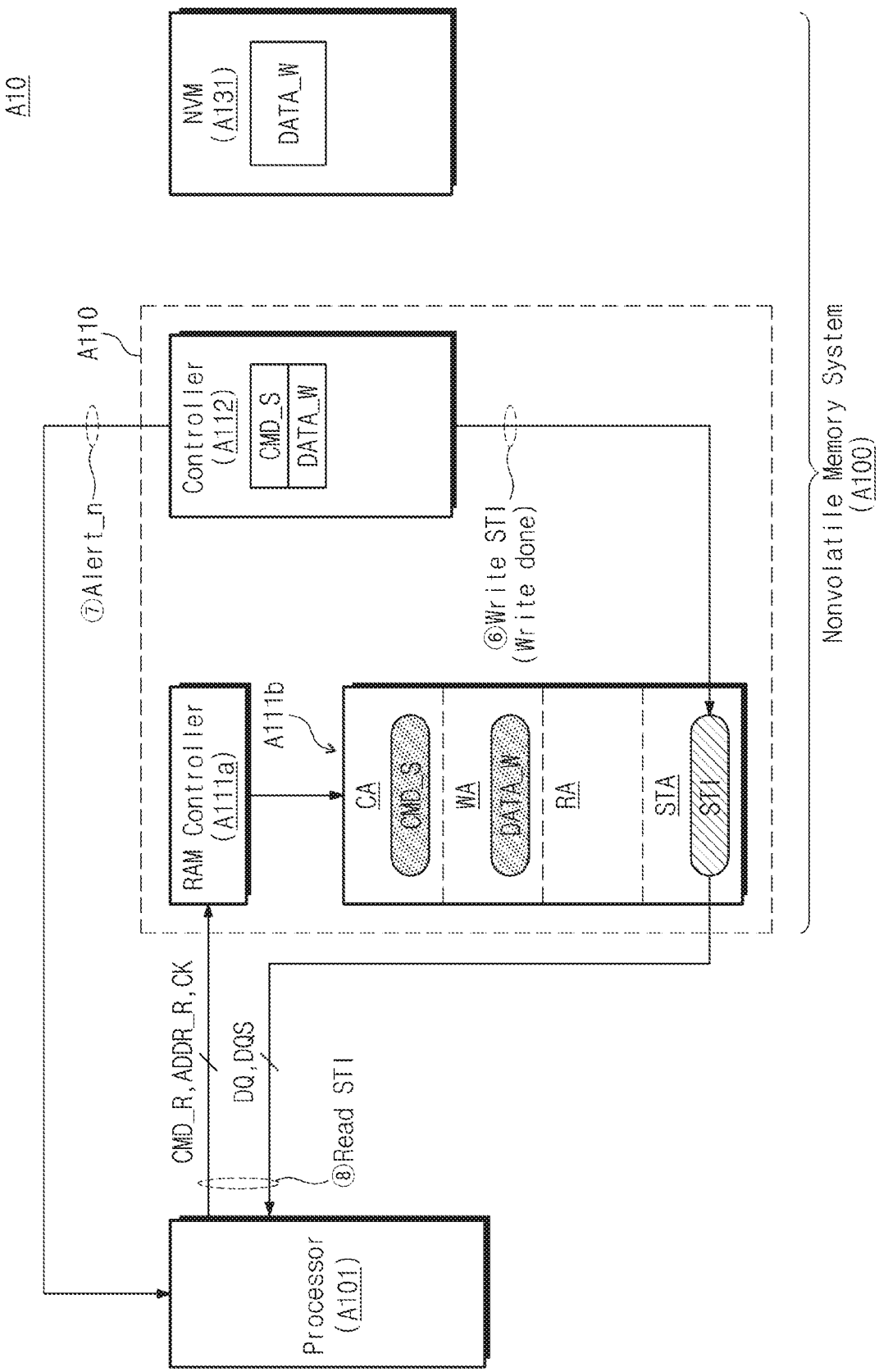

FIGS. 5 to 7 are diagrams for describing a write operation of FIG. 4 in detail. For descriptive convenience, components which are unnecessary for a write operation of a user system A10 are omitted, and a description about duplicated components is also omitted.

Referring to FIG. 5, the processor A101 may write a storage command CMD_S in a command area CA ($\hat{1}$). For example, as described above, the processor A101 may transmit a RAM command CMD_R, a RAM address ADDR_R, and a clock CK to the nonvolatile memory system A100 and may transmit a data signal DQ, in which a storage command CMD_S is included, and a data strobe signal DQS to the nonvolatile memory system A100. The RAM controller A111a of the nonvolatile memory system A100 may select a command area CA in response to the RAM command CMD_R, the RAM address ADDR_R, and the clock CK and may write the storage command CMD_S at the selected command area CA. In example embodiments, the data signal DQ and the data strobe signal DQS may be provided to the RAM A111b through the RAM controller A111a. In example embodiments, the above-described operations of the processor A101 may be operations of steps AS1110 and AS1120 of FIG. 4.

The controller A112 may read the storage command CMD_S stored in the command area CA ($\hat{2}$). The controller A112 may fetch the storage command CMD_S stored in the command area CA through a system bus. The controller A112 may analyze the fetched storage command CMD_S and may determine whether the storage command CMD_S is a write command. In example embodiments, the storage command CMD_S may be analyzed by a separate command parser or a central processing unit (not shown) of the nonvolatile memory system A100.

Referring to FIG. 6, the processor A101 may store write data DATA_W in a write area WA (③). For example, the processor A101 may transmit the RAM command CMD_R, the RAM address ADDR_R, and the clock CK to the nonvolatile memory system A100 and may transmit the data signal DQ and the data strobe signal DQS including the storage command CMD_S to the nonvolatile memory system A100. The RAM controller A111a of the nonvolatile memory system A100 may select the write area WA in response to the RAM command CMD_R, the RAM address ADDR_R, and the clock CK and may write the write data DATA_W at the selected write area WA. In example embodiments, the above-described operations of the processor A101 may be operations of steps AS1130 and AS1140 of FIG. 4.

The controller A112 may read the write data DATA_W stored in the write area WA (④). The controller A112 may program the write data DATA_W at the nonvolatile memory device A131 based on the storage command CMD_S (⑤). In example embodiments, the controller A112 may package the storage command CMD_S and the write data DATA_W.

Referring to FIG. 7, after programming the write data DATA_W at the nonvolatile memory device A131, the controller A112 may write at the status area STA status information STI indicating write completion about the write data DATA_W (⑥). In example embodiments, the controller A112 may write the status information STI at the status area STA through the system bus.

Afterwards, the controller A112 may transmit the alert signal Alert_n to the processor A101 (⑦). For descriptive convenience and ease of illustration, an embodiment of the inventive concept is exemplified as the controller A112 provides the alert signal Alert_n to the processor A101. However, the scope and spirit of the inventive concept may not be limited thereto. For example, the alert signal Alert_n may be transmitted to the processor A101 through other components of the nonvolatile memory system A100. In example embodiments, an operation of transmitting the alert signal Alert_n may be an operation of step AS1150 of FIG. 4.

The processor A101 may read the status information STI written in the status area STA in response to the alert signal Alert_n (⑧). For example, the processor A101 may provide the nonvolatile memory system A100 with a RAM command CMD_R, a RAM address ADDR_R, and a clock CK. The RAM controller A111a of the nonvolatile memory system A100 may provide the processor A101 with the status information STI of the status area STA in response to the RAM command CMD_R, the RAM address ADDR_R, and the clock CK. In example embodiments, the status information STI may be provided to the processor A101 through the data signal DQ and the data strobe signal DQS.

As described above, after writing the status information STI at the status area STA, the nonvolatile memory system A100 may transmit the alert signal Alert_n to the processor A101. The processor A101 may read the status information STI written in the status area STA in response to the alert signal Alert_n. Conventionally, a processor may periodically poll a status area to recognize whether an operation of a nonvolatile memory system is completed. However, the nonvolatile memory system A100 according to the inventive concept may write the status information STI in the status area STA after an operation is completed and may transmit the alert signal Alert_n to the processor A101 to provide notification that the status information STI is written (i.e., completion of operation), thereby making better use of the processor A101 and reducing overhead due to a polling operation. This may mean that the performance of the nonvolatile memory system is improved.

Figure 8:
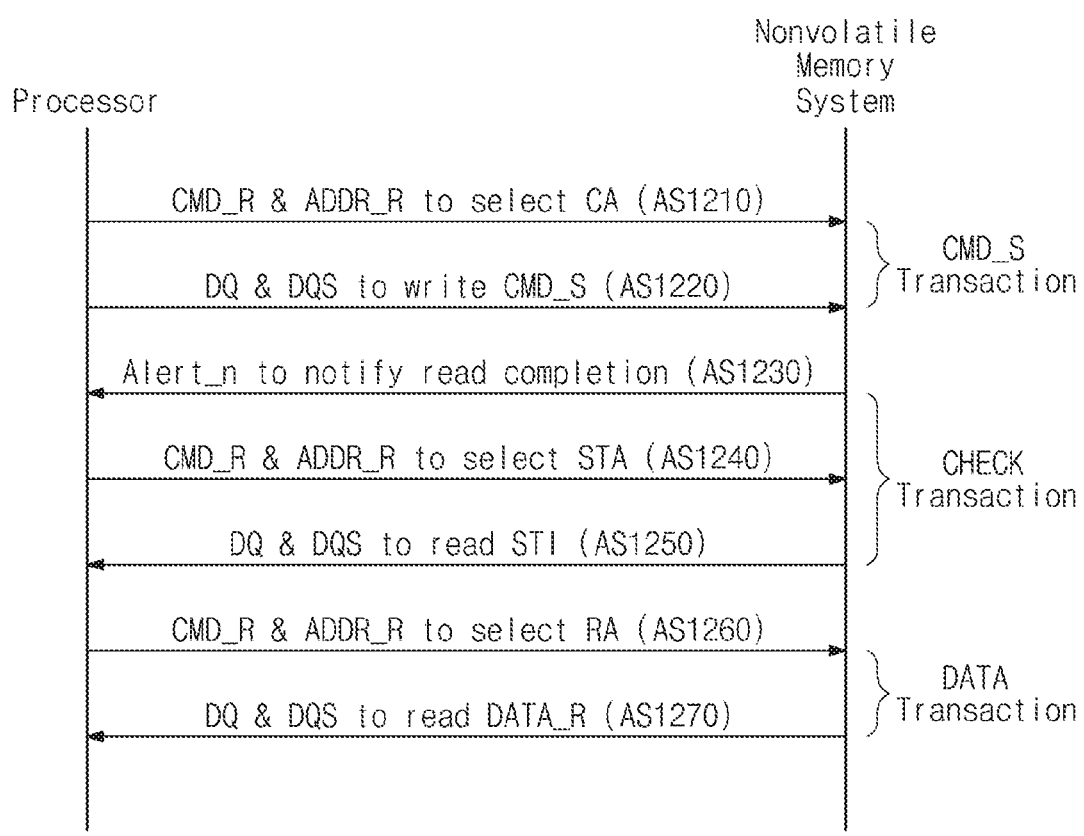
FIG. 8 is a flow chart for describing a read operation of a user system illustrated in FIG. 1.

FIG. 8 is a flow chart for describing a read operation of a user system illustrated in FIG. 1. Referring to FIGS. 1, 2 and 8, in step AS1210, the processor A101 may provide the nonvolatile memory system A100 with a RAM address CMD_R and a RAM address ADDR_R for selecting a command area CA. In step AS1220, the processor A101 may transmit a storage command CMD_S to the nonvolatile memory system A100 through a data signal DQ and a data strobe signal DQS. In example embodiments, the RAM command CMD_R of step AS1210 may be a command for writing the storage command CMD_S at the RAM A111b. The RAM address ADDR_R of step AS1210 may be an address corresponding to a command area CA. The storage command CMD_S of step AS1220 may be a write command about the nonvolatile memory devices A131 to A13n in the nonvolatile memory system A100 and may be included in the data signal DQ and the data strobe signal DQS of AS1220. In example embodiments, steps AS1210 and AS1220 may compose storage command transaction (CMD_S transaction), and the storage command CMD_S may be stored in the command area CA through operations of steps AS1210 and AS1220.

In step AS1230, the nonvolatile memory system A100 may transmit an alert signal Alert_n to the processor A101 to notify read completion. For example, the nonvolatile memory system A100 may perform a read operation on the nonvolatile memory devices A131 to A13n in response to the storage command CMD_S of step S1220. The nonvolatile memory system A100 may write read data DATA_R read from the nonvolatile memory devices A131 to A13n in a read area RA. After writing the read data DATA_R at the read area RA, the nonvolatile memory system A100 may write in the status area STA the status information STI indicating completion of the read operation. Afterwards, the nonvolatile memory system A100 may transmit the alert signal Alert_n to the processor A101.

In step S1240, the processor A101 may provide the nonvolatile memory system A100 with the RAM address CMD_R and the RAM address ADDR_R for selecting the status area STA. For example, the processor A101 may receive the alert signal Alert_n and may recognize that the status information STI is written or updated in the status area STA, based on the alert signal Alert_n. The processor A101 may provide the nonvolatile memory system A100 with the RAM address CMD_R and the RAM address ADDR_R to read the status information STI written in the status area STA. In example embodiments, the RAM command CMD_R of step AS1240 may be a read command about the RAM A111b, and the RAM address ADDR_R may be an address corresponding to the status area STA.

In step AS1250, the nonvolatile memory system A100 may transmit the status information STI to the processor A101 through the data signal DQ and the data strobe signal DQS. For example, the RAM controller A111a of the nonvolatile memory system A100 may provide the processor A101 with the status information STI written in the status area STA in response to the RAM command CMD_R and the RAM address ADDR_R of step AS1240. In example embodiments, the status information STI may include information indicating completion of an operation corresponding to the storage command CMD_S received in step AS1220 and may be provided to the processor A101 through the data signal DQ and the data strobe signal DQS.

In step AS1260, the processor A101 may provide the nonvolatile memory system A100 with the RAM address CMD_R and the RAM address ADDR_R for selecting the read area RA. For example, the status information STI of step AS1250 may include information of the read area RA where the read data is stored. That is, the status information STI may include an address of an area where the read data DATA_R is stored. The processor A101 may recognize that the nonvolatile memory system A100 completed the read operation, based on the status information STI received in step AS1250 and may recognize that the read data DATA_R is stored in the read area RA. The processor A101 may provide the nonvolatile memory system A100 with the RAM address CMD_R and the RAM address ADDR_R to read the read data DATA_R stored in the read area RA. In example embodiments, the RAM command CMD_R may be a read command about the RAM A111b, and the RAM address ADDR_R may be an address corresponding to the read area RA (in more detail, an area where the read data is stored).

In step AS1270, the nonvolatile memory system A100 may transmit the read data DATA_R to the processor A101. For example, the RAM controller A111a of the nonvolatile memory system A100 may provide the processor A101 with the read data DATA_R in response to the RAM command CMD_R and the RAM address ADDR_R. In example embodiments, the read data DATA_R may be provided to the processor A101 through the data signal DQ and the data strobe signal DQS.

Figure 9:
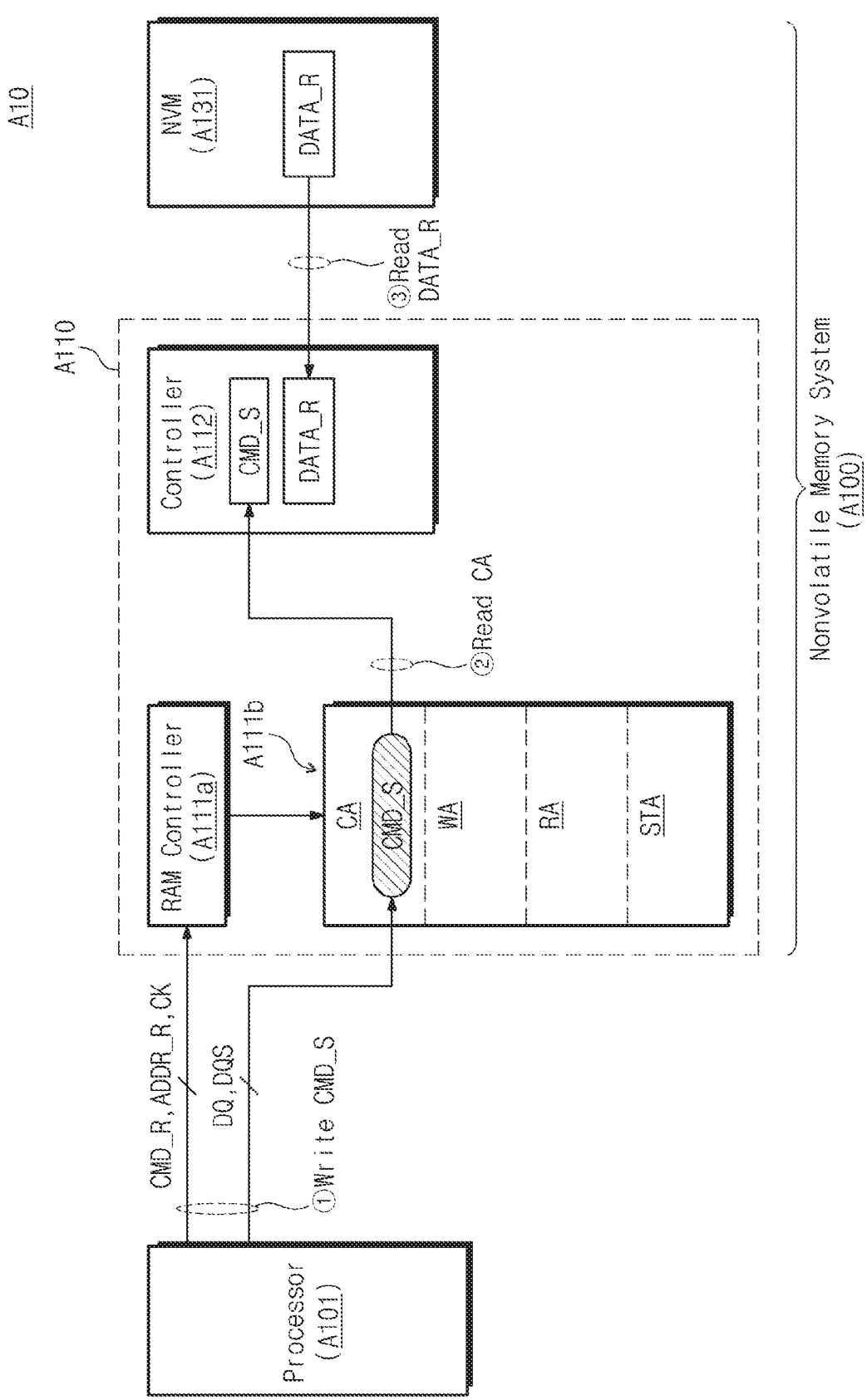
FIGS. 9 to 11 are diagrams illustrating a read operation of FIG. 8 in more detail.
Figure 10:
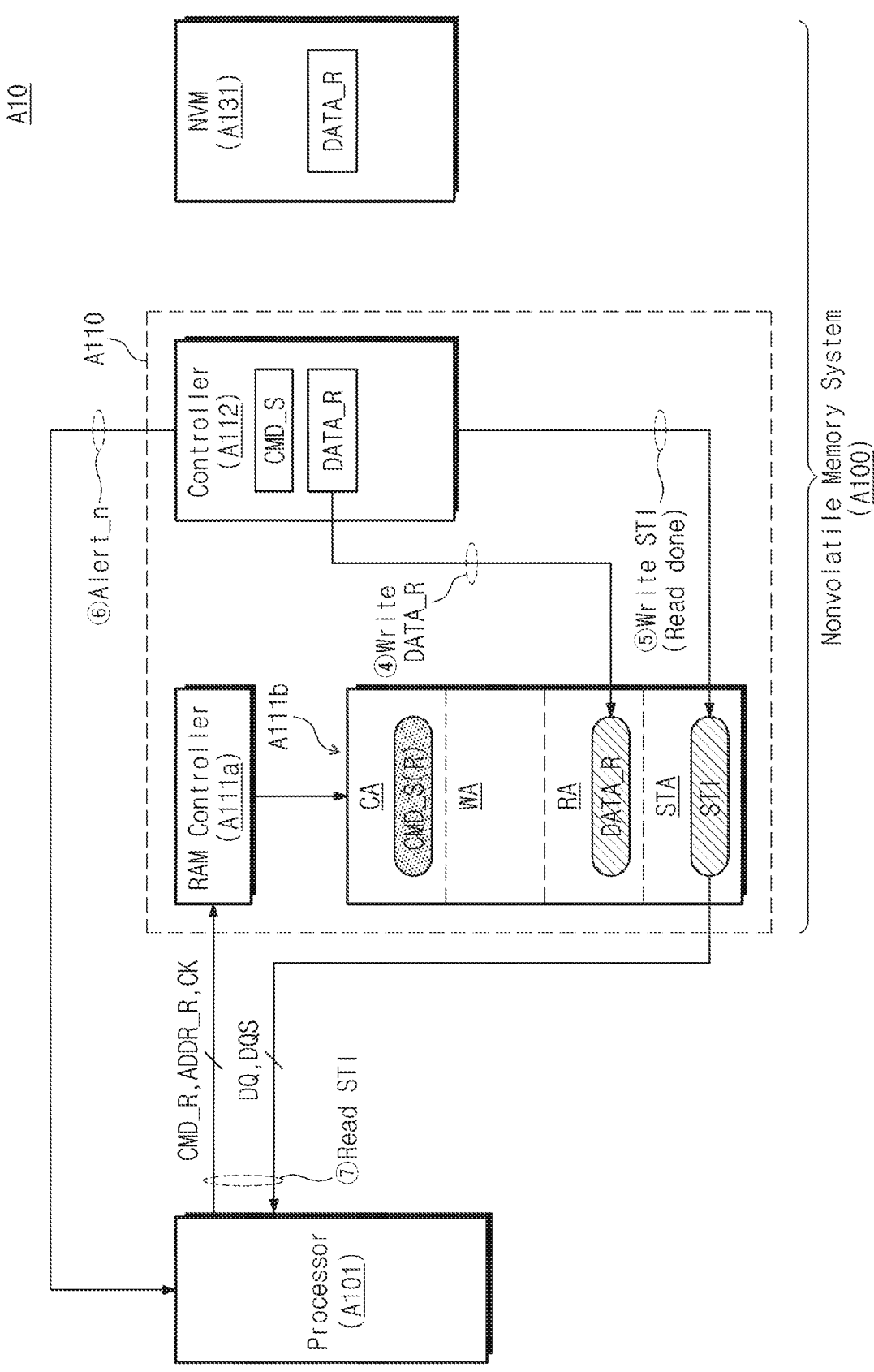
Figure 11:
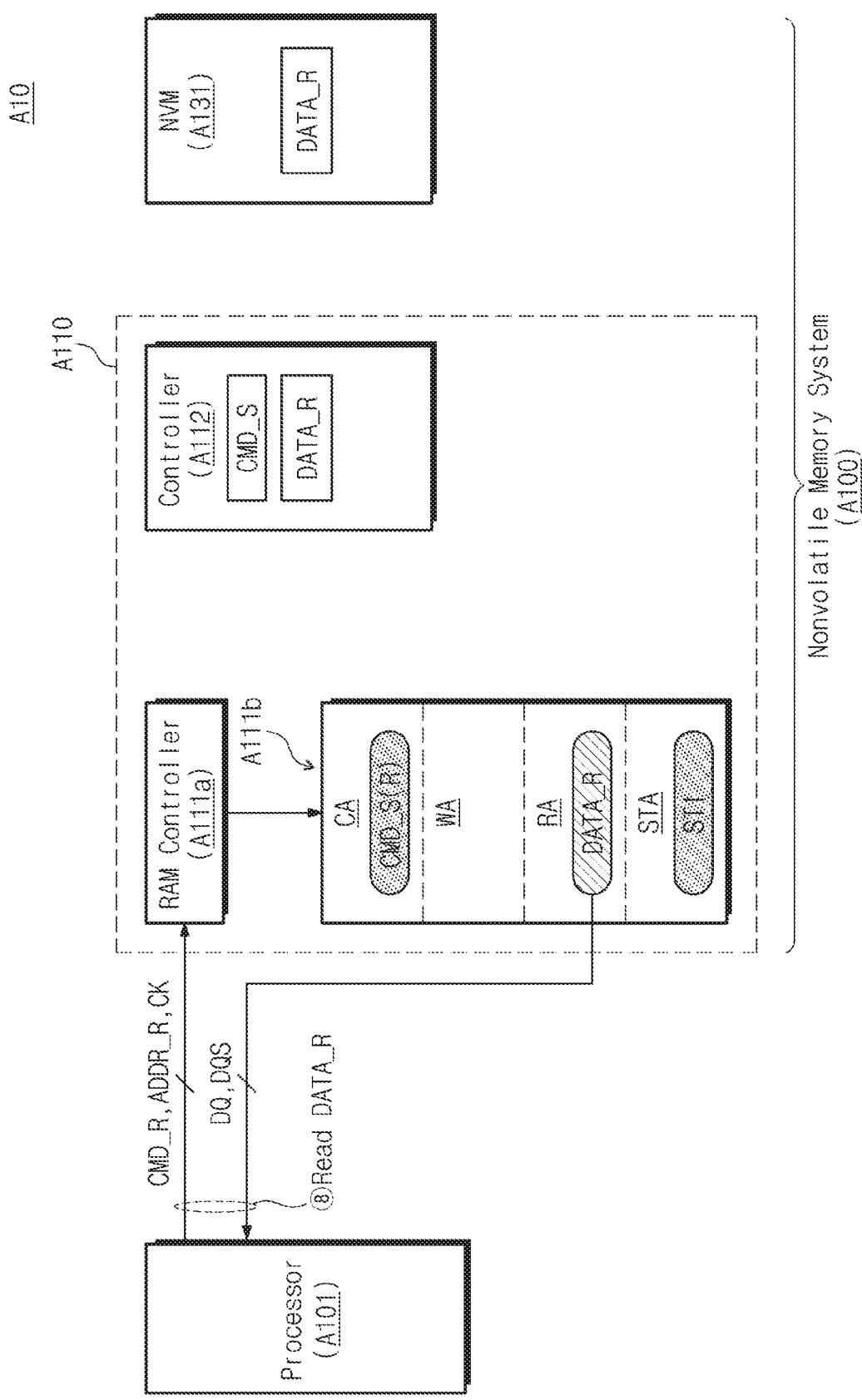

FIGS. 9 to 11 are diagrams illustrating a read operation of FIG. 8 in more detail. For descriptive convenience, components which are unnecessary for a read operation of the user system A10 are omitted, and a description about duplicated components is also omitted.

Referring to FIG. 9, the processor A101 may write a storage command CMD_S in a command area CA ($\hat{1}$). For example, the processor A101 may provide the RAM controller A111a with a RAM command CMD_R, a RAM address ADDR_R, and a clock CK. The RAM controller A111a may write in a command area CA a storage command CMD_S, which is received through a data signal DQ and a data strobe signal DQS, in response to the received signals. In example embodiments, the storage command CMD_S may be a read command about the nonvolatile memory device A131. In example embodiments, the above-described operations may be operations of steps AS1210 and AS1220 of FIG. 8.

The controller A112 may read the storage command CMD_S stored in the command area CA ($\hat{2}$). In example embodiments, the controller A112 may read the storage command CMD_S through the system bus.

The controller A112 may read from the nonvolatile memory device A131 read data DATA_R in response to the read storage command CMD_S ($\hat{3}$). In example embodiments, the storage command CMD_S may be a read command and may include an address (or a logical address) corresponding to the read data DATA_R.

Referring to FIG. 10, the processor A112 may store write data DATA_W in a write area WA ($\hat{4}$). Afterward, the controller A112 may write the status information STI at a status area STA ($\hat{5}$). In example embodiments, the status information STI may include information associated with whether an operation corresponding to the storage command CMD_S is completed. Furthermore, the status information STI may include information of a read area where the read data DATA_R is stored.

After the status information STI is written in the status area STA, the controller A112 may transmit the alert signal Alert_n to the processor A101 ($\hat{6}$). The processor A101 may read the status information STI written in the status area STA in response to the alert signal Alert_n ($\hat{7}$). For example, the processor A101 may provide the RAM controller A111a with a RAM command CMD_R, a RAM address ADDR_R, and a clock CK to read the status information written in the status area STA. The RAM controller A111a may provide the processor A101 with the status information STI of the status area STA in response to the RAM command CMD_R, the RAM address ADDR_R, and the clock CK. In example embodiments, the status information STI may be provided to the processor A101 through the data signal DQ and the data strobe signal DQS.

Referring to FIG. 11, the processor A101 may read data DATA_R written in the read area RA based on the read status information STI ($\hat{8}$). For example, the status information STI may include information (i.e., address information) of the read area RA where the read data DATA_R is written. The processor A101 may provide the RAM controller A111a with a RAM command CMD_R, a RAM address ADDR_R, and a clock CK to read the read data DATA_R based on the status information STI. The RAM controller A111a may provide the processor A101 with the read data DATA_R in response to the RAM command CMD_R, the RAM address ADDR_R, and the clock CK. In example embodiments, the read data DATA_R may be provided to the processor A101 through the data signal DQ and the data strobe signal DQS.

As described with reference to FIGS. 4 to 11, the nonvolatile memory system A100 may write the status information STI at the status area STA of the RAM A111b after completing an operation corresponding to the storage command CMD_S received from the processor A101. Afterwards, the nonvolatile memory system A100 may transmit the alert signal Alert_n to the processor A101. The processor A101 may read the status information STI written in the status area STA in response to the alert signal Alert_n. This may mean that the performance of the nonvolatile memory system is improved.

Figure 12:
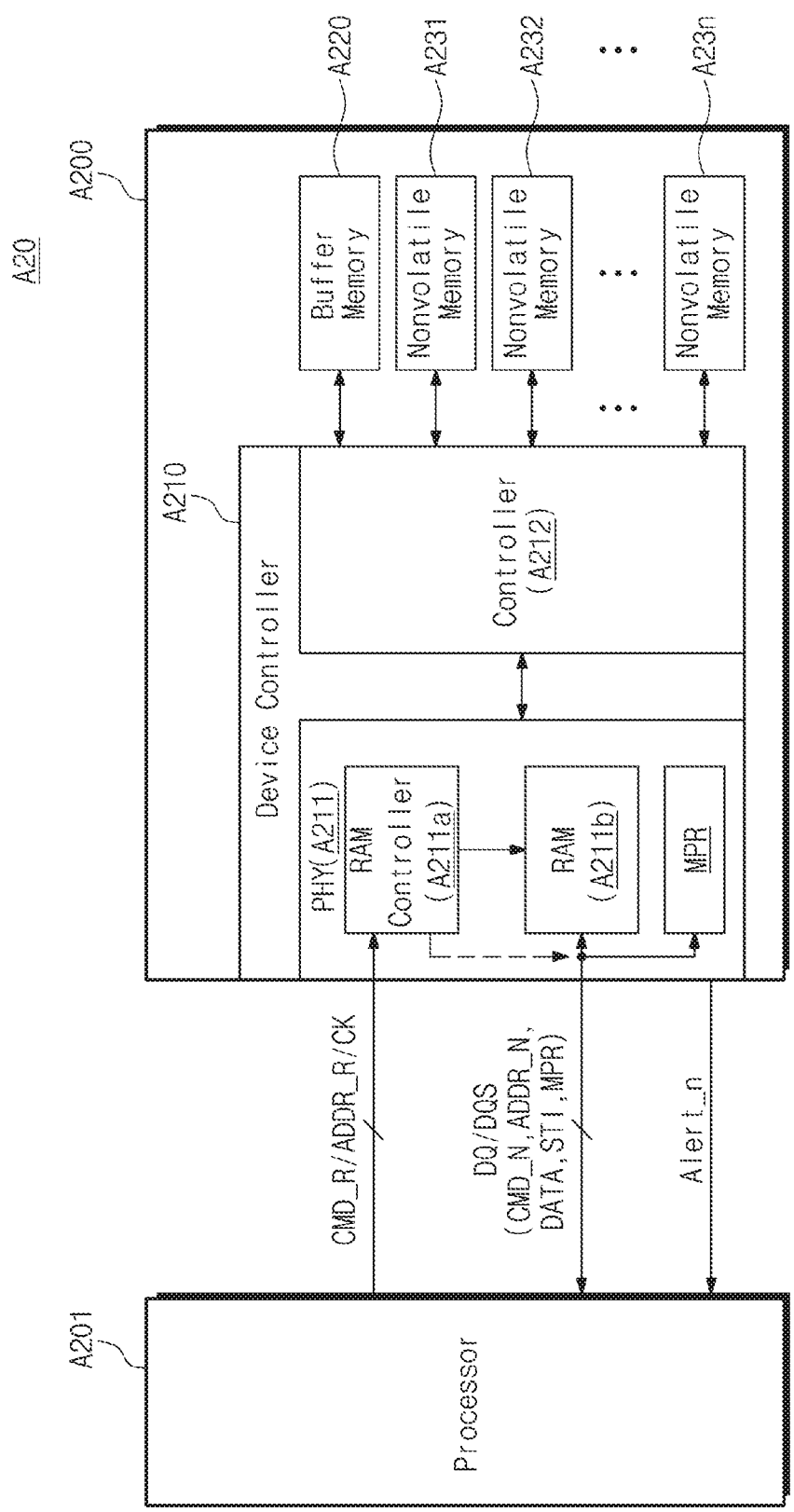
FIG. 12 is a block diagram illustrating a user system according to an example embodiment of the inventive concept.

FIG. 12 is a block diagram illustrating a user system according to an example embodiment of the inventive concept. Referring to FIG. 12, a user system A20 may include a processor A201 and a nonvolatile memory system A200. The nonvolatile memory system A200 may include a device controller A210, a buffer memory A220, and a plurality of nonvolatile memory devices A231 to A23n. The device controller A210 may include a physical layer A211 and a controller A212. The physical layer A211 may include a RAM controller A211a and a multi-purpose register MPR.

The processor A201, the nonvolatile memory system A200, the device controller A210, the buffer memory A220, the nonvolatile memory devices A231 to A23n, the physical layer A211, the controller A212, the RAM controller A221a, and the RAM A221b are described with reference to FIG. 1, and a detailed description thereof is thus omitted.

The nonvolatile memory system A200 may be different from the nonvolatile memory system A100 of FIG. 1 in that the nonvolatile memory system A200 further includes the multi-purpose register MPR. The multi-purpose register MPR may include a plurality of registers.

In example embodiments, the multi-purpose register MPR may store a data pattern, an error log, information about a mode register, or information about update of status information STI. For example, the multi-purpose register MPR may include information about a data pattern for training. The multi-purpose register MPR may include a log record about a cyclic redundancy check of write data, a storage command, and the like received from the processor A201. The multi-purpose register MPR may include information about a mode register set (MRS) indicating an operating mode of the physical layer A211. The multi-purpose register MPR may include information (hereinafter referred to as "status information log") about update of the status information STI. In example embodiments, the processor A101 may access the multi-purpose register MPR by switching from an operating mode (or a mode register set) of the physical layer A211 to a mode for accessing the multi-purpose register (MPR). In example embodiments, the processor A201 may change the operating mode (or the mode register) of the physical layer A211 using a RAM command CMD_R and a RAM address ADDR_R.

After writing status information STI in a status area STA, the nonvolatile memory system A200 according to an example embodiment of the inventive concept may write updated information of the status information STI at the multi-purpose register MPR and may then provide an alert signal Alert_n to the processor A201. The processor A201 may read the status information log from the multi-purpose register MPR in response to the alert signal Alert_n. The processor A101 may read the status information STI written in the status area STA in response to the read status information log.

For ease of illustration and descriptive convenience, it may be assumed that the status information STI is written in the status area STA by the controller A212 and the status information log is then written in the multi-purpose register MPR by the controller A212. However, the scope and spirit of the inventive concept may not be limited thereto. The status information log may be recorded in the multi-purpose register MPR by the RAM controller A221a included in the physical layer A211 or by a separate control circuit placed outside the physical layer A221a.

Figure 13:
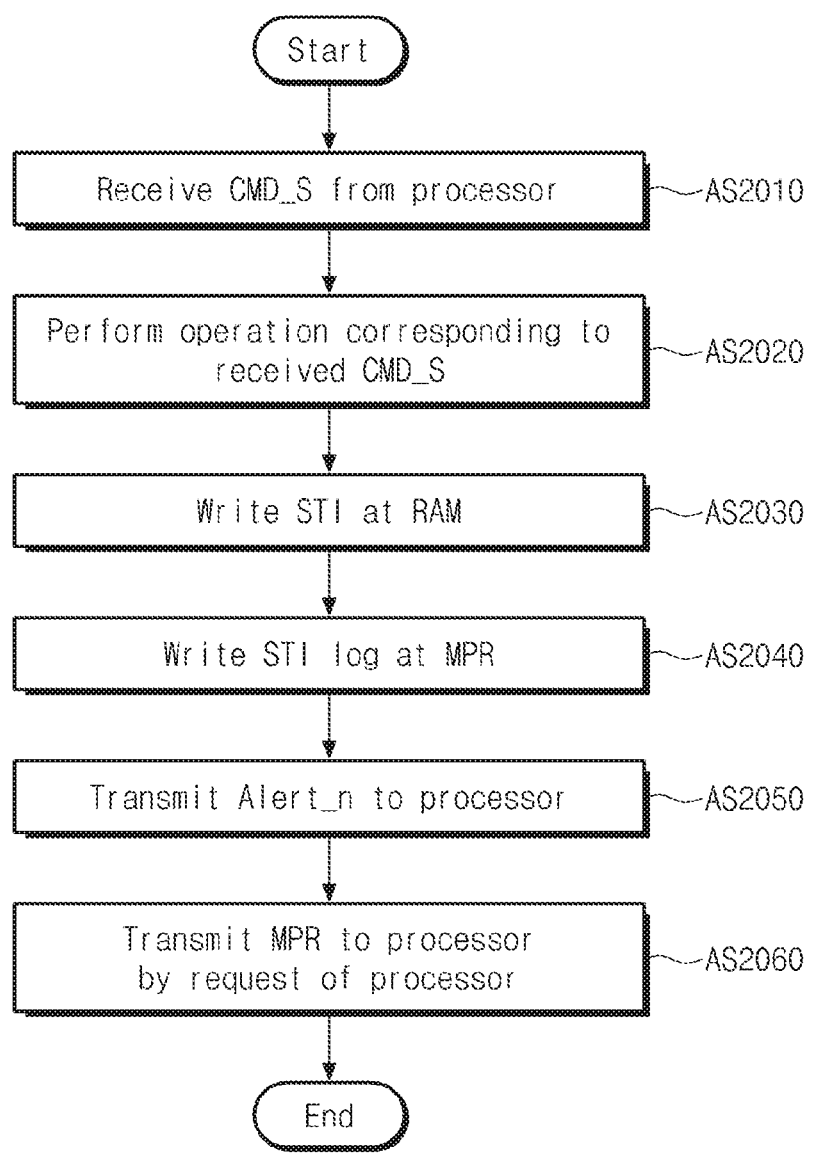
FIG. 13 is a flow chart illustrating an operation of a nonvolatile memory system of FIG. 12.

FIG. 13 is a flow chart illustrating an operation of a nonvolatile memory system of FIG. 12. Referring to FIGS. 12 and 13, the nonvolatile memory system A200 may perform operations of steps AS2010 to AS2030. In example embodiments, operations of steps AS2010 to AS2030 may be similar to those of steps AS1010 to AS1030 of FIG. 3, and a detailed description thereof is thus omitted.

In step AS2040, the nonvolatile memory system A200 may write a status information log at the multi-purpose register MPR. For example, the nonvolatile memory system A200 may write a status information log, indicating that status information STI is written in a status area STA, at the multi-purpose register MPR.

In step AS2050, the nonvolatile memory system A200 may transmit the alert signal Alert_n to the processor A201.

In step AS2060, the nonvolatile memory system A200 may provide the processor A201 with information written in the multi-purpose register MPR in response to a request of the processor A201. For example, the processor A201 may read the multi-purpose register MPR in response to the alert signal Alert_n of step AS2050. At this time, the nonvolatile memory system A200 may transmit information written in the multi-purpose register MPR to the processor A201 in response to a request (i.e., a multi-purpose register (MPR) read request) of the processor A201. Information written in the multi-purpose register MPR may include a status information log STI log.

In example embodiments, the processor A201 may read the status information STI written in the status area STA in response to the status information log of step AS2060.

According to an embodiment of the inventive concept, after completing an operation corresponding to a storage command CMD_S, the nonvolatile memory system A200 may write the status information STI in the status area STA and may write the status information log in the multi-purpose register MPR. Afterwards, the nonvolatile memory system A200 may transmit the alert signal Alert_n to the processor A201. The processor A201 may read the status information log written in the multi-purpose register MPR in response to the alert signal Alert_n. The processor A201 may read the status information STI written in the status area STA in response to the status information log. This may mean that the performance of the nonvolatile memory system is improved.

In example embodiments, the nonvolatile memory system A200 may transmit the alert signal Alert_n to the processor A201 when a cyclic redundancy check (CRC) error about the storage command CMD_S or the write data DATA_W occurs. In this case, the processor A201 may read an error log of the multi-purpose register MPR and may recognize that the CRC error occurs. In this case, the processor A201 may again provide the nonvolatile memory system A200 with the storage command CMD_S or the write data DATA_W from which the CRC error arises. That is, when the CRC error occurs or status information is updated, the nonvolatile memory system A200 may transmit the alert signal Alert_n to the processor A201, and the processor A201 may read information written in the multi-purpose register MPR in response to the alert signal Alert_n and may operate based on the read information.

Figure 14:
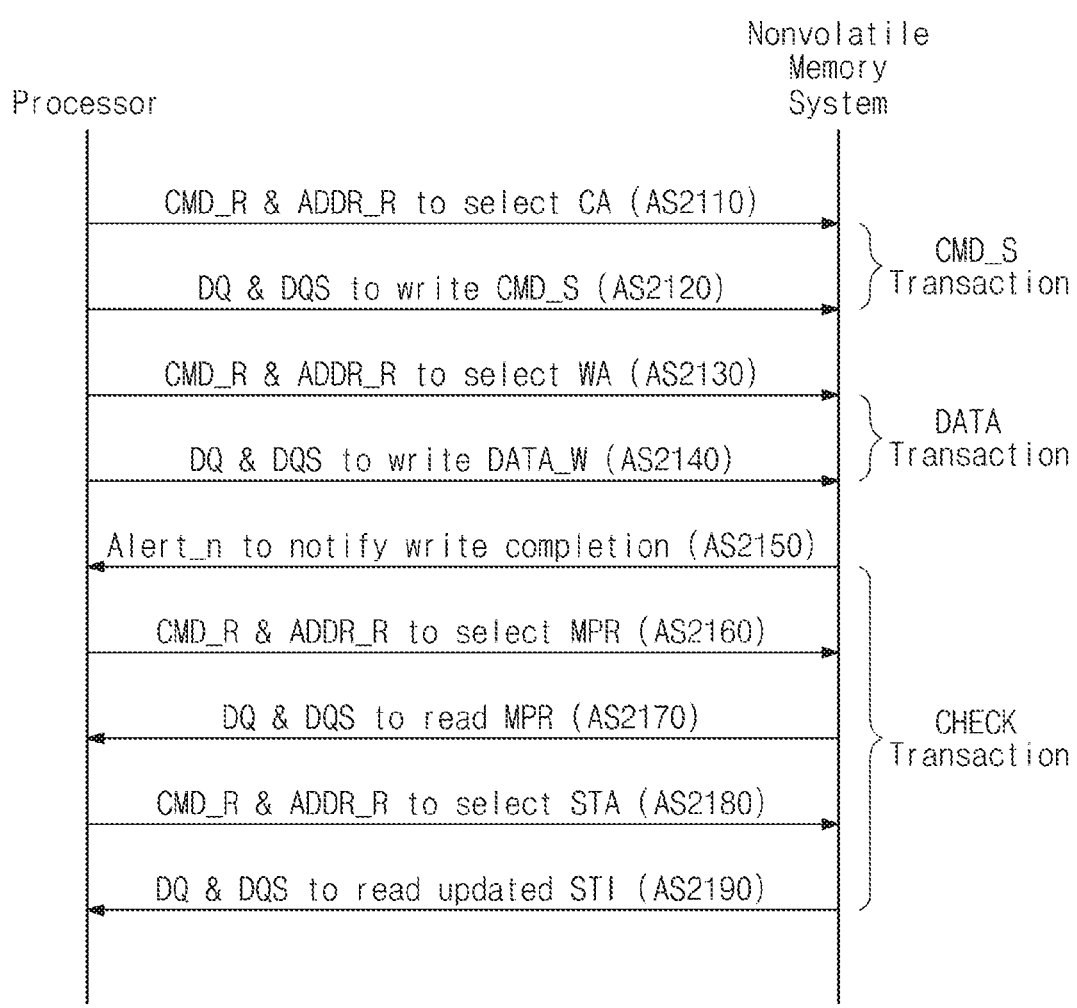
FIG. 14 is a flow chart for describing a write operation of a user system illustrated in FIG. 12.

FIG. 14 is a flow chart for describing a write operation of a user system illustrated in FIG. 12. Referring to FIGS. 12 and 14, the processor A201 and the nonvolatile memory system A200 of the user system A20 may perform operations of steps AS2110 to AS2150. Operations of steps AS2110 to AS2150 may be similar to those of steps AS1110 to AS1150 of FIG. 5, and a detailed description thereof is thus omitted.

In step AS2160, the processor A201 may provide the nonvolatile memory system A200 with a RAM address CMD_R and a RAM address ADDR_R for selecting the multi-purpose register MPR. For example, the nonvolatile memory system A200 may write a status information log at the multi-purpose register MPR after writing status information STI in a status area STA. The processor A201 may transmit a RAM command CMD_R and a RAM address ADDR_R to read the status information log written in the multi-purpose register MPR in response to the alert signal Alert_n. In example embodiments, the RAM command CMD_R may be a command for setting a mode register (not shown) included in the physical layer A211, and the RAM address ADDR_R may indicate a value of the mode register. In example embodiments, the multi-purpose register MPR may be accessed by setting the mode register by the RAM command CMD_R and the RAM address ADDR_R.

In step AS2170, the nonvolatile memory system A200 may transmit information of the multi-purpose register MPR to the processor A201. For example, the nonvolatile memory system A200 may provide the processor A201 with information written in the multi-purpose register MPR in response to the RAM command CMD_R and the RAM address ADDR_R of step AS2160. In example embodiments, the information written in the multi-purpose register MPR may include a status information log and may be provided to the processor A201 through the data signal DQ and the data strobe signal DQS.

The processor A201 may perform an operation of step AS2180 in response to the status information log. The nonvolatile memory system A200 may perform an operation of step AS2190. Operations of steps AS2180 and AS2190 may be similar to those of steps AS1160 and AS1170 of FIG. 4, and a detailed description thereof is thus omitted.

Figure 15:
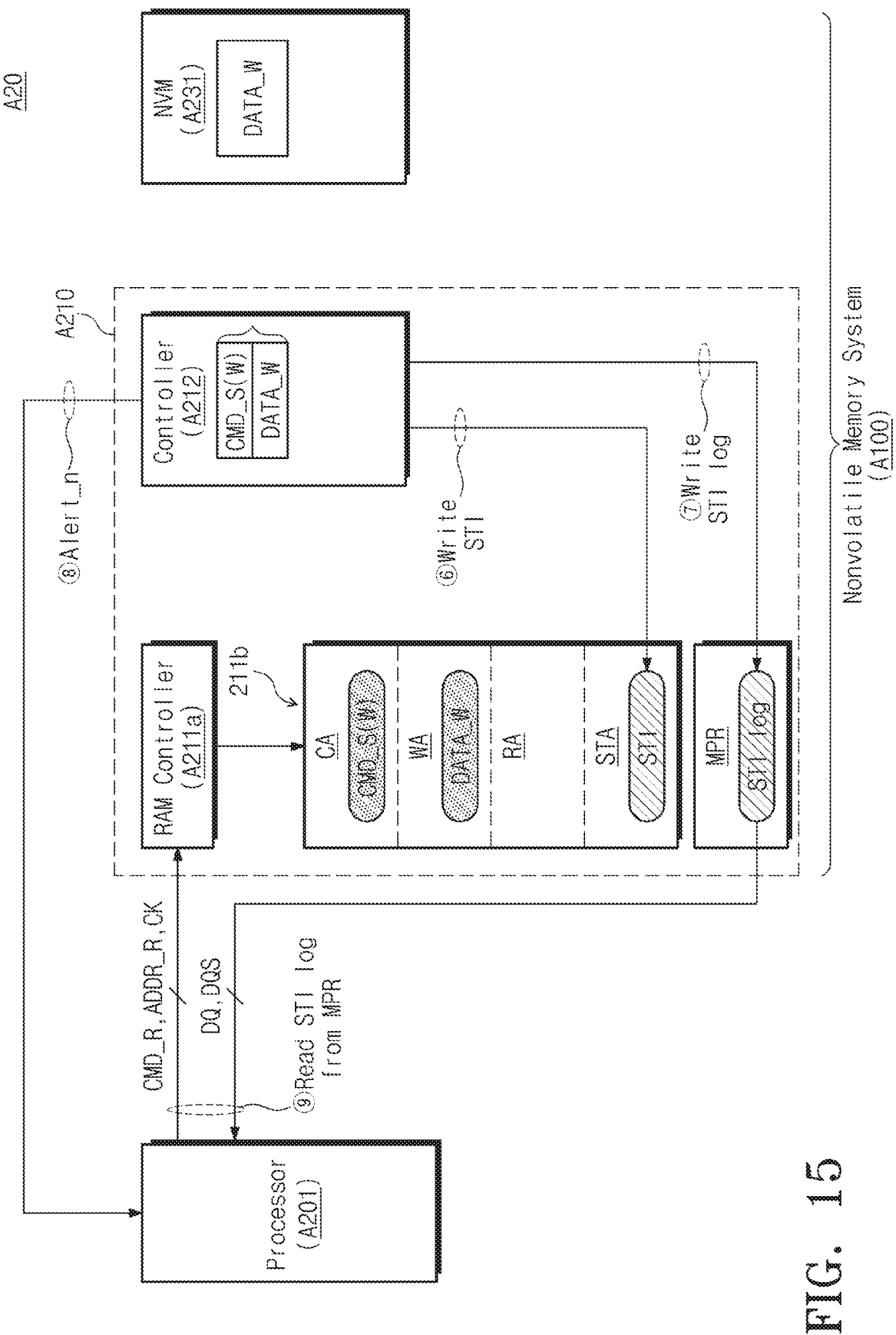
FIG. 15 is a diagram for describing steps S2160 and S2170 of FIG. 14 in detail.

FIG. 15 is a diagram for describing steps AS2160 and AS2170 of FIG. 14 in detail. For descriptive convenience, components which are unnecessary for a write operation of a user system A10 are omitted, and a description about duplicated components is also omitted.

Referring to FIG. 15, the processor A201 and the nonvolatile memory system A200 may perform the following operations described with reference to FIGS. 5 and 6: writing of a storage command (①), reading of a command area (②), writing of write data (③), reading of a write area (④), and programming of write data (⑤). Afterward, the controller A212 may write the status information STI, indicating that a write operation is completed, at the status area STA (⑥).

Afterwards, the controller A212 may write the status information log in the multi-purpose register MPR (⑦). For example, the controller A212 may write the status information log, indicating that the status information STI is written in the status area STA, at the multi-purpose register MPR. In example embodiments, although not shown, the status information log may be written in the multi-purpose register MPR by the RAM controller A211a or a separate logic circuit.

The controller A212 may transmit the alert signal Alert_n to the processor A201 (⑧). The processor A201 may read the status information log written in the multi-purpose register MPR in response to the alert signal Alert_n (⑨). For example, the processor A201 may provide the RAM controller A211a with a RAM command CMD_R, a RAM address ADDR_R, and a clock CK. At this time, the RAM command CMD_R may be a command for a mode register set (MRS) (not shown), and the RAM address ADDR_R may be a mode register set value. The RAM controller A211a may set the mode register in response to the received signals and may transmit information (i.e., the status information log), written in the multi-purpose register MPR, based on the set mode register. In example embodiments, the status information log may be provided to the processor A201 through the data signal DQ and the data strobe signal DQS.

As described with reference to FIG. 7, the processor A201 may read the status information STI of the status area STA in response to the status information log.

Figure 16:
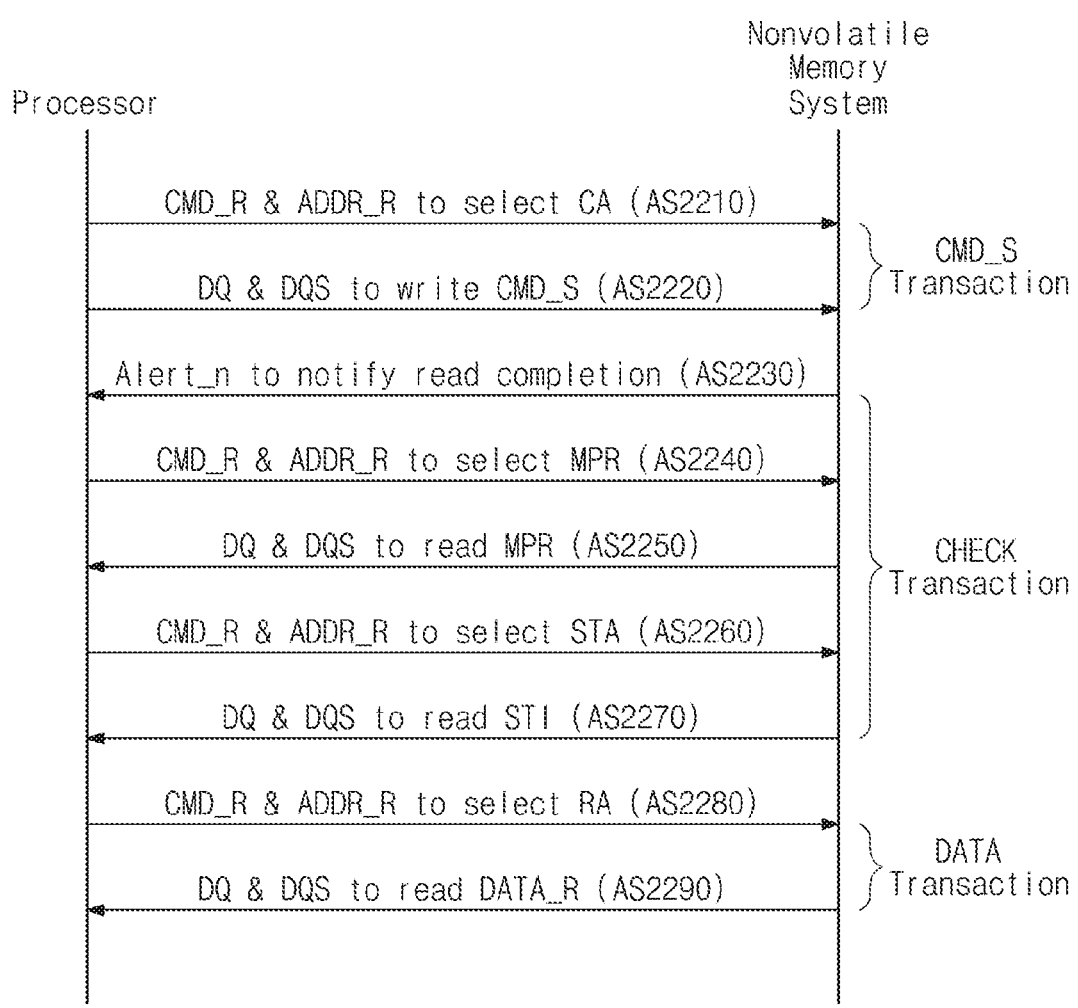
FIG. 16 is a flow chart for describing a read operation of a user system illustrated in FIG. 12.

FIG. 16 is a flow chart for describing a read operation of a user system illustrated in FIG. 12. Referring to FIGS. 12 and 16, the processor A201 and the nonvolatile memory system A200 of the user system A20 may perform operations of steps AS2210 to AS2290. Operations of steps AS2210 to AS2230 may be similar to those of steps AS1210 to AS1230 of FIG. 8, and a detailed description thereof is thus omitted.

Operations of steps AS2240 and AS2250 may be similar to those of steps AS2160 and AS2170 of FIG. 14, and a detailed description thereof is thus omitted. That is, the processor A201 may read the status information log from the multi-purpose register MPR through operations of steps AS2240 and AS2250.

Operations of steps AS2260 to AS2290 may be similar to those of steps AS1240 to AS1270 of FIG. 8, and a detailed description thereof is thus omitted.

According to an embodiment of the inventive concept, after completing an operation corresponding to a storage command CMD_S, the nonvolatile memory system A200 may write the status information STI in the status area STA and may write the status information log in the multi-purpose register MPR. Afterwards, the nonvolatile memory system A200 may transmit the alert signal Alert_n to the processor A201. The processor A201 may read the status information log from the multi-purpose register MPR in response to the alert signal Alert_n and may read the status information STI from the status area STA based on the status information log. This may mean that the performance of the nonvolatile memory system is improved.

According to an example embodiment of the inventive concept described with reference to FIGS. 12 to 16, the nonvolatile memory system A200 may write the status information log or a CRC error log in the multi-purpose register MPR and may then transmit the alert signal Alert_n to the processor A201. The processor A201 may read a log written in the multi-purpose register MPR in response to the alert signal Alert_n, may determine whether the read log indicates the update of the status information or a CRC error, and may operate according to the determination result. That is, the nonvolatile memory system A200 may notify the processor A201 of information about the update of the status information and occurrence of the CRC error using one alert signal Alert_n, thereby reducing a cost.

Figure 17:
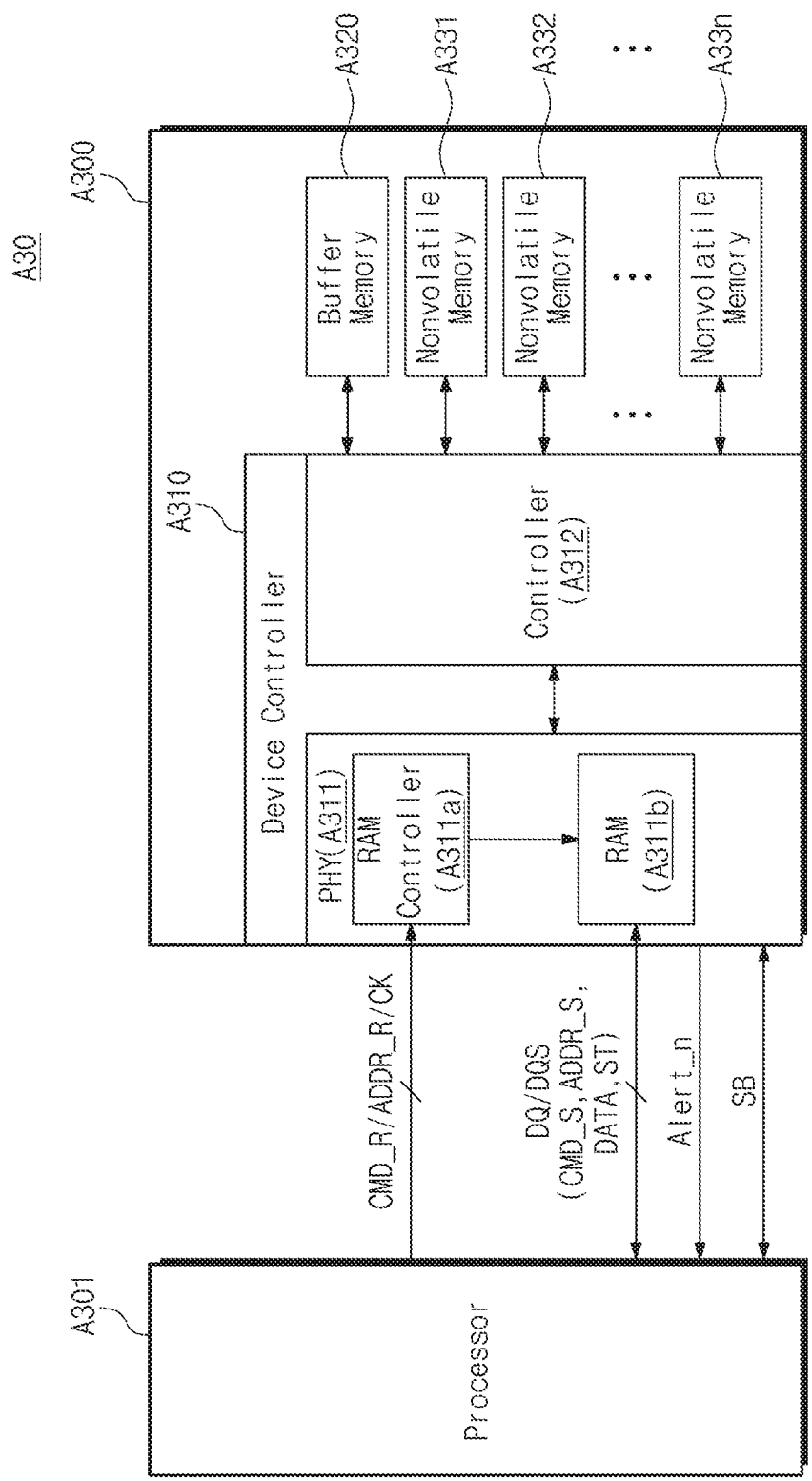
FIG. 17 is a block diagram illustrating a user system according to an example embodiment of the inventive concept.

FIG. 17 is a block diagram illustrating a user system according to an example embodiment of the inventive concept. Referring to FIG. 17, a nonvolatile memory system A30 may include a processor A301 and a nonvolatile memory system A300. The nonvolatile memory system A300 may include a device controller A310, a buffer memory A320, and a plurality of nonvolatile memory devices A321 to A32n. The device controller A310 may include a physical layer A311 and a controller A312. The physical layer circuit A311 may include a RAM controller A311a and a RAM A311b. Components of the user system A30 of FIG. 17 are described with reference to FIG. 1, and a detailed description thereof is thus omitted.

The processor A301 and the nonvolatile memory system A300 may communicate with each other based on a serial bus SB. In example embodiments, the serial bus SB may be a 2-line serial bus such as an inter-integrated circuit (I2C), a system management bus (SMBus), a power management bus (PMBus), an intelligent platform management interface (IPMI), a management component transport protocol (MCTP), or the like.

The nonvolatile memory system A300 may write status information STI at the RAM A311b after completing an operation corresponding to a storage command CMD_S. Afterwards, the nonvolatile memory system A300 may transmit an alert signal Alert_n to the processor A301.

At this time, unlike the processor A101 of FIG. 1 and the processor A201 of FIG. 12, the processor A301 may receive a status information log from the nonvolatile memory system A300 through the serial bus SB in response to the alert signal Alert_n. The processor A301 may read the status information STI written in the RAM A311b in response to the status information log.

The processor A301 may read the status information log through the serial bus SB in response to the alert signal Alert_n.

Figure 18:
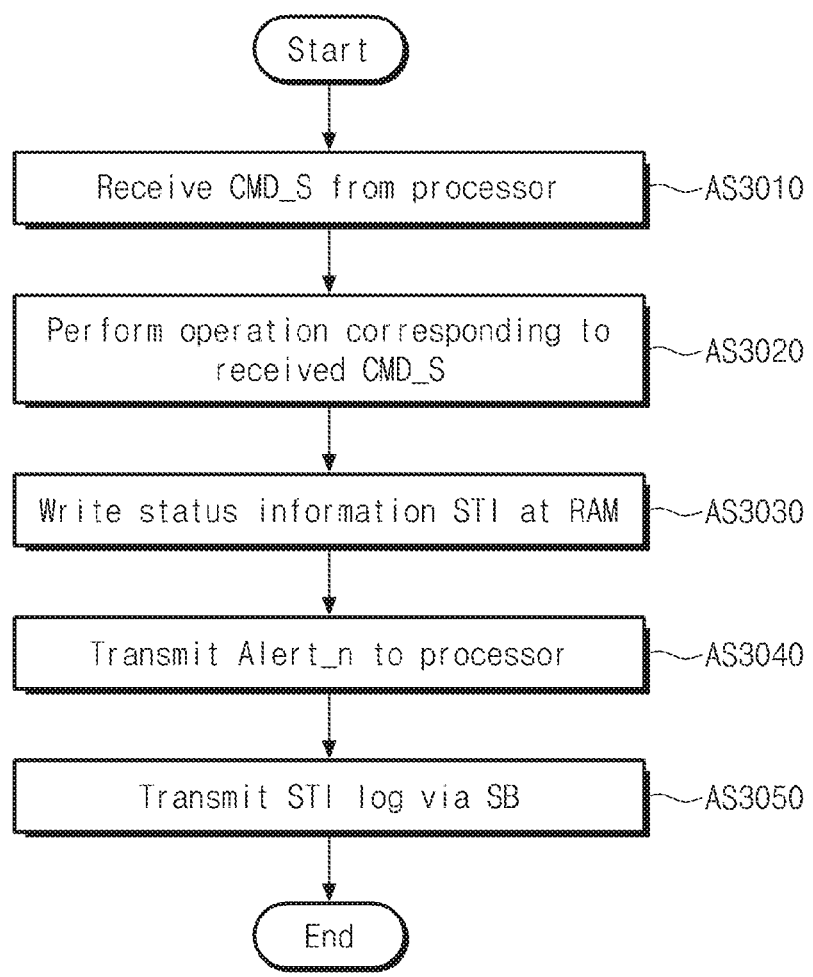
FIG. 18 is a flow chart illustrating an operation of a nonvolatile memory system of FIG. 17.

FIG. 18 is a flow chart illustrating an operation of a nonvolatile memory system of FIG. 17. Referring to FIGS. 17 and 18, the nonvolatile memory system A300 may perform operations of steps AS3010 to AS3040. Operations of steps AS3010 to AS3040 may be similar to those of steps AS1010 to AS1040 of FIG. 3, and a detailed description thereof is thus omitted.

In step AS3050, the nonvolatile memory system A300 may transmit the status information log to the processor A301 through the serial bus SB. For example, the processor A301 may provide the nonvolatile memory system A300 with a request for reading the status information log through the serial bus SB in response to the alert signal Alert_n of step AS3040. The nonvolatile memory system A300 may transmit the status information log to the processor A301 through the serial bus SB in response to the request.

Figure 19:
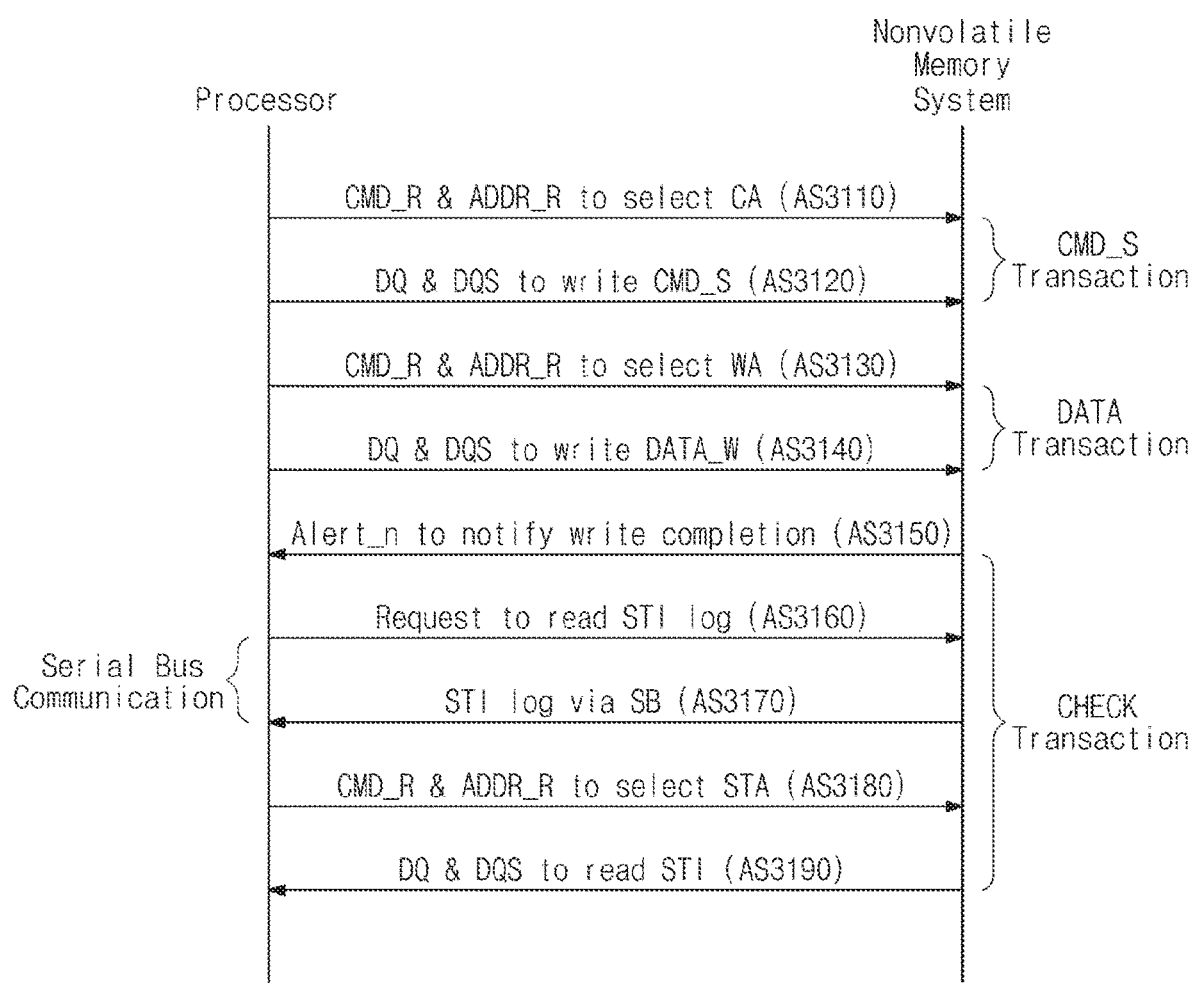
FIG. 19 is a flow chart for describing a write operation of a user system illustrated in FIG. 17 in detail.
Figure 20:
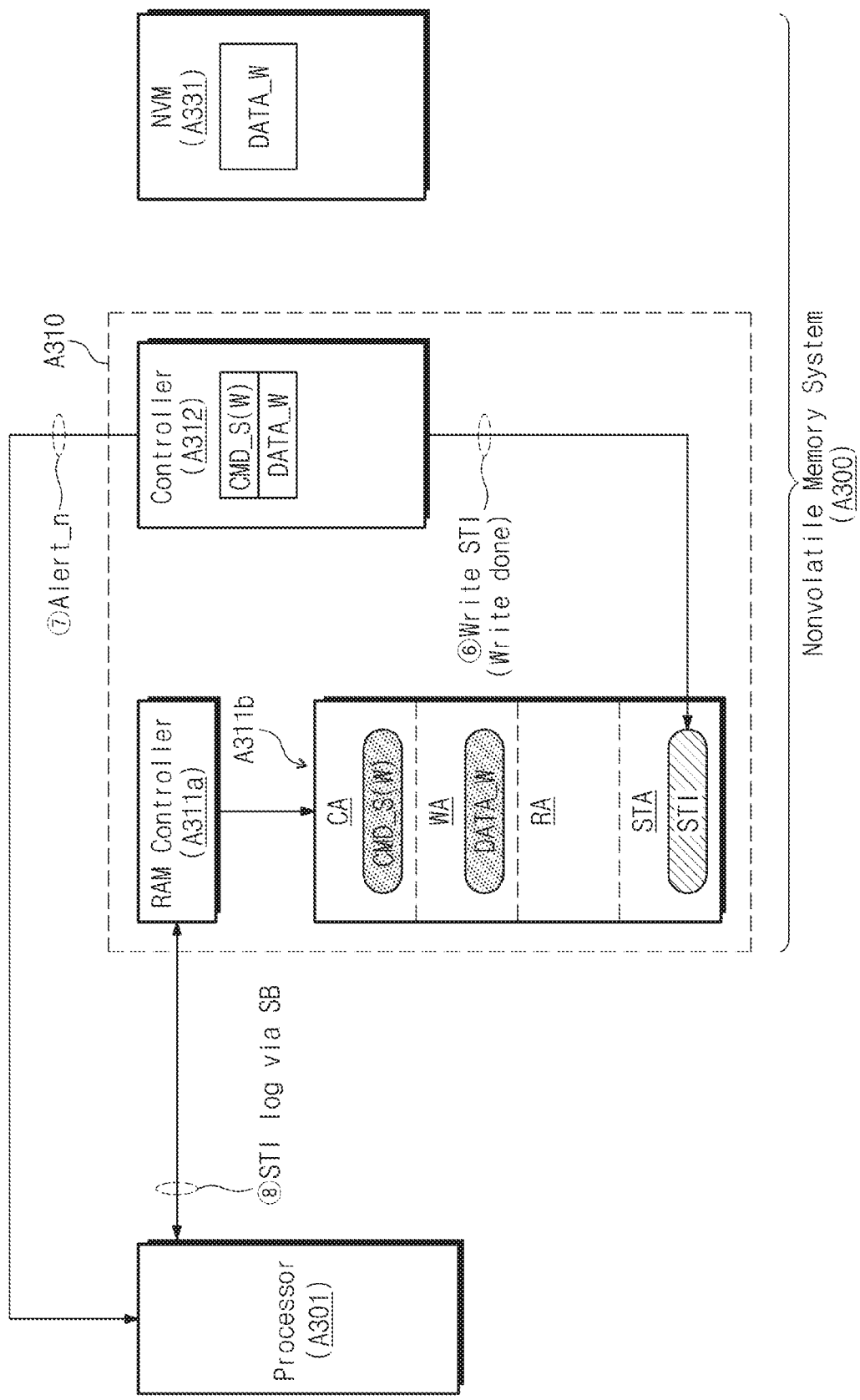
FIG. 20 is a diagram for describing operations of steps S3160 and S3170 of FIG. 19 in detail.

FIG. 19 is a flow chart for describing a write operation of a user system illustrated in FIG. 17 in detail. FIG. 20 is a diagram for describing operations of steps AS3160 and AS3170 of FIG. 19 in detail. Referring to FIGS. 17, 19 and 20, the processor A301 and the nonvolatile memory system A300 may perform operations of steps AS3110 to AS3150. Operations of steps AS3110 to AS3150 may be similar to those of steps AS1110 to AS1150 of FIG. 4, and a detailed description thereof is thus omitted.

In step AS3160, the processor A301 may provide the nonvolatile memory system A300 with a request for reading the status information log. In example embodiments, the request for reading the status information log may be transmitted through the serial bus SB. The request for reading the status information log may be a signal defined by the serial bus SB.

In step AS3170, the nonvolatile memory system A300 may transmit the status information log to the processor A301 in response to the request of step AS30160. In example embodiments, the status information log may be provided to the processor A301 through the serial bus SB.

For example, the nonvolatile memory system A300 and the nonvolatile memory system A300 may perform the following operations described with reference to FIGS. 5 and 6: writing of a storage command (①), reading of a command area (②), writing of write data (③), reading of a write area (④), and programming of write data (⑤). Afterward, as illustrated in FIG. 20, the controller A312 may write the status information STI at a status area STA (⑥). Afterwards, the controller A312 may transmit the alert signal Alert_n to the processor A301 (⑦).

The processor A301 may read the status information log from the nonvolatile memory system A300 in response to the alert signal Alert_n (⑧). The processor A301 may read the status information log from the nonvolatile memory system A300 through the serial bus SB.

The processor A301 and the nonvolatile memory system A300 may perform operations of steps AS3180 and AS3190. Operations of steps AS3180 and AS3190 may be similar to those of steps AS1160 and AS1170 of FIG. 1, and a detailed description thereof is thus omitted.

In example embodiments, the serial bus-based communication between the processor A301 and the nonvolatile memory system A300 may not be limited to a read operation about the status information log. In example embodiments, the processor A301 may request various information from the nonvolatile memory system A300 through the serial bus SB or may receive various information from the nonvolatile memory system A300 through the serial bus SB. Alternatively, the nonvolatile memory system A300 may request various information from the processor A301 through the serial bus SB or may receive various information from the processor A301 through the serial bus SB.

Figure 21:
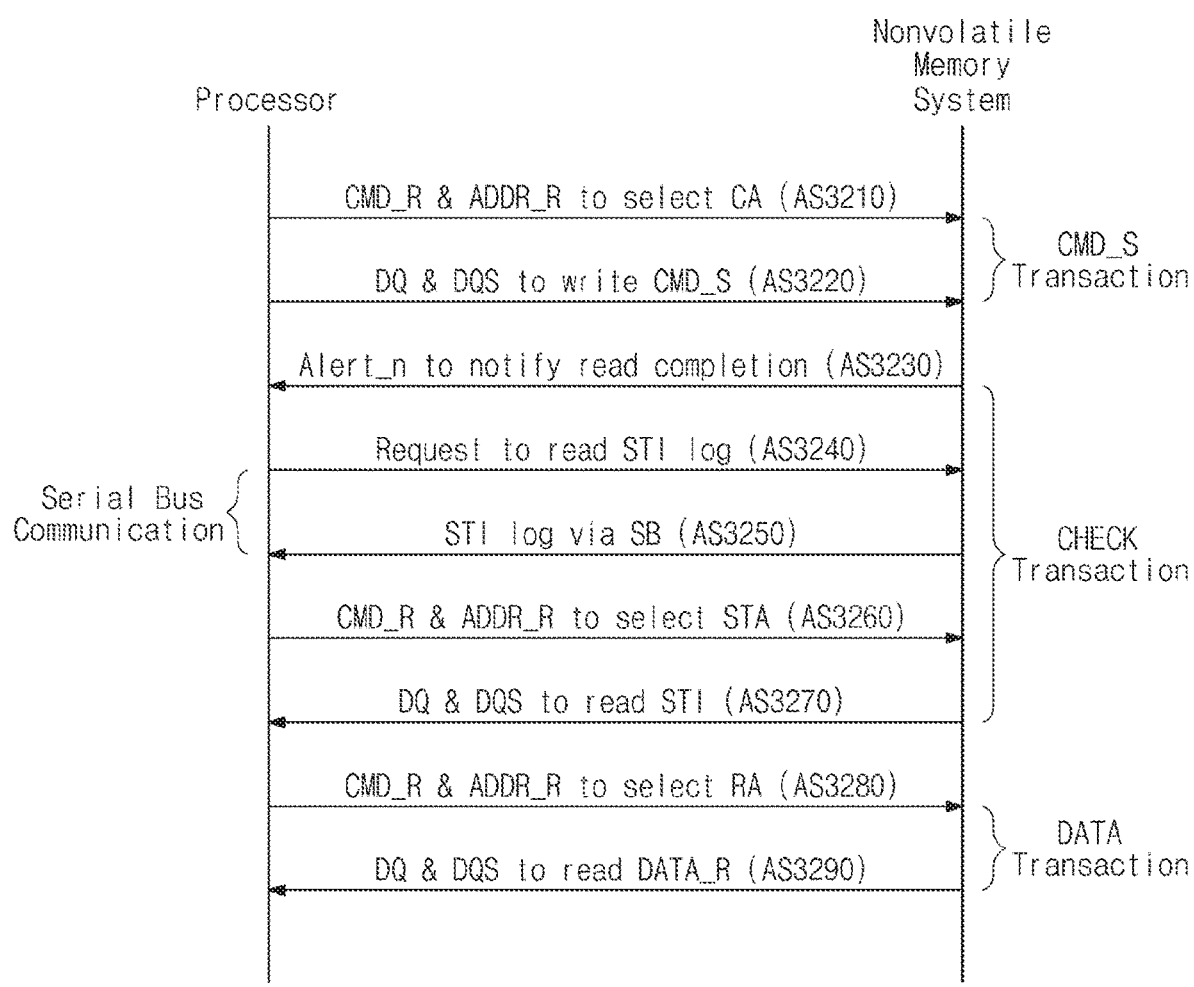
FIG. 21 is a flow chart for describing a read operation of a user system illustrated in FIG. 17 in detail.

FIG. 21 is a flow chart for describing a read operation of a user system illustrated in FIG. 17 in detail. Referring to FIGS. 17 and 21, the processor A301 and the nonvolatile memory system A300 may perform operations of steps AS3210 to AS3290. Operations of steps AS3210 to AS3230 may be similar to those of steps AS1210 to AS1230 of FIG. 8, operations of steps AS3240 to AS3250 may be similar to those of steps AS3160 to AS3170 of FIG. 19, and operations of steps AS3260 to AS3290 may be similar to those of steps AS2260 to AS2290 of FIG. 16. Thus, a detailed description thereof is omitted.

As described with reference to FIGS. 17 to 11, the nonvolatile memory system A300 may write the status information STI at the status area STA after completing an operation corresponding to the storage command CMD_S received from the processor A301. Afterwards, the nonvolatile memory system A300 may transmit an alert signal Alert_n to the processor A301. The processor A301 may receive the status information log from the nonvolatile memory system A300 through the serial bus SB in response to the alert signal Alert_n. This may mean that the performance of the nonvolatile memory system is improved.

Figure 22:
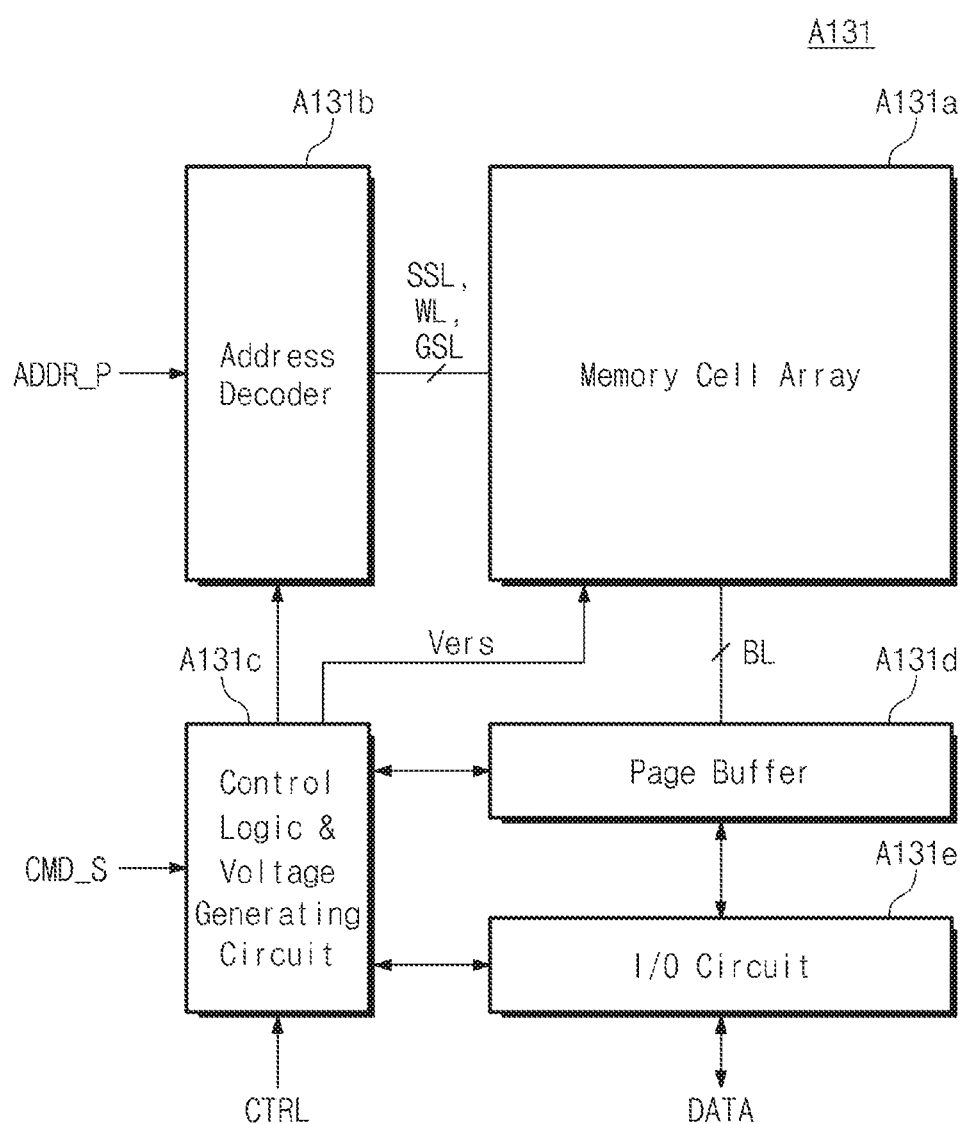
FIG. 22 is a block diagram schematically illustrating a first nonvolatile memory device of a plurality of nonvolatile memory devices of FIG. 1.

FIG. 22 is a block diagram schematically illustrating a first nonvolatile memory device of a plurality of nonvolatile memory devices of FIG. 1. Referring to FIG. 22, a nonvolatile memory device A131 may include a memory cell array A131a, an address decoder A131b, a control logic and voltage generator circuit A131c, a page buffer A131d, and an input/output circuit A131e.

The memory cell array A131a may include a plurality of memory cells. Each of the memory blocks may include a plurality of cell strings. Each of the cell strings may include a plurality of memory cells. The memory cells may be connected with a plurality of word lines WL. Each memory cell may be a single level cell (SLC) storing one bit or a multi-level cell (MLC) storing at least two bits.

The address decoder A131b may be connected with the memory cell array A131a through the word lines WL, string selection lines SSL, and ground selection lines GSL. The address decoder A131b may receive and decode a physical address ADD_P from an external device (e.g., the device controller A110) and may drive the word lines based on the decoding result. For example, the address decoder A131b may decode a physical address ADDR_P received from the external device, may select at least one of the word lines based on the decoded physical address ADDR_P, and may drive the selected word line. In example embodiments, the physical address ADDR_P may be a physical address which is obtained by converting a storage address ADDR_S (refer to FIGS. 1 and 2) and corresponds to a first nonvolatile memory A131. The above-described address conversion operation may be performed by the device controller A110 or by a flash translation layer (FTL) which is driven by the device controller A110.

The control logic and voltage generator circuit A131c may control the address decoder A131b, the page buffer A131d, and the input/output circuit A131e in response to a storage command CMD and a control logic CTRL from the external device. For example, the control logic and voltage generator circuit A131c may control other components in response to the signals CMD and CTRL such that data is stored in the memory cell array A131a. Alternatively, the control logic and voltage generator circuit A131c may control other components in response to the signals CMD and CTRL such that data stored in the memory cell array A131a is transmitted to the external device. In example embodiments, the storage command CMD_S received from the external device may be a modified version of the storage command CMD_S of FIG. 1. The control signal CTRL may be a signal which the device controller A110 provides to control the nonvolatile memory A131.

The control logic and voltage generator circuit A131c may generate various voltages required for the nonvolatile memory device A131 to operate. For example, the control logic and voltage generator circuit A131c may generate a plurality of program voltages, a plurality of pass voltages, a plurality of verification voltages, a plurality of selection read voltages, a plurality of non-selection read voltages, a plurality of erase voltages, and the like. The control logic and voltage generator circuit A131c may provide the generated voltages to the address decoder A131b or to a substrate of the memory cell array A131a.

The page buffer A131d may be connected to the memory cell array A131a through the bit lines BL. Under control of the control logic and voltage generator circuit A131c, the page buffer A131d may control the bit lines BL such that data provided from the input/output circuit A131e is stored in the memory cell array A131a. Under control of the control logic and voltage generator circuit A131c, the page buffer A131d may read data stored in the memory cell array A131a and may provide the read data to the input/output circuit A131e. For example, the page buffer A131d may be provided with data from the input/output circuit A131e by the page or may read data from the memory cell array A131a by the page.

The input/output circuit A131e may receive data from the external device and may transfer the received data to the page buffer A131d. Alternatively, the input/output circuit A131e may receive data from the page buffer A131d and may transmit the received data to the external device (e.g., the device controller A110). For example, the input/output circuit A131e may exchange data with the external device in synchronization with the control signal CTRL.

In example embodiments, each of the nonvolatile memory devices A131 to A13n may include a three-dimensional memory array. In example embodiments of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In example embodiments of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 23:
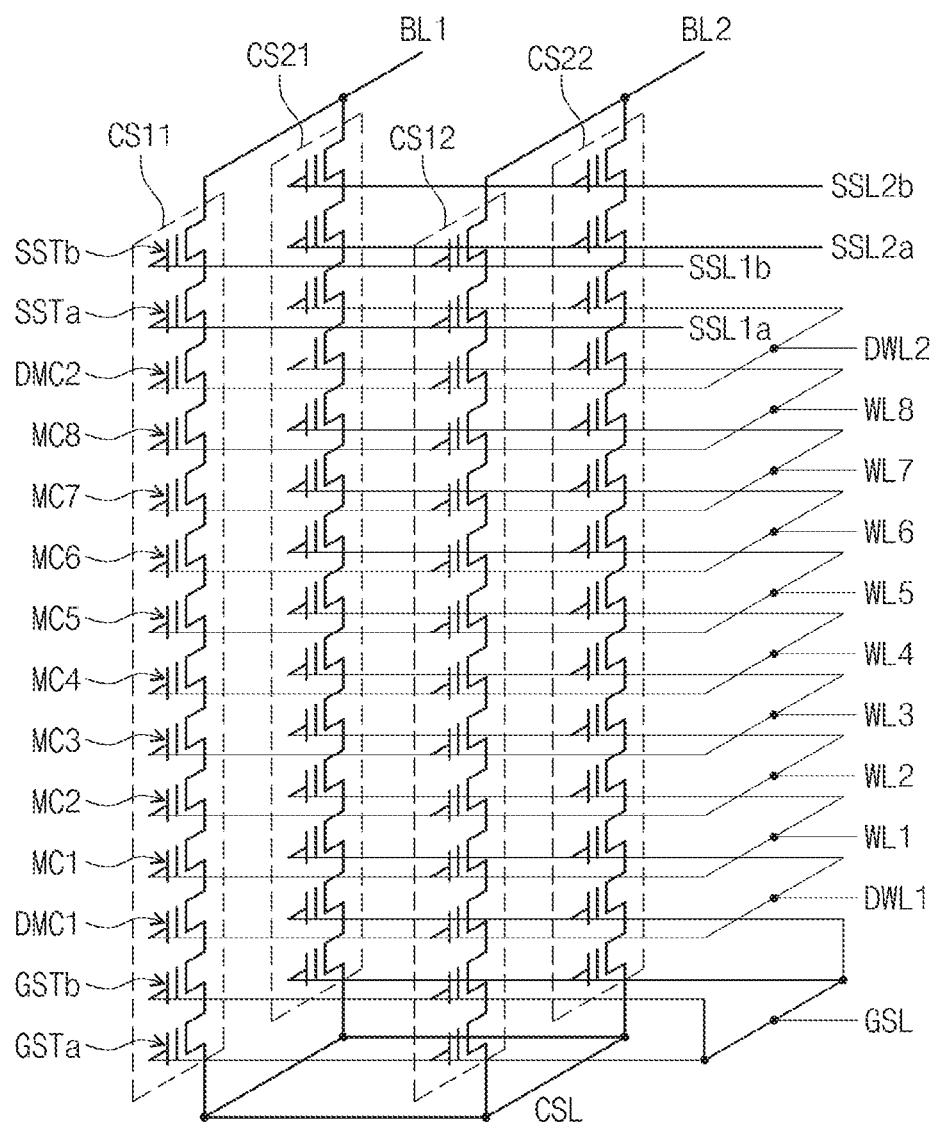
FIG. 23 is a circuit diagram schematically illustrating one of memory blocks included in a cell array of a nonvolatile memory device of FIG. 22.
Figure 23:
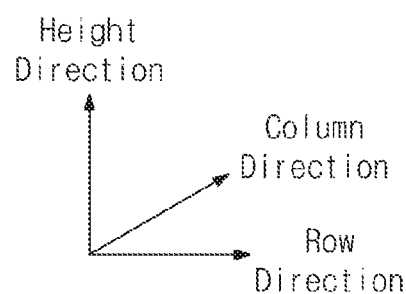

FIG. 23 is a circuit diagram schematically illustrating one of memory blocks included in a cell array of a nonvolatile memory device of FIG. 22. In FIG. 23, there is illustrated a first memory block BLK1 having a three-dimensional structure. However, the scope and spirit of the inventive concept is not limited thereto. Other memory blocks in each of nonvolatile memories A131 to A13n may have the same structure as the first memory block BLK1.

Referring to FIG. 23, the first memory block BLK1 may include a plurality of cell strings CS11 to CS12 and CS21 to CS22. The cell strings CS11, CS21, CS12, and CS22 may be arranged along a row direction and a column direction and may form rows and columns.

For example, the cell strings CS11 and CS12 may be connected to string selection lines SSL1a and SSL1b to form a first row. The cell strings CS21 and CS22 may be connected to string selection lines SSL2a and SSL2b to form a second row.

For example, the cell strings CS11 and CS21 may be connected to a first bit line BL1 to form a first column. The cell strings CS12 and CS22 may be connected to a second bit line BL2 to form a second column.

Each of the cell strings CS11, CS21, CS12, and CS22 may include a plurality of cell transistors. Each of the cell strings CS11, CS21, CS12, and CS22 may include string selection transistor SSTa and SSTb, a plurality of memory cells MC1 to MC8, ground selection transistors GSTa and GSTb, and dummy memory cells DMC1 and DMC2.

In example embodiments, each of the memory cells included in the cell strings CS11, CS12, CS21, and CS22 may be a charge trap flash (CTF) memory cell.

The memory cells MC1 to MC8 may be serially connected and may be stacked in a height direction being a direction perpendicular to a plane defined by a row direction and a column direction. The string selection transistors SSTa and SSTb may be serially connected and may be disposed between the memory cells MC1 to MC8 and a bit line BL. The ground selection transistors GSTa and GSTb may be serially connected and may be disposed between the memory cells MC1 to MC8 and a common source line CSL.

In example embodiments, a first dummy memory cell DMC1 may be disposed between the memory cells MC1 to MC8 and the ground selection transistors GSTa and GSTb. In example embodiments, a second dummy memory cell DMC2 may be disposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL.

In example embodiments, ground selection transistors in the same row may be connected to the same ground selection line, and ground selection transistors in different rows may be connected to different ground selection lines. For example, the first ground selection transistors GSTa of the cell strings CS11 and CS12 in the first row may be connected to a first ground selection line, and the first ground selection transistors GSTa of the cell strings CS21 and CS22 in the second row may be connected to a second ground selection line.

In example embodiments, although not shown, ground selection transistors placed at the same height from a substrate may be connected to the same ground selection line, and ground selection transistors placed at different heights therefrom may be connected to different ground selection lines. For example, the first ground selection transistors GSTa of the cell strings CS11, CS12, CS21, and CS22 may be connected to the first ground selection line, and the second ground selection transistors GSTb thereof may be connected to the second ground selection line.

Memory cells placed at the same height from the substrate (or the ground selection transistors GSTa and GSTb) may be connected in common to the same word line, and memory cells placed at different heights therefrom may be connected to different word lines. For example, the first to eighth memory cells MC8 of the cell strings CS11, CS12, CS21, and CS22 may be connected in common to first to eighth word lines WL1 to WL8, respectively.

String selection transistors, belonging to the same row, from among the first string selection transistors SSTa at the same height may be connected to the same string selection line, and string selection transistors belonging to different rows may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL1a.

Likewise, string selection transistors, belonging to the same row, from among the second string selection transistors SSTb at the same height may be connected to the same string selection line, and string selection transistors in different rows may be connected to different string selection lines. For example, the second string selection transistors SSTb of the cell strings CS11 and CS12 in the first row may be connected in common to a string selection line SSL1b, and the second string selection transistors SSTb of the cell strings CS21 and CS22 in the second row may be connected in common to a string selection line SSL2b.

Although not shown, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In example embodiments, dummy memory cells at the same height may be connected to the same dummy word line, and dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the first memory block BLK1, read and write operations may be performed by the row. For example, one row of the first memory block BLK1 may be selected by the string selection lines SSL1a, SSL1b, SSL2a, and SSL2b.

For example, the cell strings CS11 and CS12 of the first row may be connected to the first and second bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 of the second row may be connected to the first and second bit lines BL1 and BL2 when a turn-on voltage is supplied to the string selection lines SSL2a and SSL2b and a turn-off voltage is supplied to the string selection lines SSL1a and SSL1b. Memory cells, having the same height, from among memory cells of cell strings in a driven row may be selected by driving a word line. Read and write operations may be performed at selected memory cells. The selected memory cells may compose a physical page.

In the first memory block BLK1, the memory cells may be erased by the memory block or by the sub-block. When erasing is performed by the memory block, all memory cells MC of the first memory block BLK1 may be simultaneously erased according to one erase request. When erasing is performed by the sub-block, a part of memory cells MC in the first memory block BLK1 may be simultaneously erased according to one erase request, and the other thereof may be erase-inhibited. A low voltage (e.g., a ground voltage) may be supplied to a word line connected to the erased memory cells, and a word line connected to erase-inhibited memory cells may be floated.

The first memory block BLK1 illustrated in FIG. 23 may be an example. For example, the number of cell strings may increase or decrease, and the number of rows of cell strings and the number of columns of cell strings may increase or decrease according to the number of cell strings. In the first memory block BLK1, the number of cell strings (GST, MC, DMC, SST, or the like) may increase or decrease, and a height of the first memory block BLK1 may increase or decrease according to the number of cell strings (GST, MC, DMC, SST, or the like). Furthermore, the number of lines (GSL, WL, DWL, SSL, or the like) connected with cell transistors may increase or decrease according to the number of cell strings (GST, MC, DMC, SST, or the like).

Figure 24:
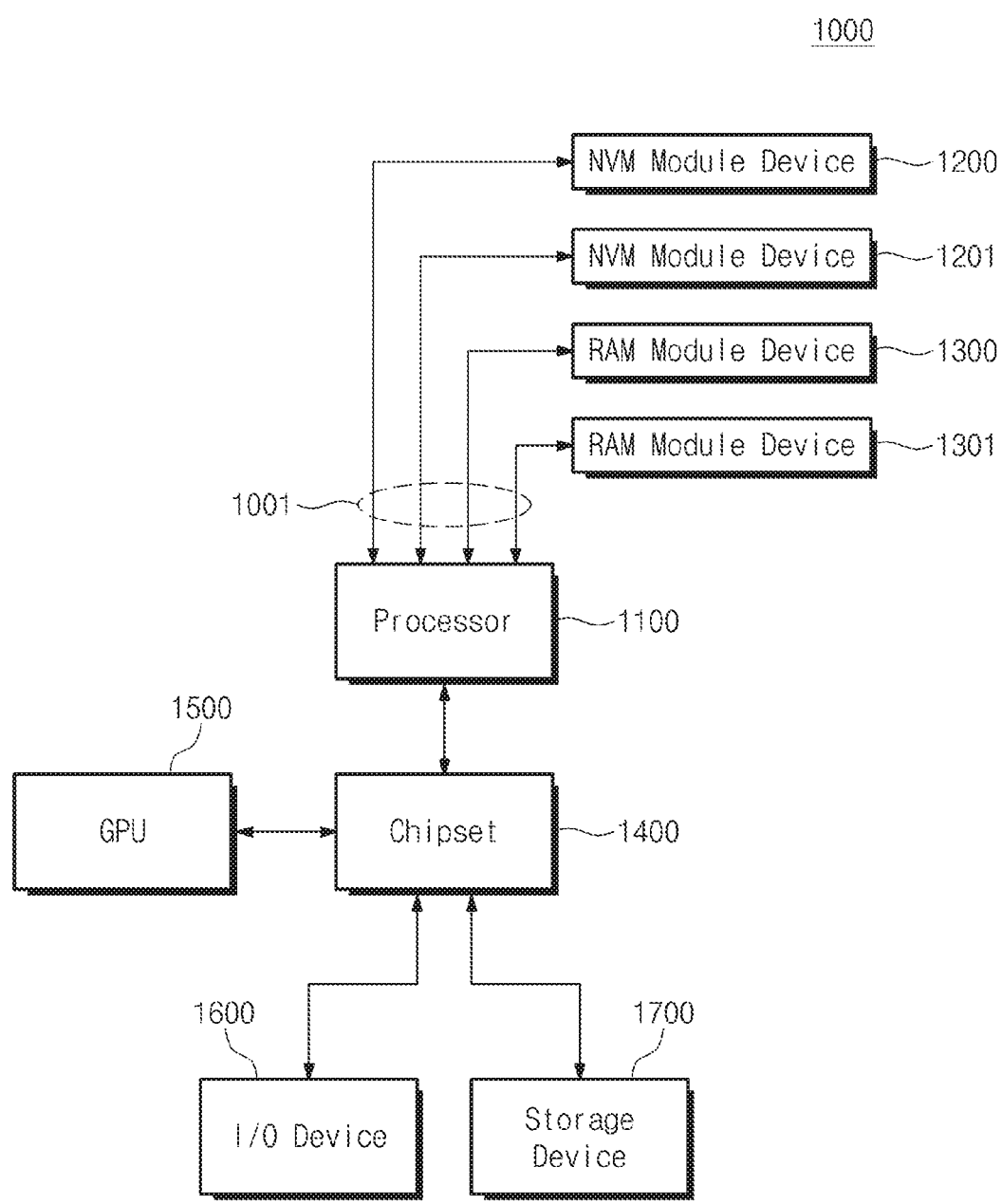
FIG. 24 is a block diagram schematically illustrating a computing system to which a nonvolatile memory system according to an embodiment of the inventive concept is applied.

FIG. 24 is a block diagram schematically illustrating a computing system to which a nonvolatile memory system according to an embodiment of the inventive concept is applied. Referring to FIG. 24, a computing device 1000 may include a processor 1100, nonvolatile memory modules 1200 and 1201, RAM modules 1300 and 1301, a chipset 1400, a graphic processing unit (GPU) 1500, an input/output device 1600, and a storage device 1700.

The processor 1100 may perform various operations of the computing system 1000. The processor 1100 may perform various operations to be executed on the computing system 1000.

The nonvolatile memory modules 1200 and 1201 and the RAM modules 1300 and 1301 may be directly connected with the processor 1100. For example, each of the nonvolatile memory modules 1200 and 1201 and the RAM modules 1300 and 1301 may have a form of a dual in-line memory module (DIMM) and may be mounted on a DIMM socket directly connected to the processor 1100 so as to communicate with the processor 1100. Each of the nonvolatile memory modules 1200 and 1201 may be one of the nonvolatile memory systems A100, A200, and A300 described with reference to FIGS. 1 to 23.

The nonvolatile memory modules 1200 and 1201 and the RAM modules 1300 and 1301 may communicate with the processor 1100 through the same interface 1001. For example, the nonvolatile memory modules 1200 and 1201 and the RAM modules 1300 and 1301 may communicate with each other through the DDR interface 1001. In example embodiments, the processor 1100 may use the memory modules 1300 and 1301 as a working memory, a buffer memory, or a cache memory of the computing system 1000.

The chipset 1400 may be electrically connected with the processor 1100 and may control hardware of the computing system 1000 under control of the processor 1100. For example, the chipset 1400 may be connected to each of the GPU 1500, the input/output device 1600, and the storage device 1700 through main buses and may perform a bridge operation with respect to the main buses.

The GPU 1500 may perform a set of arithmetic operations for outputting image data of the computing system 1000. In example embodiments, the GPU 1500 may be embedded in the processor 1100 in the form of a system on chip.

The input/output device 1600 may include various devices which receive data or commands from the computing system 1000 or may output data to an external device. For example, the input/output device 1600 may include user input devices such as a keyboard, a keypad, a button, a touch panel, a touch screen, a touch pad, a touch ball, a microphone, a gyroscope sensor, a vibration sensor, a piezoelectric sensor, and the like and user output devices such as a liquid crystal display (LCD), an organic light emitting diode (OLED) display device, an active matrix OLED (AMOLED) display device, a light emitting diode, a speaker, a motor, and the like.

The storage device 1700 may be used as a storage medium of the computing system 1000. The storage device 1600 may include mass storage media such as a hard disk drive (HDD), a solid state drive (SSD), a memory card, a memory stick, and the like.

In example embodiments, the nonvolatile memory modules 1200 and 1201 may be used as a storage medium of the computing system 1000 through the processor 1100. An interface 1001 between the nonvolatile memory modules 1200 and 1201 and the processor 1100 may be faster in speed than that between the storage device 1700 and the processor 1100. That is, the processor 1100 may use the nonvolatile memory modules 1200 and 1201 as a storage medium, thereby improving the performance of the computing system 3000.

Figure 25:
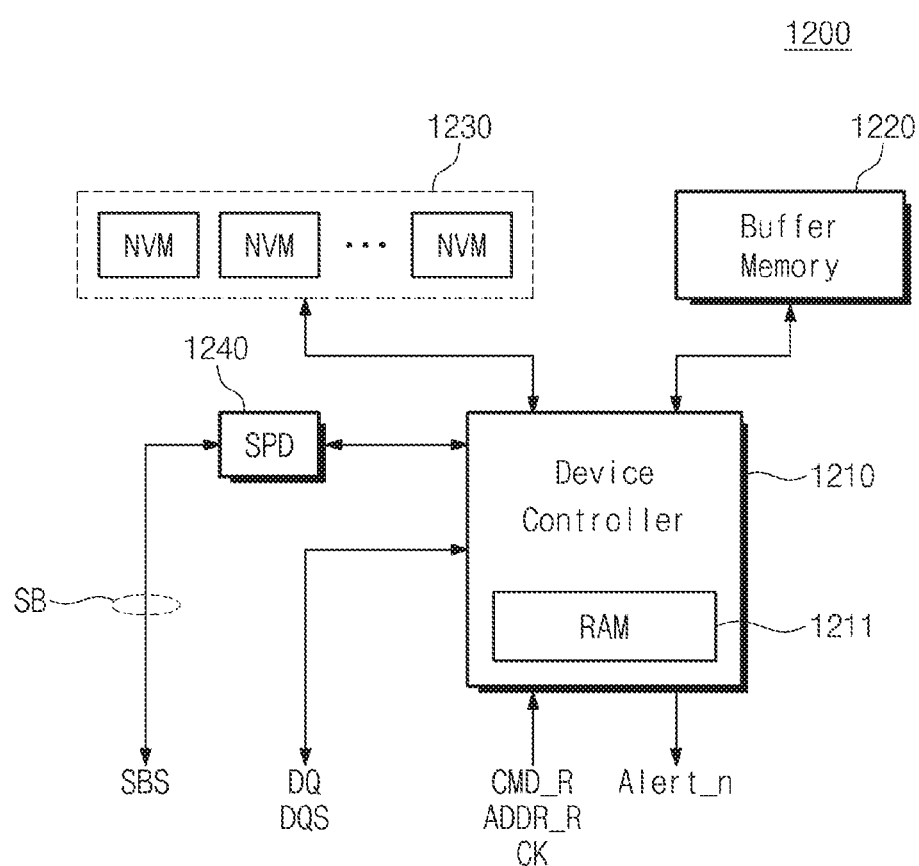
FIG. 25 is a block diagram schematically illustrating one of nonvolatile memory modules of FIG. 24.

FIG. 25 is a block diagram schematically illustrating one of nonvolatile memory modules of FIG. 24. In example embodiments, FIG. 25 is a block diagram of a nonvolatile memory module 1200 with a load reduced DIMM (LRDIMM) form. In example embodiments, the nonvolatile memory module 1200 illustrated in FIG. 25 may be of the form of a dual in-line memory module (DIMM) and may be mounted on a DIMM socket so as to communicate with the processor 1100.

Referring to FIG. 25, the nonvolatile memory module 1200 may include a device controller 1210, a buffer memory 1220, a nonvolatile memory device 1230, and a serial presence detect chip (SPD) 1240. The device controller 1210 may include a RAM 1211. In example embodiments, the nonvolatile memory device 1230 may include a plurality of nonvolatile memories NVM. Each of the nonvolatile memories included in the nonvolatile memory device 1230 may be implemented with a chip, a package, a device, or a module. Alternatively, the nonvolatile memory device 1230 may be implemented with a chip or a package.

In example embodiments, the device controller 1210, the RAM 1211, the buffer memory 1220, and the nonvolatile memory device 1230 may be the same as or equal to a device controller, a RAM, a buffer memory, and a plurality of nonvolatile memories described with reference to FIGS. 1 to 23. That is, the nonvolatile memory module 1200 may be one of nonvolatile memory systems A100, A200, and A300 of FIGS. 1 to 23.

In example embodiments, the device controller 1210 may transmit and receive a plurality of data signals DQ and a plurality of data strobe signals DQS to and from the processor 1100 and may receive a RAM command CMD_R, a RAM address ADDR_R, and a clock CK through separate signal lines. In example embodiments, the device controller 1210 may provide the processor 1100 with an alert signal Alert_n based on an operating method described with reference to FIGS. 1 to 23. In example embodiments, the processor 1101 may read the status information STI stored in the RAM 1211 in response to the alert signal Alert_n.

The SPD 1240 may be a programmable read only memory device (e.g., EEPROM). The SPD 1240 may include initial information or device information of the nonvolatile memory module 1200. In example embodiments, the SPD 1240 may include initial information or device information such as a module type, a module configuration, a storage capacity, a module kind, an execution environment, and the like of the nonvolatile memory module 1200. When a computing system including the nonvolatile memory module 1200 is booted up, the processor 1100 of the computing system may read the SPD 1240 and may recognize the nonvolatile memory module 1200 based on the read result. The processor 1100 may use the nonvolatile memory module 3200 as a storage medium based on the SPD 1240.

In example embodiments, the SPD 1240 may communicate with the processor 1100 through a serial bus SB. The processor 1100 may exchange a signal SBS with the SPD 1240 through the serial bus. In example embodiments, the SPD 1240 may communicate with the device controller 1210 through the serial bus. In example embodiments, the serial bus SB may include at least one of 2-line serial buses such as an inter-integrated circuit (I2C), a system management bus (SMBus), a power management bus (PMBus), an intelligent platform management interface (IPMI), a management component transport protocol (MCTP), or the like.

Figure 26:
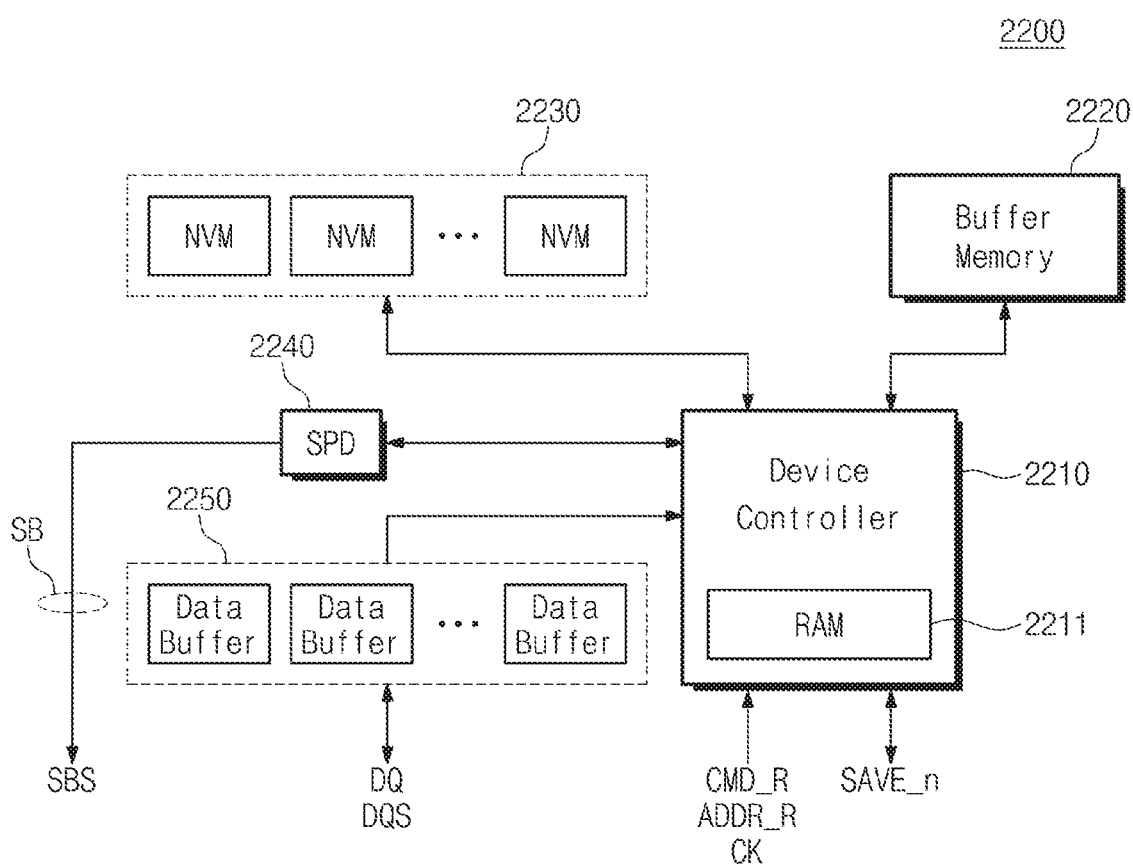
FIG. 26 is a block diagram schematically illustrating one of nonvolatile memory modules of FIG. 24.

FIG. 26 is a block diagram schematically illustrating one of nonvolatile memory modules of FIG. 24. In example embodiments, FIG. 26 is a block diagram of a nonvolatile memory module 2200 with a registered DIMM (RDIMM) form. In example embodiments, the nonvolatile memory module 2200 illustrated in FIG. 26 may be of the form of a dual in-line memory module (DIMM) and may be mounted on a DIMM socket so as to communicate with the processor 1100.

Referring to FIG. 26, the nonvolatile memory module 2200 may include a device controller 2210, a buffer memory 2220, a nonvolatile memory device 2230, a serial presence detect chip (SPD) 2240, and a data buffer circuit 2250. The device controller 2210 may include a RAM 2211. The device controller 2210, the RAM 2211, the nonvolatile memory device 2230, and the SPD 2240 are described with reference to FIGS. 1 and 15, and a detailed description thereof is thus omitted.

The data buffer circuit 2250 may receive information or data from the processor 1100 (refer to FIG. 24) through a data signal DQ and a data strobe signal DQS and may transfer the received information or data to the device controller 2250. Alternatively, the data buffer circuit 2250 may receive information or data from the device controller 2210 and may transfer the received information or data to the processor 1100 through a data signal DQ and a data strobe signal DQS.

In example embodiments, the data buffer circuit 2250 may include a plurality of data buffers. Each of the data buffers may exchange the data signal DQ and the data strobe signal DQS with the processor 1100. Alternatively, each of the data buffers may exchange a signal with the device controller 2210. In example embodiments, each of the data buffers may operate according to control of the device controller 2210.

In example embodiments, the device controller 2210 may provide the processor 1100 with an alert signal Alert_n based on an operating method described with reference to FIGS. 1 to 23.

Figure 27:
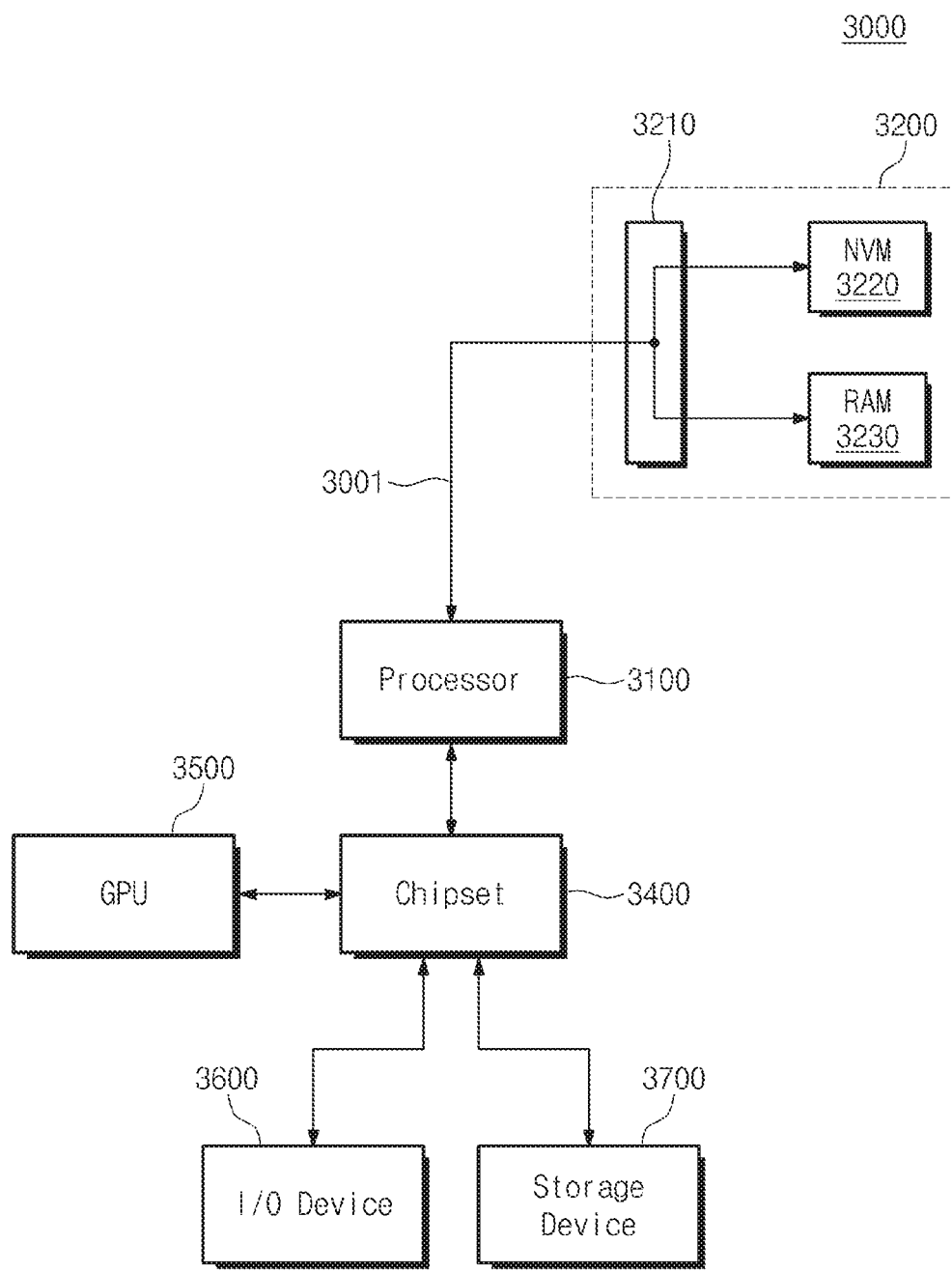
FIG. 27 is a block diagram schematically illustrating a computing system to which a nonvolatile memory module according to the inventive concept is applied.

FIG. 27 is a block diagram schematically illustrating a computing system to which a nonvolatile memory module according to the inventive concept is applied. For descriptive convenience, a detailed description about above-described components may be omitted. Referring to FIG. 27, a computing system 3000 may include a processor 3100, a nonvolatile memory module 3200, a chipset 3400, a graphic processing unit (GPU) 3500, an input/output device 3600, and a storage device 3700. The processor 3100, the chipset 3400, the GPU 3500, the input/output device 3600, and the storage device 3700 are substantially the same as those of FIG. 24, and a detailed description thereof is thus omitted.

The nonvolatile memory module 3200 may be directly connected to the processor 3100. In example embodiments, the nonvolatile memory module 3200 may be of the form of a dual in-line memory module (DIMM) and may be mounted on a DIMM socket so as to communicate with the processor 3100.

The nonvolatile memory module 3200 may include a control circuit 3210, a nonvolatile memory device 3220, and a RAM device 3230. Unlike the nonvolatile memory module 1200 and 2200 of FIGS. 24 to 26, the processor 3100 may access the nonvolatile memory device 3220 and the RAM device 3230 of the nonvolatile memory module 3200, respectively. In detail, the control circuit 3210 may store received data in the nonvolatile memory device 3210 or the RAM device 3220 in response to control of the processor 3100. Alternatively, under control of the processor 3100, the control circuit 3210 may transmit data stored in the nonvolatile memory device 3210 to the processor 3100 or data stored in the RAM device 3220 to the processor 3100. That is, the processor 3100 may respectively recognize the nonvolatile memory device 3210 and the RAM device 3220 included in the nonvolatile memory module 3200. The processor 3100 may store data in the nonvolatile memory device 3220 of the nonvolatile memory module 3200 or may read data therefrom. Alternatively, the processor 3100 may store data in the RAM device 3230 or may read data therefrom.

In example embodiments, the processor 3100 may use the nonvolatile memory device 3220 of the nonvolatile memory module 3200 as a storage medium of the computing system 3000 and may use the RAM device 3220 of the nonvolatile memory module 3200 as a main memory of the computing system 3000. That is, the processor 3100 may selectively access the nonvolatile memory device or the RAM device included in a memory module which is mounted on a DIMM socket.

In example embodiments, the processor 3100 may communicate with the nonvolatile memory module 3200 through a DDR interface 3001.

Figure 28:
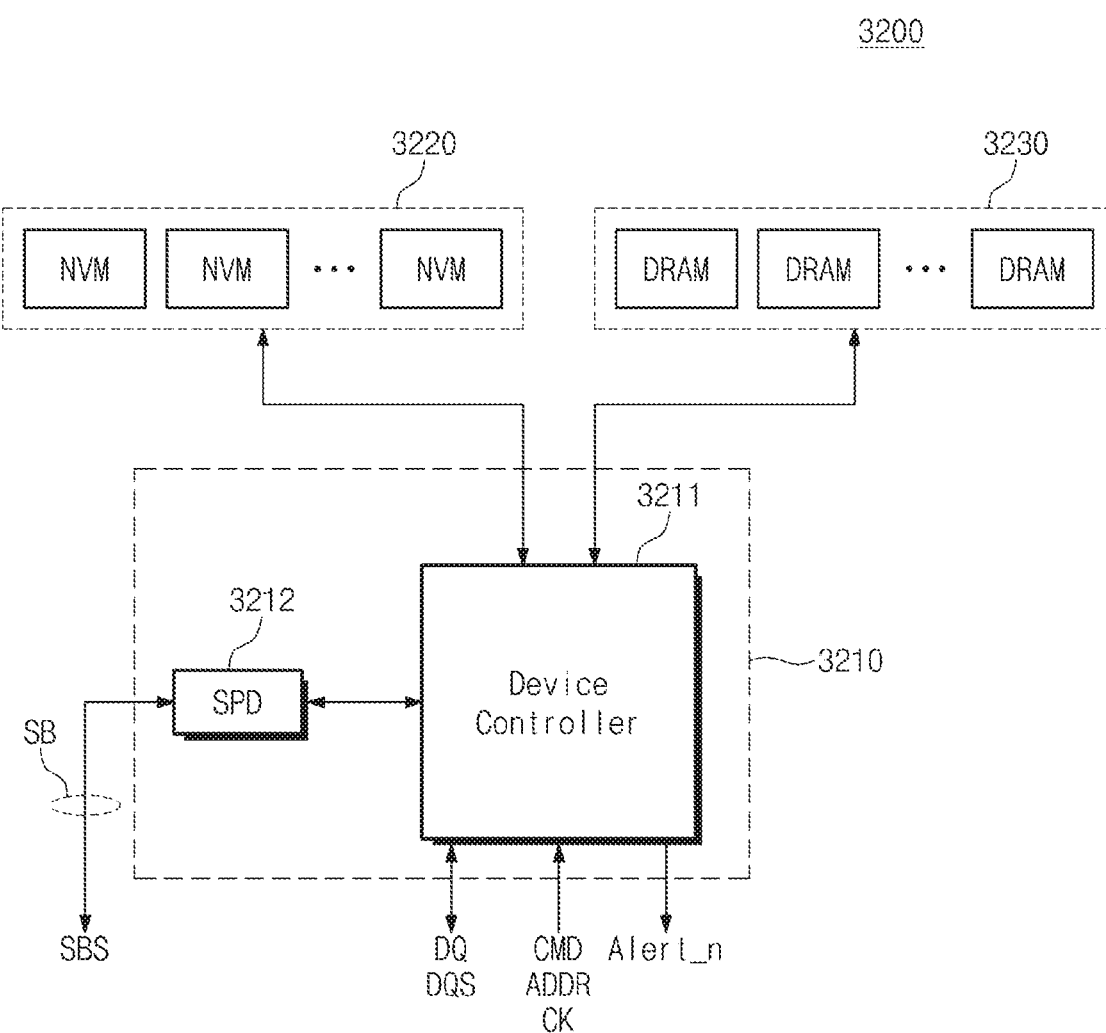
FIG. 28 is a block diagram schematically illustrating a nonvolatile memory module illustrated in FIG. 27.

FIG. 28 is a block diagram schematically illustrating a nonvolatile memory module illustrated in FIG. 27. Referring to FIGS. 27 and 28, the nonvolatile memory module 3200 may include a control circuit 3210, a nonvolatile memory device 3220, and a RAM device 3230. In example embodiments, the nonvolatile memory device 3220 may include a plurality of nonvolatile memories NVM, and the RAM device 3230 may include a plurality of DRAMs. In example embodiments, the nonvolatile memories may be used as storage of the computing system 3000 through the processor 3100. In example embodiments, each of the nonvolatile memories may include nonvolatile memory elements such as EEPROM, NAND flash memory, PRAM, resistive RAM (ReRAM), FRAM, STT-MRAM, and the like.

The DRAMs may be used as a main memory of the computing system 3000 through the processor 3100. In example embodiments, the RAM device 3230 may include random access memory elements such as DRAM, SRAM, SDRAM, PRAM, ReRAM, FRAM, MRAM, and the like.

The control circuit 3210 may include a device controller 3211 and a SPD chip 3212. The device controller 3211 may receive a command CMD, an address ADDR, and a clock CK from the processor 3100. The device controller 3211 may selectively store data, received through the data signal DQ and the data strobe signal DQS, in the nonvolatile memory device 3220 or the RAM device 3230 in response to signals received from the processor 3100. Alternatively, the device controller 3211 may selectively transfer data, stored in the nonvolatile memory device 3220 or the RAM device 3230, to the processor 3100 through the data signal DQ and the data strobe signal DQS in response to signals received from the processor 3100.

In example embodiments, the processor 3100 may selectively access the nonvolatile memory device 3220 or the RAM device 3230 through a command CMD, an address ADDR, or a separate signal or separate information. That is, the processor 3100 may selectively access the nonvolatile memory device 3220 or the RAM device 3230 included in the nonvolatile memory module 3200. In example embodiments, the device controller 3211 may provide the processor 3100 with an alert signal Alert_n based on an operating method described with reference to FIGS. 1 to 23.

Figure 29:
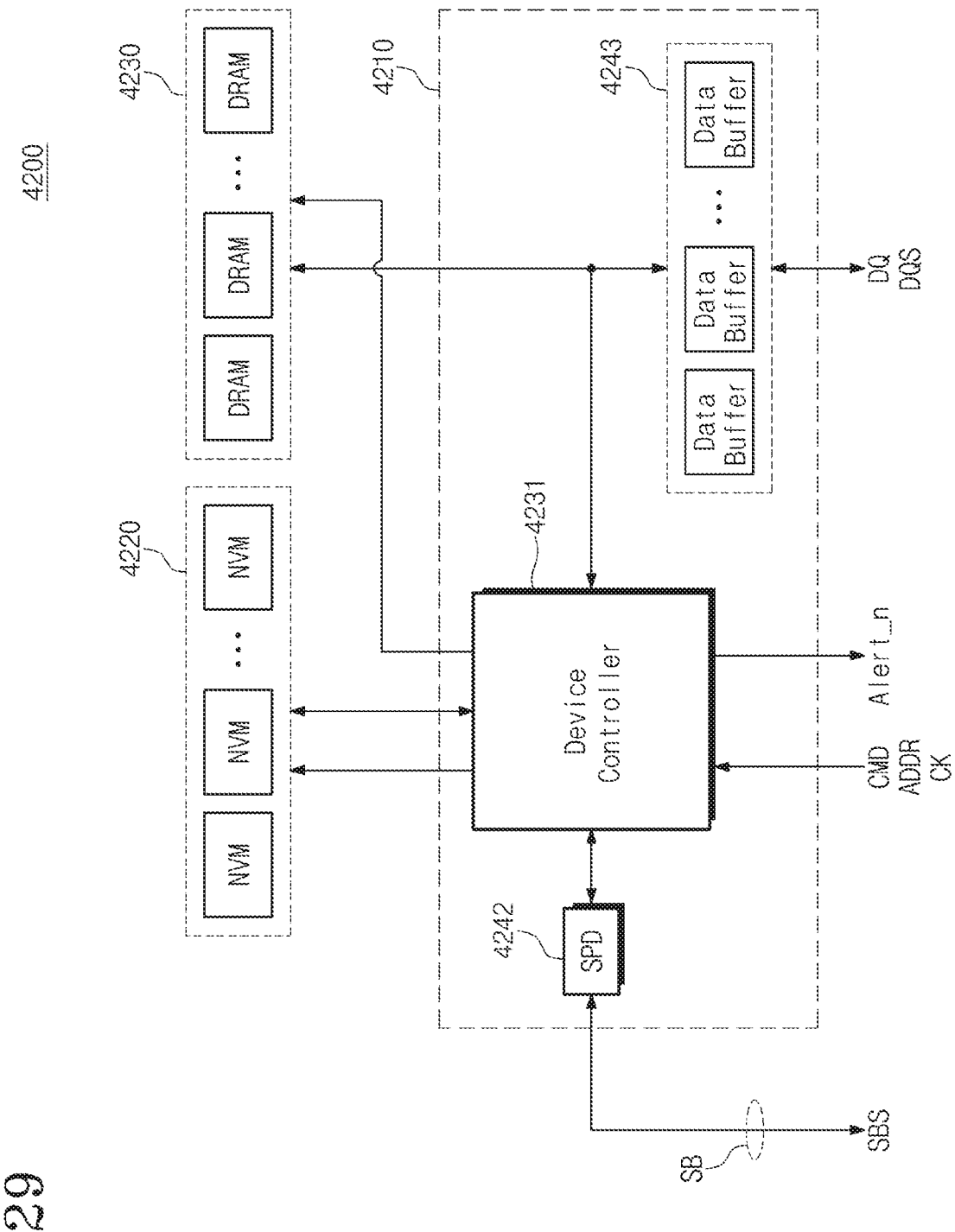
FIG. 29 is a block diagram schematically illustrating a nonvolatile memory module illustrated in FIG. 27.

FIG. 29 is a block diagram schematically illustrating a nonvolatile memory module illustrated in FIG. 27. In example embodiments, a nonvolatile memory module 4200 illustrated in FIG. 29 may be of the form of a dual in-line memory module (DIMM) and may be mounted on a DIMM socket so as to communicate with the processor 3100.

Referring to FIGS. 27 and 29, the nonvolatile memory module 4200 may include a control circuit 4210, a nonvolatile memory device 4220, and a RAM device 4230. The control circuit 4210 may include a device controller 4231, an SPD 4242, and a data buffer circuit 4243.

The device controller 4231 may receive a command CMD, an address ADDR, and a clock CK from the processor 3100. The device controller 4231 may control the nonvolatile memory device 4220 or the RAM device 4230 in response to received signals. For example, as described with reference to FIG. 28, the processor 3100 may selectively access the nonvolatile memory device 4220 or the RAM device 4230. The device controller 4231 may control the nonvolatile memory device 4220 or the RAM device 4230 under control of the processor 3100.

The data buffer circuit 4243 may receive the data signal DQ and the data strobe signal DQS from the processor 3100 and may provide the received signals to the device controller 4231 and the RAM device 4230. Alternatively, the data buffer circuit 4243 may provide data, received from the device controller 4231 or the RAM device 4230, to the processor 3100 through the data signal DQ and the data strobe signal DQS.

In example embodiments, in the case where the processor 3100 stores data in the nonvolatile memory device 4220, data received through the data signal DQ and the data strobe signal DQS may be provided to the device controller 4231, and the device controller 4231 may process the received data and may provide the processed data to the nonvolatile memory device 4220. Alternatively, in the case where the processor 3100 reads data stored in the nonvolatile memory device 4220, the data buffer circuit 4243 may provide data provided from the device controller 4231 to the processor 3100 through the data signal DQ and the data strobe signal DQS. In the case where the processor 3100 stores data in the RAM device 4230, data which the data buffer circuit 4243 receives may be provided to the RAM device 4230, and the device controller 4231 may transfer received command CMD, addresses ADDR, and clock CK to the RAM device 4230. Alternatively, when the processor 3100 reads data stored in the RAM device 4230, the device controller 4231 may transfer the received command CMD, addresses ADDR, and clock CK to the RAM device 4230, and the RAM device 4230 may provide data to the data buffer circuit 4243 in response to the transferred signals. At this time, the data buffer circuit 4243 may provide data to the processor 3100 through the data signal DQ and the data strobe signal DQS.

In example embodiments, the device controller 4231 may provide the processor 3100 with an alert signal Alert_n based on an operating method described with reference to FIGS. 1 to 23.

Figure 30:
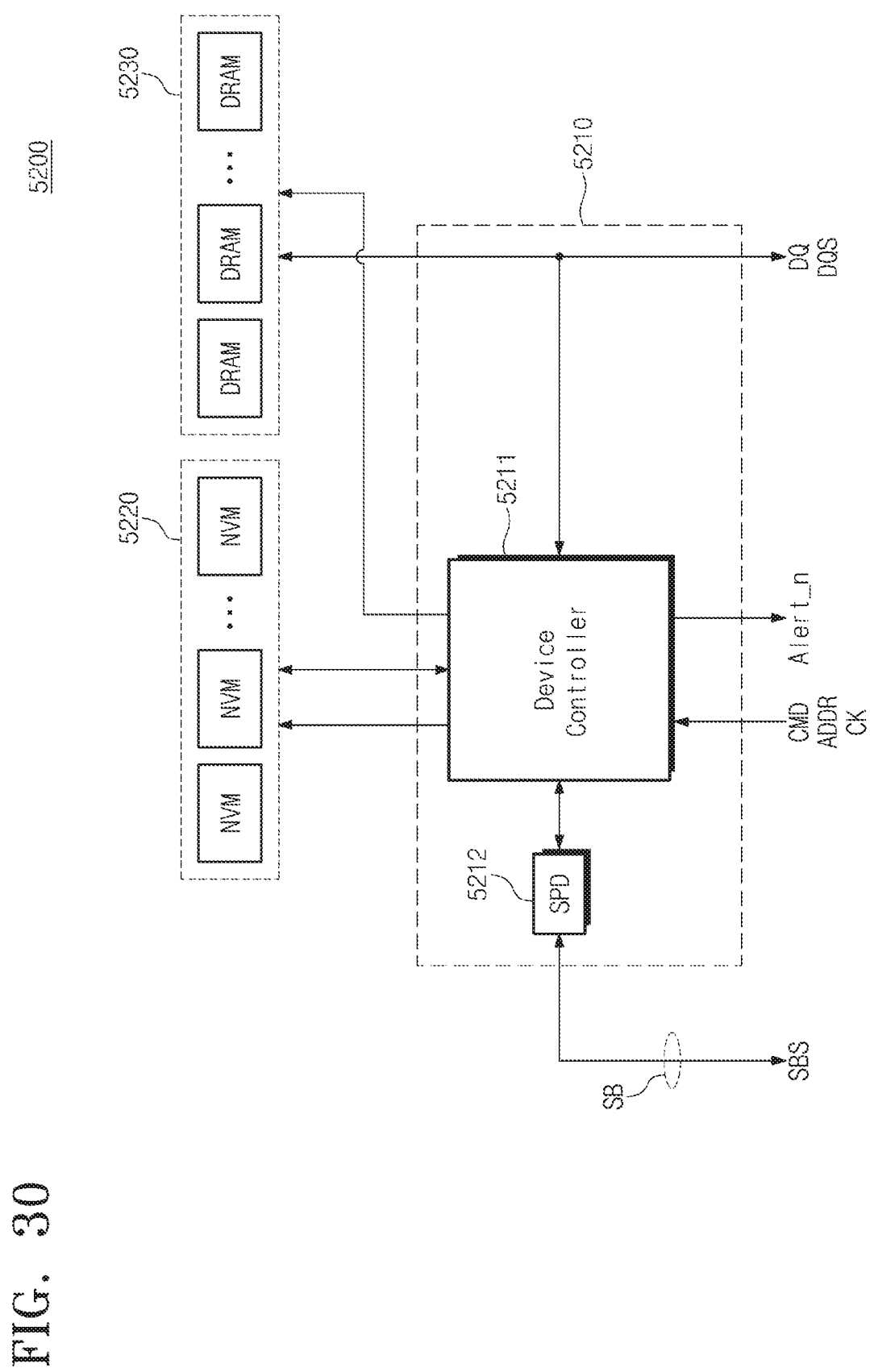
FIG. 30 is a block diagram schematically illustrating a nonvolatile memory module illustrated in FIG. 27.

FIG. 30 is a block diagram schematically illustrating a nonvolatile memory module illustrated in FIG. 27. Referring to FIGS. 27 and 30, the nonvolatile memory module 5200 may include a control circuit 5210, a nonvolatile memory device 5220, and a RAM device 5230. The control circuit 5210 may include a device controller 5211 and a SPD chip 5212.

The nonvolatile memory module 5200 of FIG. 30 may operate to be similar to the nonvolatile memory module 4200 of FIG. 29. However, the nonvolatile memory module 5200 of FIG. 30 may not include the data buffer circuit 4243 unlike the nonvolatile memory module 4200 of FIG. 29. That is, the nonvolatile memory module 5200 of FIG. 30 may directly provide data, received from the processor 3100 through the data signal DQ and the data strobe signal DQS, to the data controller 5211 or the RAM device 5230. Alternatively, data from the device controller 5211 of the nonvolatile memory module 5200 or data from the RAM device 5230 thereof may be directly provided to the processor 3100 through the data signal DQ and the data strobe signal DQS.

In example embodiments, the nonvolatile memory module 4200 of FIG. 29 may be a memory module of an LRDIMM shape, and the nonvolatile memory module 5200 of FIG. 30 may be a memory module of an RDIMM shape.

In example embodiments, the device controller 5211 may provide the processor 3100 with an alert signal Alert_n based on an operating method described with reference to FIGS. 1 to 23.

Figure 31:
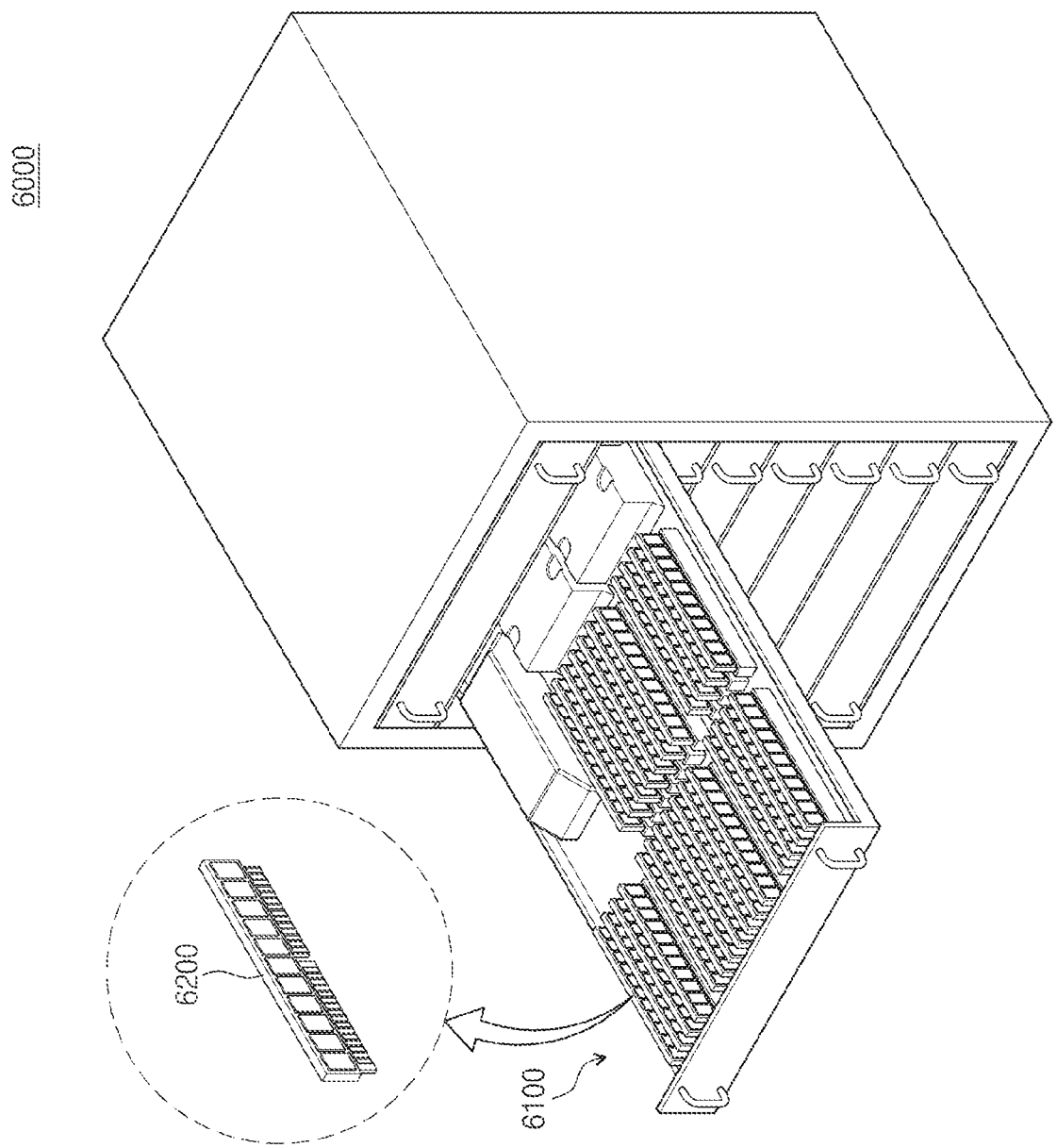
FIG. 31 is a diagram schematically illustrating a server system to which a nonvolatile memory system according to an embodiment of the inventive concept is applied.

FIG. 31 is a diagram schematically illustrating a server system to which a nonvolatile memory system according to an embodiment of the inventive concept is applied. Referring to FIG. 31, a server system 6000 may include a plurality of server racks 6100. Each of the server racks 6100 may include a plurality of nonvolatile memory modules 6200. The nonvolatile memory modules 6200 may be directly connected with processors respectively included in the server racks 6100. For example, the nonvolatile memory modules 6200 may have the form of a dual in-line memory module and may be mounted on a DIMM socket electrically connected with a processor so as to communicate with the processor. In example embodiments, the nonvolatile memory modules 6200 may be used as storage of the server system 6000. Moreover, each of the plurality of nonvolatile memory modules 6200 may operate according to an operation method described with reference to FIGS. 1 to 23.

A nonvolatile memory system according to the inventive concept may write status information in a status area after completing an operation corresponding to a storage command received from a processor (or a host). Afterwards, the nonvolatile memory system may transmit the alert signal Alert_n to the processor, and the processor may read the status information in response to the alert signal Alert_n. In example embodiments, the processor may read information of a multi-purpose register in response to the alert signal Alert_n or may receive information from the nonvolatile memory system through a serial bus, and the processor may read the status information based on the read or received information. That is, the processor may not periodically poll the nonvolatile memory system to obtain the status information of the nonvolatile memory system, thereby reducing overhead due to the periodic polling. This may mean that it is possible to make the better use of the processor and the performance of the nonvolatile memory system is improved.

Below, embodiments of the inventive concept will be described in detail with reference to accompanying drawings. Detailed information such as detailed components and structures may be provided to help understanding embodiments of the inventive concept. Therefore, changes or modifications on embodiments disclosed in this specification may be variously made without departing from the scope and spirit of the inventive concept. In addition, a description about well-known functions and structures may be omitted for clarity and brevity. Terms used in this specification may be terms defined in the light of functions of the inventive concept and may not be limited to a specific function. Definition of terms may be determined based on information disclosed in the detailed description.

Modules in accompanying drawings or the detailed description may be connected with other things as well as components disclosed in the detailed description. Connection between modules or components may be directly or indirectly made. Connection between modules or components may be made through communication or may be a physical connection.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and should not be interpreted in an idealized or overly formal sense unless expressly so defined herein.

Figure 32:
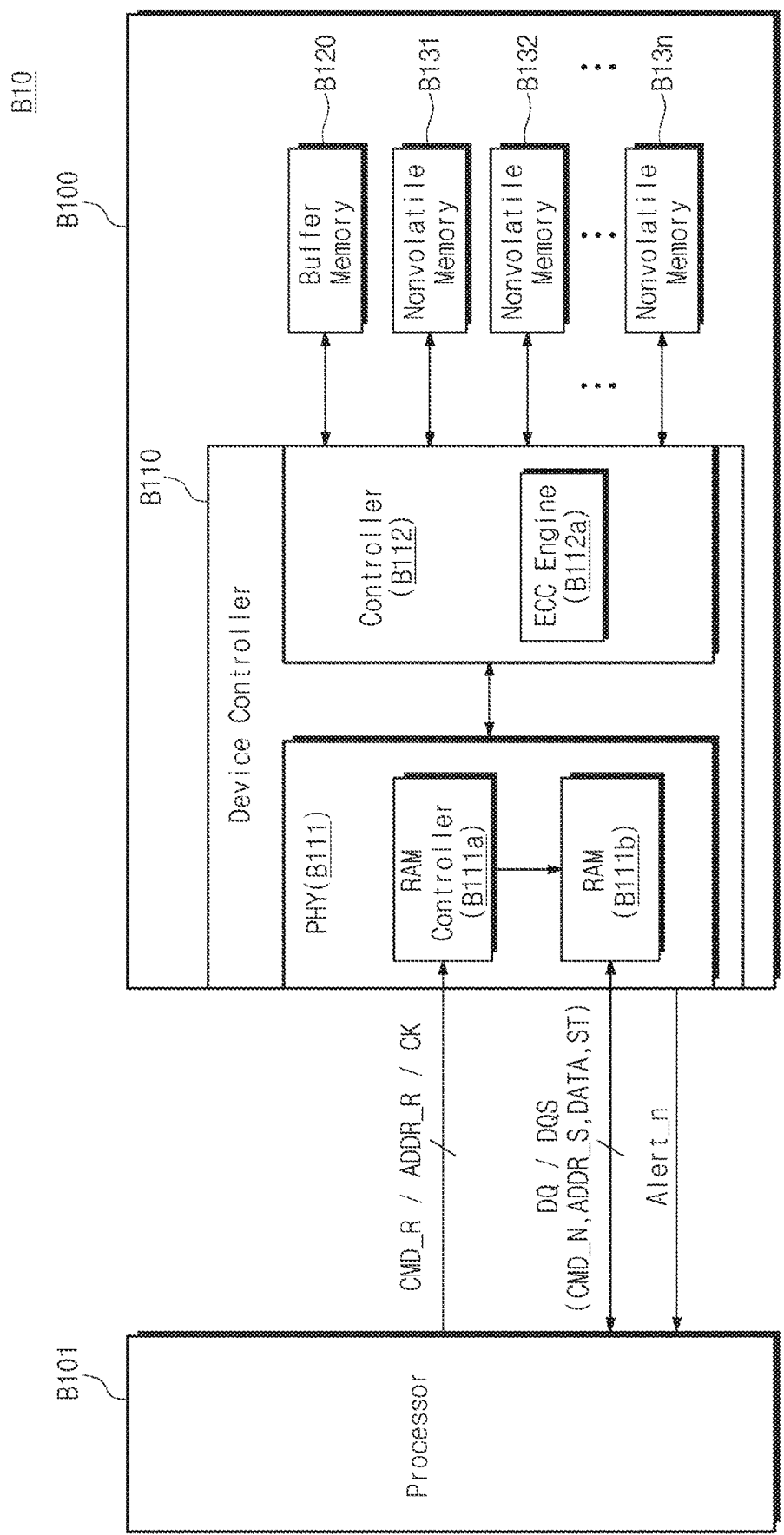
FIG. 32 is a block diagram illustrating a user system according to an embodiment of the inventive concept.

FIG. 32 is a block diagram illustrating a user system according to an embodiment of the inventive concept. Referring to FIG. 32, a user system B10 may include a processor B101 and a nonvolatile memory system B100. The nonvolatile memory system B100 may include a device controller B110, a buffer memory B120, and a plurality of nonvolatile memory devices B131 to B13n. The device controller B110 may include a physical layer B111 and a controller B112. The physical layer circuit B111 may include a RAM controller B111a and a RAM B111b. Components of FIG. 32 are described with reference to FIG. 1, and a detailed description thereof is thus omitted.

The controller B112 may include an error correction code (ECC) engine B112a. The ECC engine B112a may detect and correct an error of write data DATA_W or a storage command CMD_S read from the RAM B111b. For example, the write data DATA_W or the storage command CMD_S provided from the processor B101 may include an error correction code which the processor B101 generates. The ECC engine B112a may detect and correct an error of the write data DATA_W or the storage command CMD_S based on the error correction code. Alternatively, the ECC engine B112a may generate an error correction code about read data to be transmitted to the processor B101. The error correction code may be stored in the RAM B111b together with the read data.

In example embodiments, an error detected by the ECC engine B112a may be called an ECC error. In example embodiments, the ECC error may be different from a CRC error. For example, the ECC error may indicate an error which the ECC engine B112a detects based on the error correction code generated by the processor B101, and the CRC error may indicate an error detected based on a CRC field.

In example embodiments, in the case where the ECC error is detected by the ECC engine B112*a* or the detected ECC error is uncorrectable, the controller B112 may provide an alert signal Alert_n to the processor B101. The processor B101 may recognize that an ECC error arises from the storage command CMD_S or the write data DATA_W provided to the nonvolatile memory system B100, based on the alert signal Alert_n. Afterwards, the controller B101 may perform a separate operation in response to the alert signal Alert_n. The separate operation may include an operation of resending the storage command CMD_S or the write data DATA_W.

As described above, in the case where an ECC error is included in the storage command CMD_S or the write data DATA_W received from the processor B101, the nonvolatile memory system B10 may transmit the alert signal Alert_n to the processor B101. The processor B101 may resend the storage command CMD_S or the write data DATA_W in response to the alert signal Alert_n. This may make it possible for the nonvolatile memory system B100 to operate normally. Thus, the performance of the nonvolatile memory system may be improved.

Figure 33:
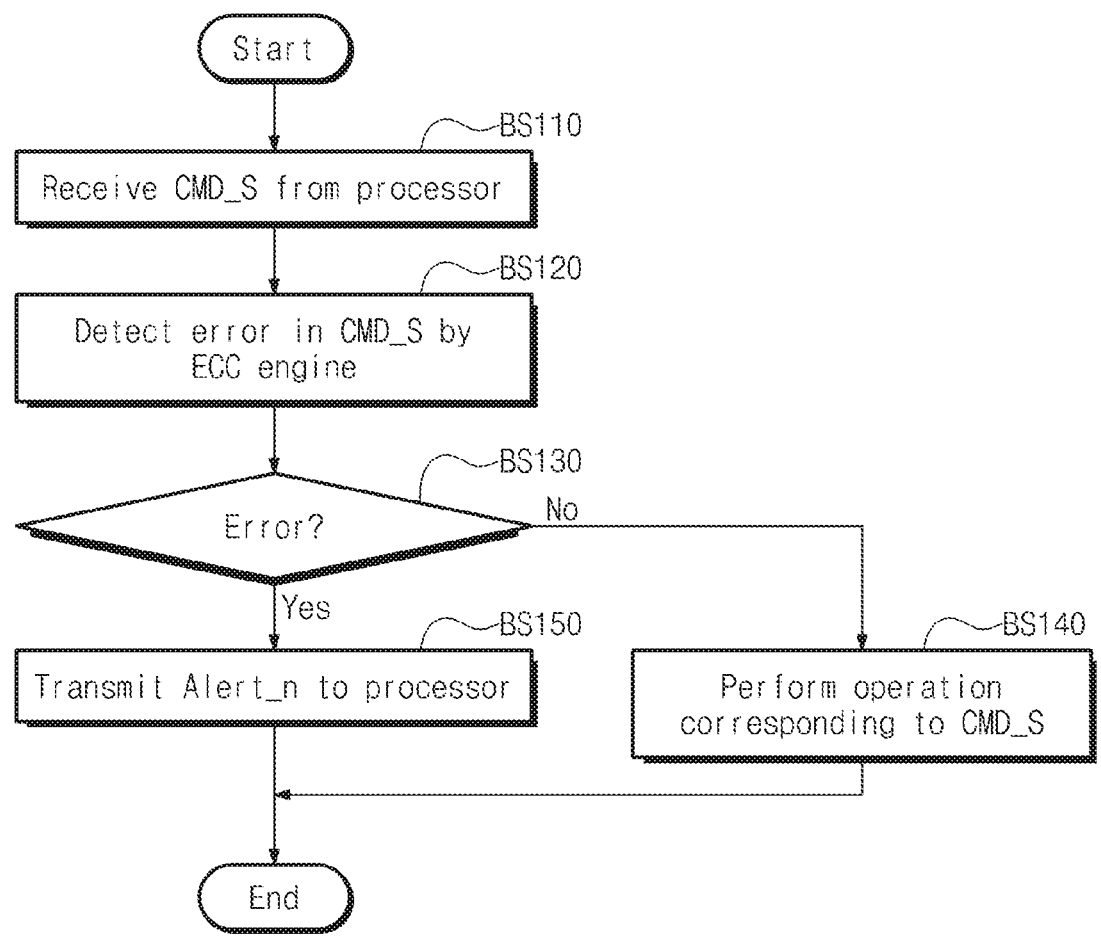
FIG. 33 is a flow chart illustrating an operation of a nonvolatile memory system of FIG. 32.
Figure 34:
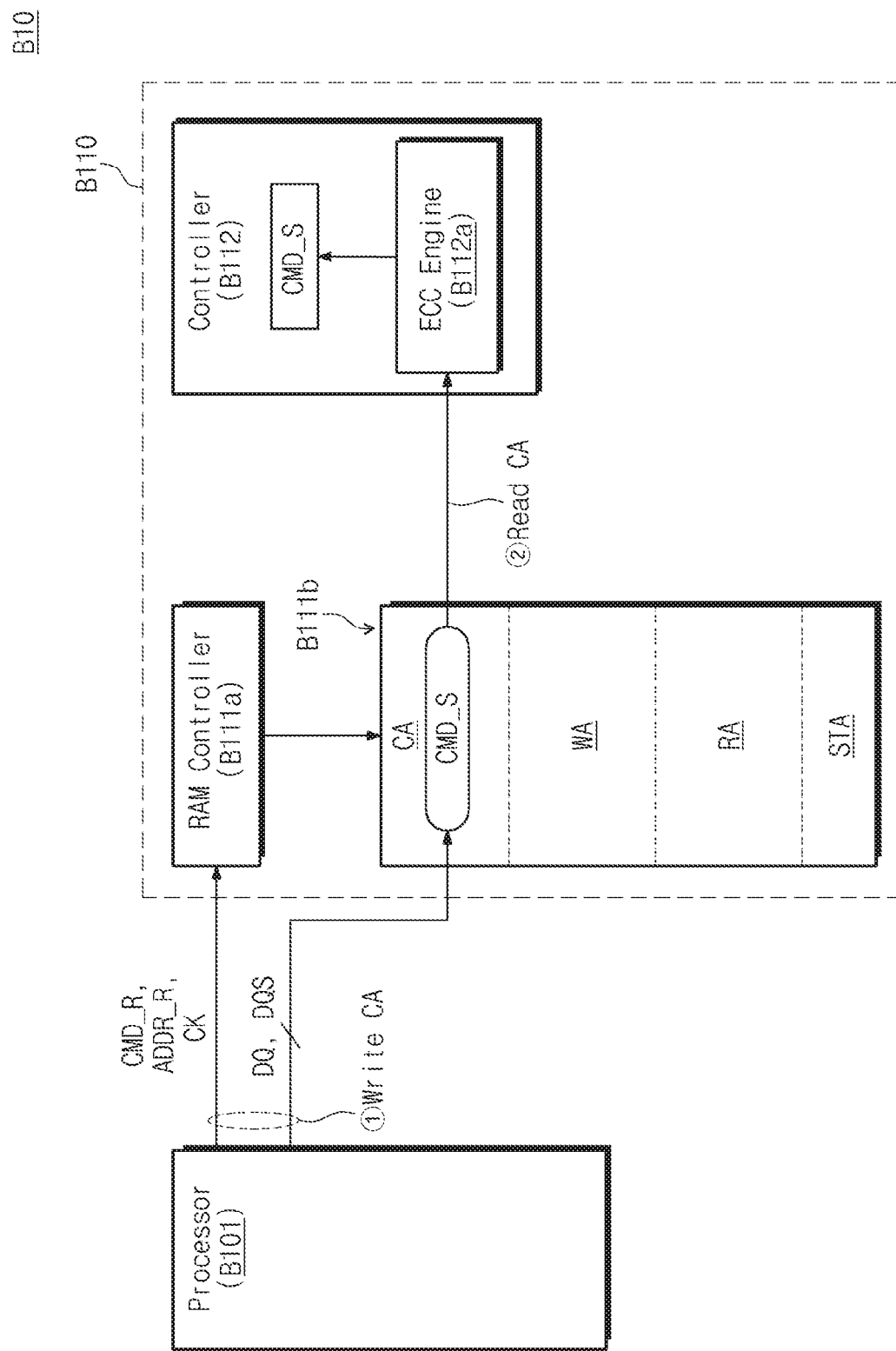
FIGS. 34 and 35 are diagrams for describing an operation of FIG. 33 in more detail.
Figure 35:
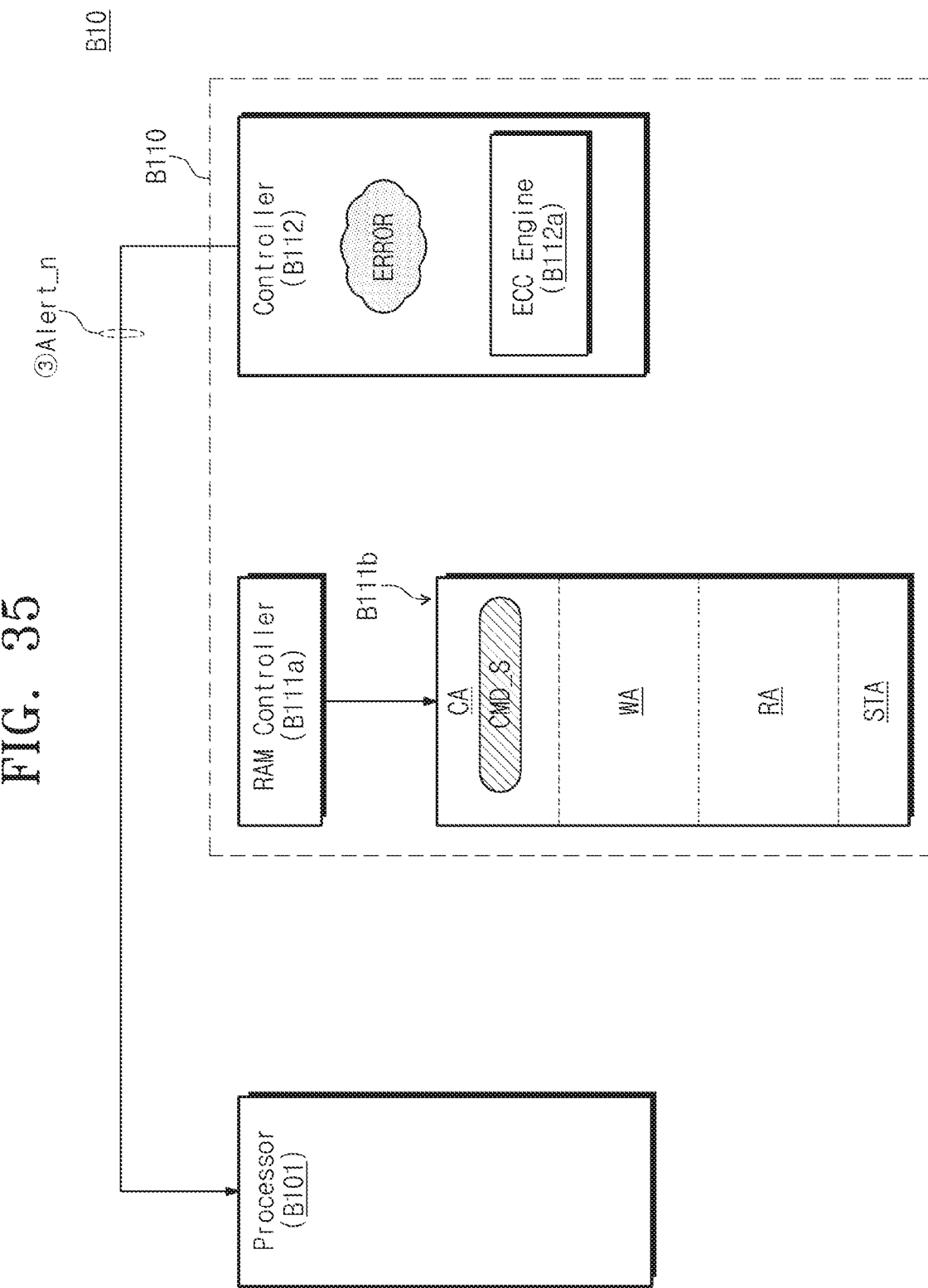

FIG. 33 is a flow chart illustrating an operation of a nonvolatile memory system of FIG. 32. FIGS. 34 and 35 are diagrams for describing an operation of FIG. 33 in more detail. For descriptive convenience, an operation of the nonvolatile memory system will be described with reference to an ECC error correction operation about the storage command CMD_S received from the processor B101. However, the scope and spirit of the inventive concept may not be limited thereto. For example, a similar operation may be performed with respect to an ECC error correction operation about write data received from the processor B101.

Furthermore, components which are unnecessary to describe transmission and receipt of the storage command CMD_S and ECC error detection of the storage command CMD_S are omitted. For descriptive convenience, a detailed description about above-described components may be omitted.

Referring to FIGS. 32 to 35, in step BS110, the nonvolatile memory system B100 may receive the storage command CMD_S from the processor B101. For example, as illustrated in FIG. 34, the nonvolatile memory system B100 may store, in a command area CA of the RAM B111*b*, the storage command CMD_S received through a data signal DQ and a data strobe signal DQS in response to a RAM command CMD_R, a RAM address ADDR_R, and a clock CK received from the processor B101 (①̂ in FIG. 34).

In step BS120, the nonvolatile memory system B100 may detect an ECC error of the received storage command CMD_S. For example, as illustrated in FIG. 34, the ECC engine B112*a* included in the nonvolatile memory system B100 may detect an ECC error of the received storage command CMD_S (②̂).

In step BS130, the nonvolatile memory system B100 may determine whether the ECC error is detected. If the ECC error is not detected, in step BS140, the nonvolatile memory system B100 may perform an operation corresponding to the received storage command CMD_S. For example, the non-volatile memory system B100 may perform a read, write or erase operation corresponding to the received storage command CMD_S.

If the ECC error is detected, in step BS150, the nonvolatile memory system B100 may transmit an alert signal Alert_n to the processor B101. For example, as illustrated in FIG. 35, in the case where an ECC error is included in the received storage command CMD_S, the nonvolatile memory system B100 may not verify an operation corresponding to the received storage command CMD_S. That is, the nonvolatile memory system B100 may be unable to perform an operation corresponding to the received storage command CMD_S. Accordingly, the nonvolatile memory system B100 may transmit to the processor B101 the alert signal Alert_n providing notification that the ECC error is included in the received storage command CMD_S (③̂ in FIG. 35).

In example embodiments, the processor B101 may recognize that the ECC error is included in the storage command CMD_S provided to the nonvolatile memory system B100, based on the alert signal Alert_n. In example embodiments, the processor B101 may resend the storage command CMD_S to the nonvolatile memory system B100, based on the alert signal Alert_n.

Figure 36:
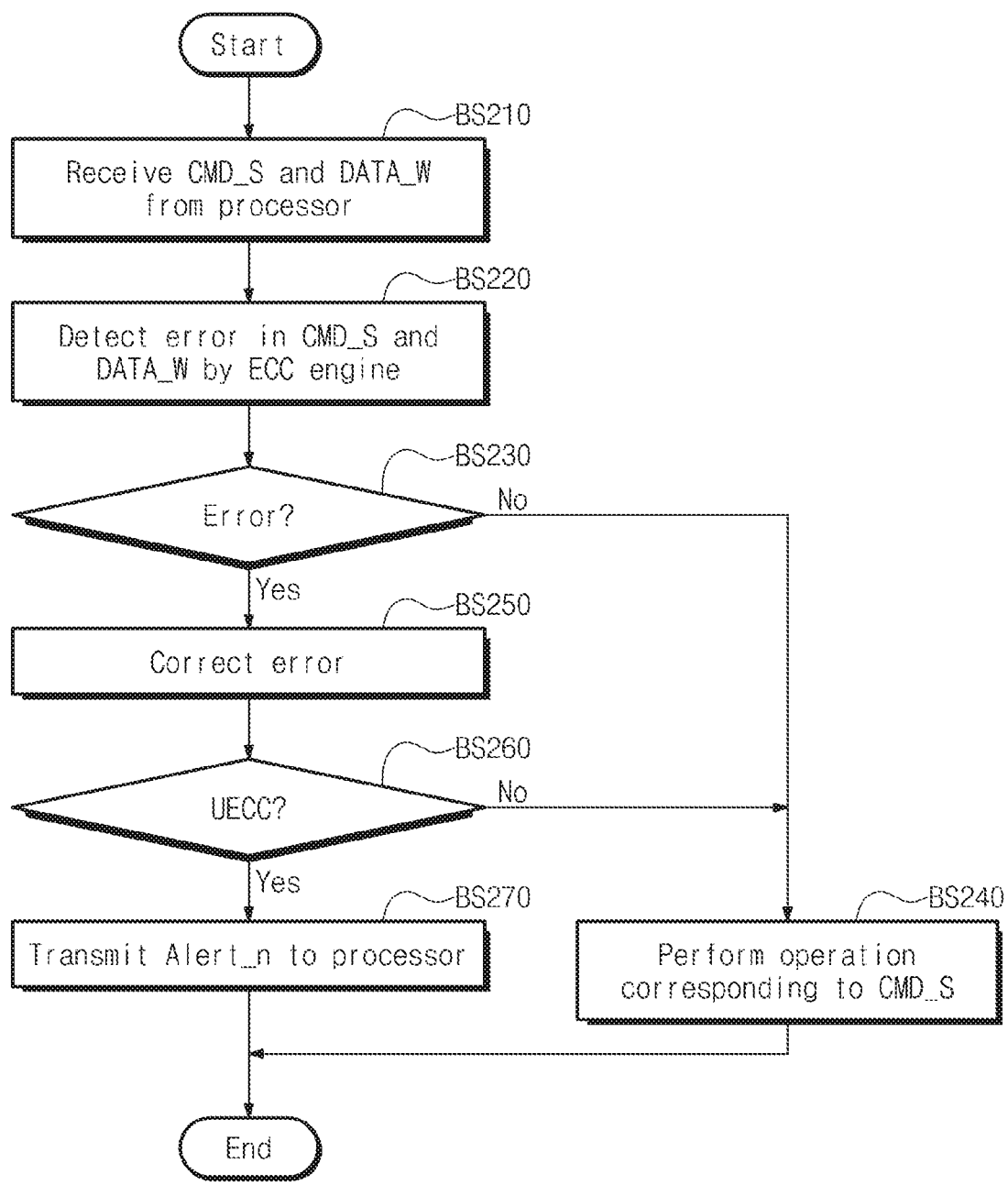
FIG. 36 is a flow chart illustrating another operation of a nonvolatile memory system of FIG. 32.

FIG. 36 is a flow chart illustrating another operation of a nonvolatile memory system of FIG. 32. Referring to FIGS. 32 and 36, the nonvolatile memory system B100 may perform operations of steps BS210 to BS240. Operations of steps BS210 to BS240 may be similar to those of steps BS110 to BS140 of FIG. 33, and a detailed description thereof is thus omitted.

In the case where an error is detected in step BS230, in step BS250, the nonvolatile memory system B100 may correct the detected error. For example, the ECC engine B112*a* may correct an error of the storage command CMD_S based on an error correction code which is included in the storage command CMD_S or is received together with the storage command CMD_S.

In the case where the error is corrected by an operation of step BS250, the nonvolatile memory system B100 may perform an operation of step BS240.

In the case where the error is not corrected by an operation of step BS250, the nonvolatile memory system B100 may perform an operation of step BS270. An operation of steps BS270 may be similar to that of step BS150 of FIG. 33, and a detailed description thereof is thus omitted.

As described above, in the case where an error is detected from the storage command CMD_S received from the processor B101 or the detected error is uncorrectable, the nonvolatile memory system B100 may provide the alert signal Alert_n to the processor B101. The processor B101 may recognize that the ECC error is included in the storage command CMD_S provided to the nonvolatile memory system B100 or the error is uncorrectable, based on the alert signal Alert_n. In example embodiments, the processor B101 may resend the storage command CMD_S to the nonvolatile memory system B100, based on the alert signal Alert_n.

Figure 37:
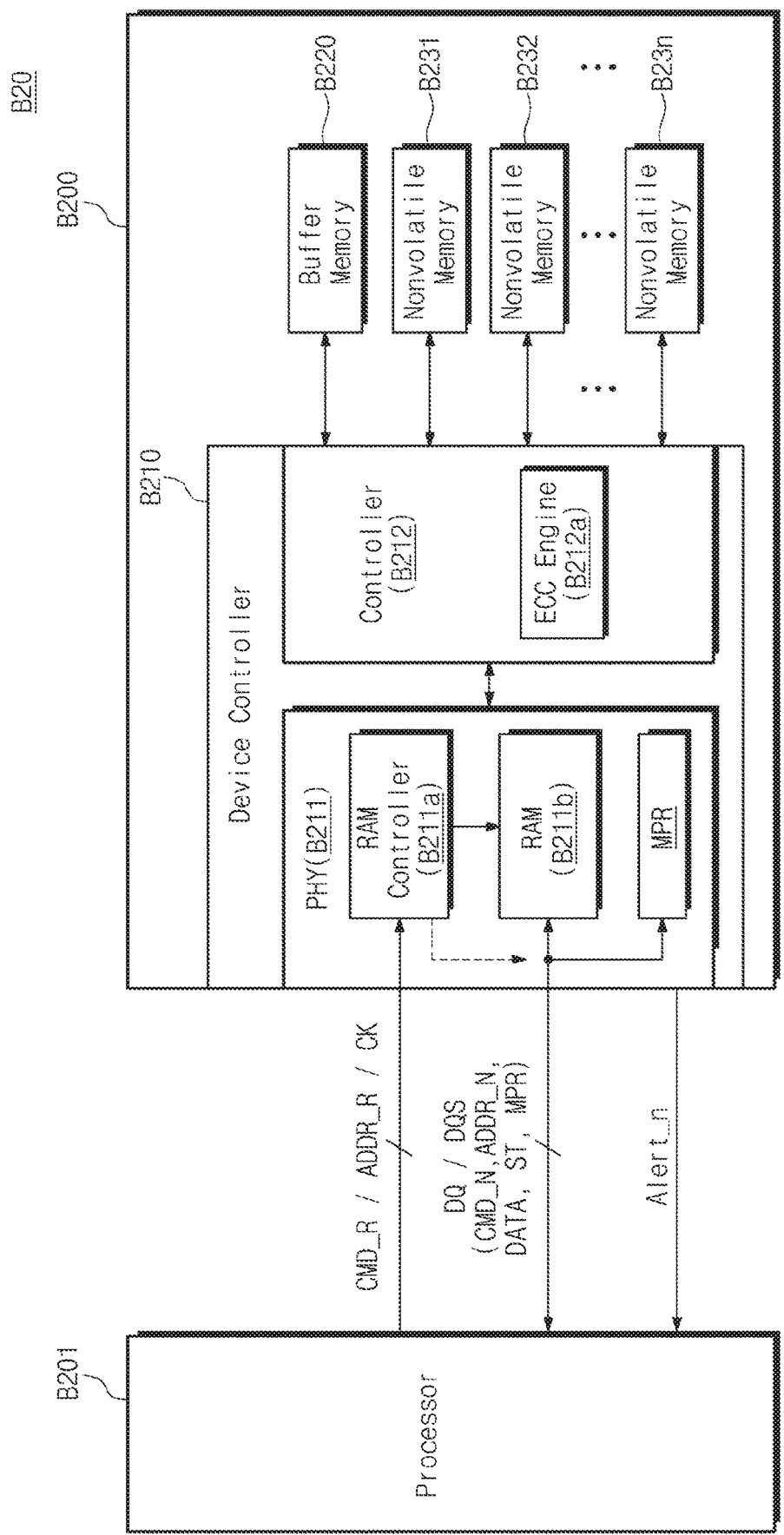
FIG. 37 is a block diagram illustrating a user system according to an example embodiment of the inventive concept.

FIG. 37 is a block diagram illustrating a user system according to an example embodiment of the inventive concept. Referring to FIG. 37, a user system B20 may include a processor B201 and a nonvolatile memory system B200. The nonvolatile memory system B200 may include a device controller B210, a buffer memory B220, and a plurality of nonvolatile memory devices B231 to B23*n*. The device controller B210 may include a physical layer B211 and a controller B212. The physical layer B211 may include a RAM controller B211*a*, a RAM B211*b*, and a multi-purpose register MRP.

Components of the user system B20 are described with reference to FIG. 32, and a detailed description thereof is thus omitted.

The nonvolatile memory system B200 may be different from the nonvolatile memory system B100 of FIG. 32 in that the nonvolatile memory system B200 further includes the multi-purpose register MPR. The multi-purpose register MPR may include a plurality of registers. The multi-purpose register MPR may store a data pattern, an error log, information about a mode register, or information about update of status information STI. For example, the multi-purpose register MPR may include information about a data pattern for training. The multi-purpose register MPR may include a log record about cyclic redundancy check of write data, a storage command, and the like received from the processor B201. The multi-purpose register MPR may include information about a mode register MRS indicating an operating mode of the physical layer B211. The multi-purpose register MPR may include ECC information. In example embodiments, as described with reference to FIGS. 32 to 36, the ECC information may indicate that the ECC engine B212a detects an error from a storage command CMD_S or write data DATA_W received from the processor B201, or does not correct the detected error.

In example embodiments, the processor B101 may access the multi-purpose register MPR by switching from an operating mode (or a mode register) of the physical layer B211 to an access mode of the multi-purpose register (MPR) access mode. In example embodiments, the processor B201 may change the operating mode (or the mode register) of the physical layer B211 using a RAM command CMD_R and a RAM address ADDR_R.

In the case where an ECC error is included in the storage command CMD_S or the write data DATA_W received from the processor B201, the nonvolatile memory system B200 may write ECC information in the multi-purpose register MPR and may then transmit an alert signal Alert_n to the processor B201. The processor B201 may read the ECC information from the multi-purpose register MPR in response to the alert signal Alert_n. The processor B201 may recognize that an error (in particular, an ECC error) is detected from information transmitted to the nonvolatile memory system B200, based on the read ECC information.

For ease of illustration and descriptive convenience, it may be assumed that the ECC information is written in the multi-purpose register MPR by the controller B212 after an ECC error is detected by the ECC engine B212a of the controller B212. However, the scope and spirit of the inventive concept may not be limited thereto. The ECC information may be recorded in the multi-purpose register MPR by the RAM controller B211a included in the physical layer B211, by a separate logic circuit, or by a separate control circuit placed outside the physical layer B211.

Figure 38:
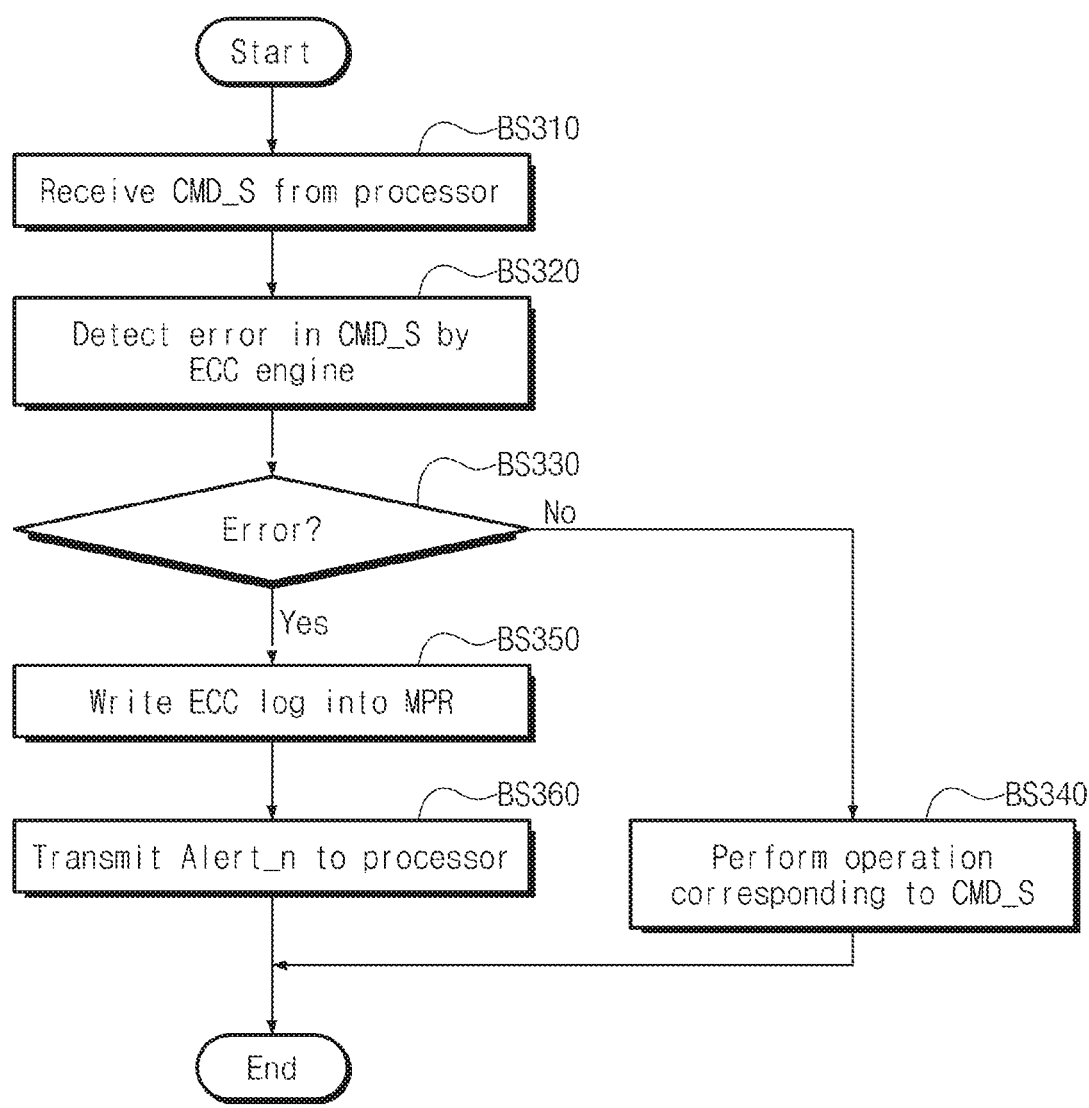
FIG. 38 is a flow chart illustrating an operation of a nonvolatile memory system of FIG. 37.

FIG. 38 is a flow chart illustrating an operation of a nonvolatile memory system of FIG. 37. Referring to FIGS. 37 and 38, the nonvolatile memory system B200 may perform operations of steps BS310 to BS340. Operations of steps BS310 to BS340 may be similar to those of steps BS110 to BS140 of FIG. 33, and a detailed description thereof is thus omitted.

In the case where an error is detected by an operation of step BS330, the nonvolatile memory system B200 may write ECC information (ECC log) in the multi-purpose register MPR. For example, the nonvolatile memory system B200 may write ECC information, indicating that an ECC error is included in the received storage command CMD_S, in a part of the multi-purpose register MPR.

In step BS360, the nonvolatile memory system B200 may transmit an alert signal Alert_n to the processor B201.

As described above, the processor B201 may read the ECC information from the multi-purpose register MPR in response to the alert signal Alert_n. Afterwards, the processor B201 may resend the storage command CMD_S based on the ECC information.

According to the above-described embodiment, a nonvolatile memory system may detect and correct an error about a storage command CMD_S or write data DATA_W received from a processor. At this time, in the case where an error is detected from the storage command CMD_S or the write data DATA_W, or the detected error is uncorrectable, the nonvolatile memory system may transmit an alert signal Alert_n to the processor. The processor may recognize that an ECC error is included in the storage command CMD_S or the write data DATA_W, based on the alert signal. Alternatively, the processor may read ECC information from the multi-purpose register MPR of the nonvolatile memory system in response to the alert signal and may recognize that an ECC error is included in the storage command CMD_S or the write data DATA_W, based on the ECC information. In this case, the processor may resend the storage command CMD_S or the write data DATA_W to the nonvolatile memory system.

In example embodiments, although not shown, the processor and the nonvolatile memory system may communicate with each other through a serial bus such as I2C. The processor may receive the ECC information from the nonvolatile memory system through the serial bus in response to the alert signal Alert_n.

In example embodiments, the nonvolatile memory systems B100 and B200 described with reference to FIGS. 32 to 38 may be applied a nonvolatile memory system, a user system, or a server system described with reference to FIGS. 1 to 31.

According to the above-described embodiment, the nonvolatile memory system may detect and correct an error about a storage command or write data received from a processor. At this time, in the case where an error is detected or the detected error is uncorrectable, the nonvolatile memory system may transmit an alert signal Alert_n to the processor. The processor may resend the storage command or the write data to the nonvolatile memory system in response to the alert signal Alert_n. With the above description, even though an error is included in a storage command, the nonvolatile memory system may operate normally, and thus the reliability of the nonvolatile memory system may be improved.

A nonvolatile memory system according to an embodiment of the inventive concept may perform a flush operation in response to an activated save signal. While the flush operation is performed, the nonvolatile memory system may maintain an active state of the save signal. After the flush operation is terminated, the nonvolatile memory system may deactivate the save signal. The processor which is connected with the nonvolatile memory system may recognize completion of a flush operation of the nonvolatile memory system through the deactivated stored signal. This may mean that the performance and reliability of the nonvolatile memory system are improved.

Figure 39:
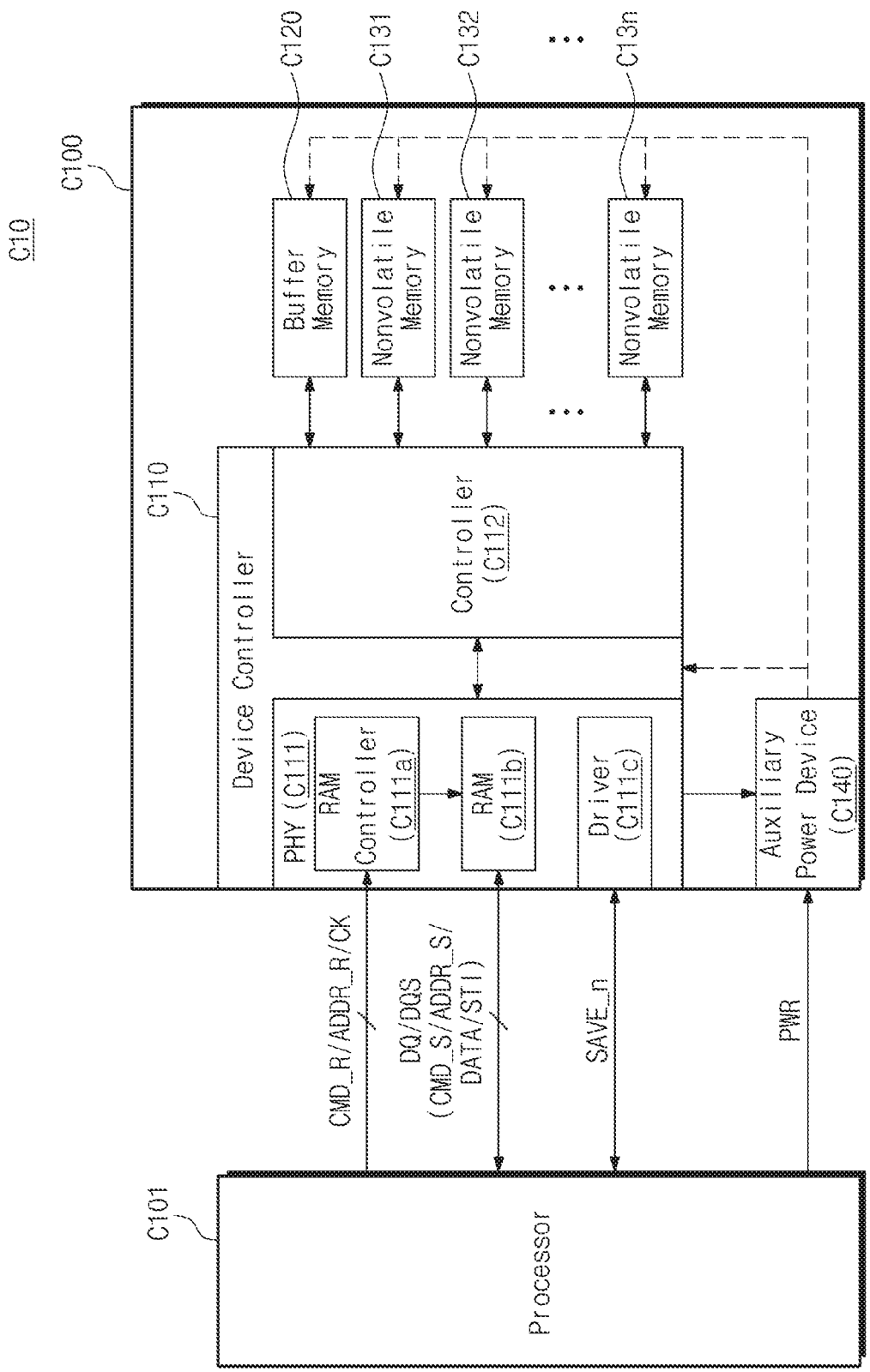
FIG. 39 is a block diagram illustrating a user system according to an embodiment of the inventive concept.

FIG. 39 is a block diagram illustrating a user system according to an embodiment of the inventive concept. Referring to FIG. 39, a user system C10 may include a processor C101 and a nonvolatile memory system C100. The nonvolatile memory system C100 may include a device controller C110, a buffer memory C120, a plurality of nonvolatile memory devices C131 to C13n, and an auxiliary power device C140. Components of the user system C10 of FIG. 39 are described with reference to FIG. 1, and a detailed description thereof is thus omitted.

The auxiliary power device C140 may be charged by a power PWR from the processor C101. The auxiliary power device C140 may supply auxiliary power under control of the device controller C110. In example embodiments, the auxiliary power device C140 may include power storage elements such as a supercapacitor, a tantalum capacitor, and the like. In example embodiments, the power PWR may be received through a power pin. In example embodiments, the power PWR may be a high-voltage power of 12 V.

A physical layer C111 of the device controller C110 in the nonvolatile memory system according to an embodiment of the inventive concept may include a save signal driver C111c. For example, the processor C101 may detect sudden power-off (SPO) to activate the save signal SAVE_n. The activated save signal SAVE_n may be provided to the nonvolatile memory system C100. The nonvolatile memory system C100 may perform a flush operation in response to the activated save signal SAVE_n. The flush operation may indicate an operation of storing data, stored in the buffer memory C120, in the nonvolatile memory devices C131 to Cl3n. In example embodiments, an auxiliary power may be supplied from the auxiliary power device C140 during the flush operation.

For example, in the case where the buffer memory C120 is a volatile memory and the SPO occurs, a mapping table stored in the buffer memory C120 may be lost. The mapping table may include information about correspondence between storage addresses ADDR_S, managed by the processor C101, and the nonvolatile memory devices C131 to C13n. That is, in the case where the mapping table is lost, it may be impossible to assure validity of data stored in the nonvolatile memory devices C131 to C13n.

At occurrence of the SPO, the processor C101 may activate the save signal SAVE_n, and the nonvolatile memory system C100 may detect the SPO based on the activated save signal SAVE_n. The nonvolatile memory system C100 may flush a mapping table, which is stored in the buffer memory C120, onto the nonvolatile memory devices C131 to C131n in response to the activated save signal SAVE_n, thereby assuring validity about the mapping table and data.

The nonvolatile memory system C100 according to an embodiment of the inventive concept may deactivate the save signal SAVE_n after completing the flush operation. For example, the physical layer C111 of the device controller C110 may include a save signal driver C111c. The save signal driver C111c may include an open drain structure. That is, the save signal driver C111c may maintain an active state of the save signal SAVE_n in response to the activated save signal SAVE_n. After the flush operation of the nonvolatile memory system C100 is completed, the save signal driver C111c may deactivate the save signal SAVE_n under control of the controller C112.

In example embodiments, since including the open drain structure, the save signal SAVE_n may maintain an active state (e.g., a logical low state) even though the processor C101 deactivates the save signal SAVE_n before the nonvolatile memory system C100 completes the flush operation. The processor C101 may recognize completion of the flush operation of the nonvolatile memory system C100 through the deactivated save signal SAVE_n.

Conventionally, in the case where a processor does not verify whether or not there is flush completion, it may be impossible to assure validity of data stored in a nonvolatile memory system, and thus the processor may determine whether a flush operation is completed, by periodically polling status information of the nonvolatile memory system. In this case, overhead of the processor may increase because the processor periodically polls a specific area (e.g., a status register) of the nonvolatile memory system.

However, according to an embodiment of the inventive concept, the save signal SAVE_n may be activated by the processor C101 at an occurrence of the SPO, and the nonvolatile memory system C100 may perform a flush operation in response to the activated save signal SAVE_n. The nonvolatile memory system C100 may deactivate the save signal SAVE_n after completing the flush operation. The processor C101 may recognize completion of the flush operation of the nonvolatile memory system C100 through the deactivated save signal SAVE_n. Thus, it may be possible to assure validity of data stored in the nonvolatile memory system C100 and to reduce overhead due to determination of flush completion compared with a conventional polling manner. This may mean that the performance and reliability of the nonvolatile memory system are improved.

Figure 40:
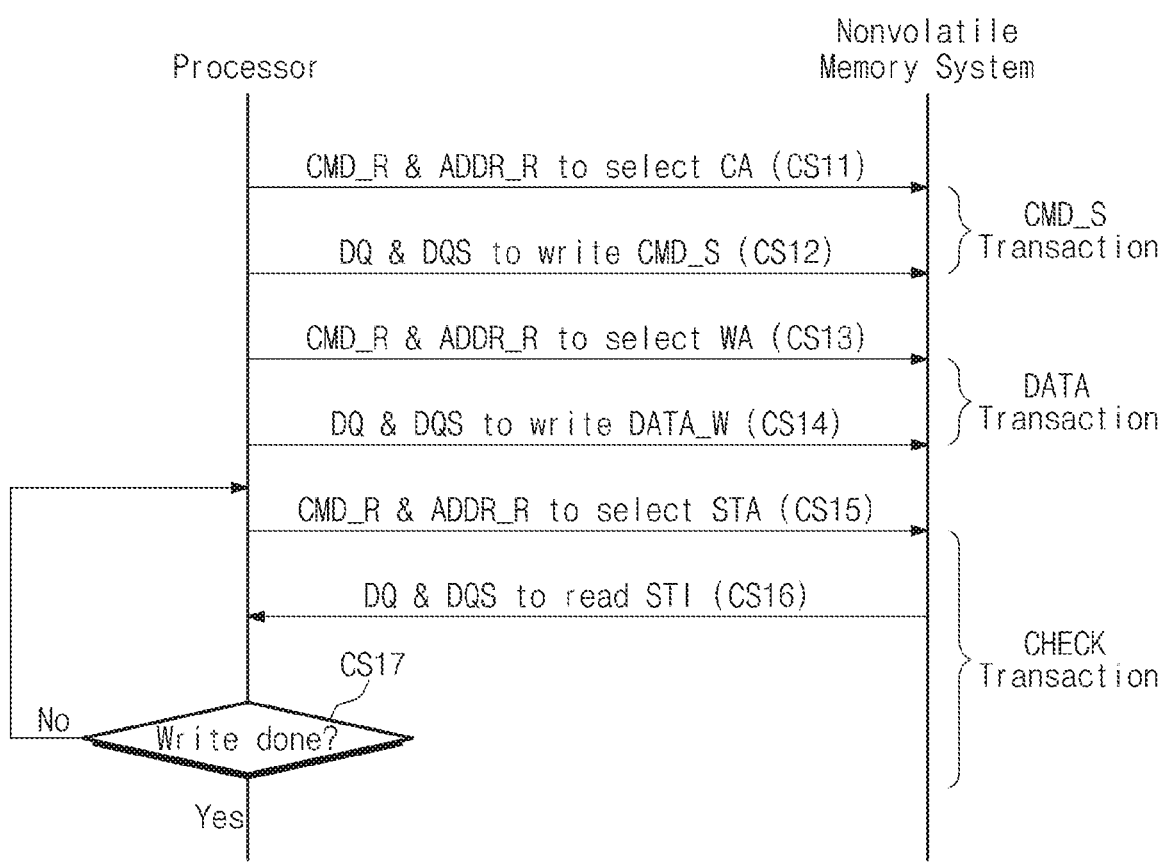
FIG. 40 is a flow chart for describing a write operation of a user system illustrated in FIG. 39.
Figure 41:
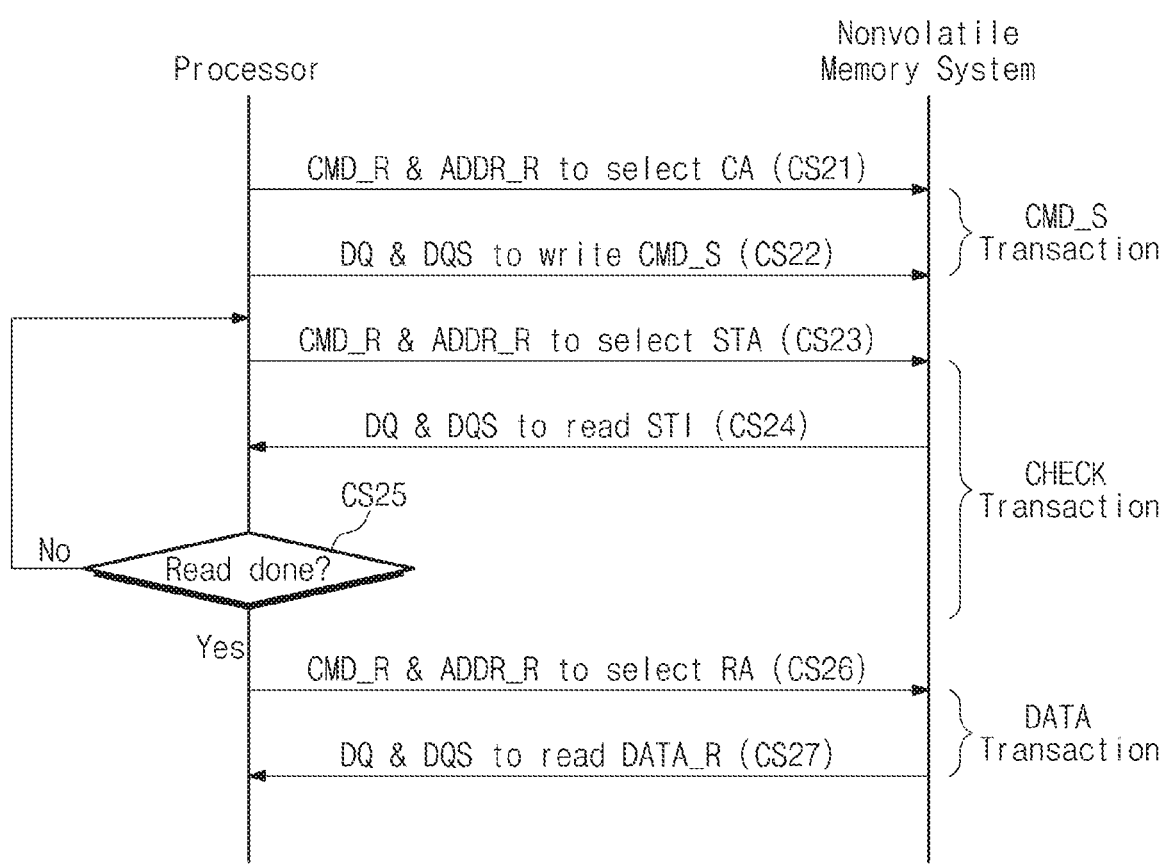
FIG. 41 is a flow chart for describing a read operation of a user system illustrated in FIG. 39.

FIG. 40 is a flow chart for describing a write operation of a user system illustrated in FIG. 39. FIG. 41 is a flow chart for describing a read operation of a user system illustrated in FIG. 39. Referring to FIGS. 2, 39 and 40, in step CS11, the processor C101 may provide the nonvolatile memory system C100 with a RAM address CMD_R and a RAM address ADDR_R for selecting a command area CA of the RAM C111b. In step CS12, the processor C101 may transmit, to the nonvolatile memory system C100, a data signal DQ and a data strobe signal DQS for writing a storage command CMD_S in the selected command area CA. In example embodiments, the data signal DQ and the data strobe signal DQS of step CS12 may include a storage command CMD_S for a write operation. In example embodiments, steps CS11 and CS12 may compose transaction about the storage command CMD_S.

In step CS13, the processor C101 may provide the nonvolatile memory system C100 with the RAM address CMD_R and the RAM address ADDR_R for selecting a write area WA. In step CS14, the processor C101 may transmit, to the nonvolatile memory system C100, the data signal DQ and the data strobe signal DQS for writing the write data DATA_W in the write area WA of the RAM C111b. In example embodiments, the write data DATA_W may be included in the data signal DQ and the data strobe signal DQS of step CS14. In example embodiments, steps CS13 and CS14 may compose transaction about the write data DATA_W.

In step CS15, the processor C101 may provide the nonvolatile memory system C100 with the RAM address CMD_R and the RAM address ADDR_R for selecting a status area STA of the RAM C111b. In step CS16, the processor C101 may read status information STI stored in the selected status area STA through the data signal DQ and the data strobe signal DQS. In example embodiments, the status information STI may be included in the data signal DQ and the data strobe signal DQS of step CS16, which are provided to the RAM C111b from the processor C101.

In step CS17, the processor C101 may determine whether the write operation is completed, based on the read status information STI. In example embodiments, in the case of completing processing about the write data DATA_W stored in the write area WA of the RAM C111b, the controller C112 of the nonvolatile memory system C100 may write the status information STI indicating completion of the write operation in the write area STA of the RAM C111b. In in this case, in step CS16, the status information STI indicating completion of the write operation may be transmitted to the processor C101. The processor C101 may determine whether the write operation is completed, based on the received status information STI.

In the case where the received status information STI does not indicate completion of the write operation, the processor C101 may periodically perform steps CS15 to CS17. The write operation of the user system C10 may be terminated if the received status information STI indicates completion of the write operation. In example embodiments, operations of steps CS15 to CS17 may compose transaction for checking completion of the write operation.

In example embodiments, in the case where the write operation is not completed, the controller C112 of the nonvolatile memory system C100 may not write the status information STI in the RAM C111b. In this case, in step CS16, the status information STI may not be transmitted to the processor C101, or other status information may be transmitted. If the status information STI is not received or the other status information is received, the processor C101 may determine the write operation as not being completed and may iteratively perform steps CS15 to CS17.

Figure 42:
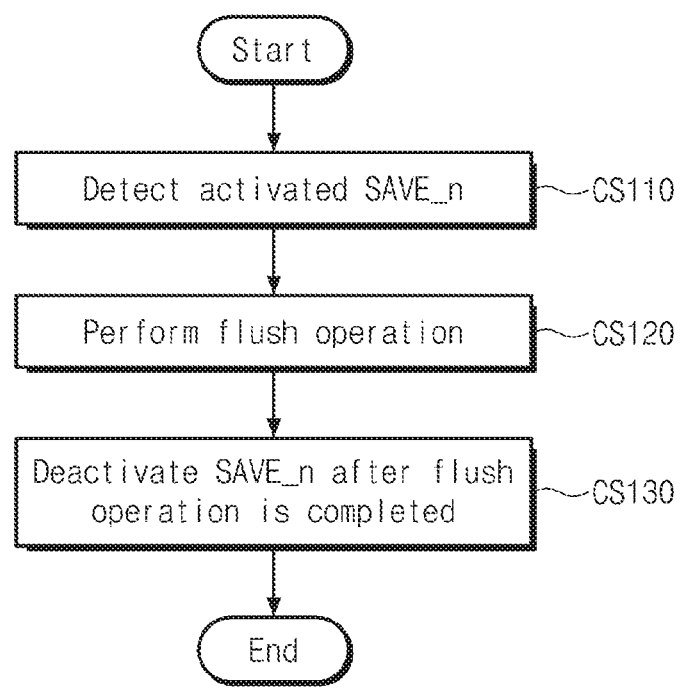
FIG. 42 is a flow chart illustrating an operation of a nonvolatile memory system of FIG. 39.

Referring to FIGS. 2, 39 and 42, in step CS21, the processor C101 may provide the nonvolatile memory system C100 with a RAM address CMD_R and a RAM address ADDR_R for selecting a command area CA of the RAM C111b. In step CS22, the processor C101 may transmit a data signal DQ and a data strobe signal DQS to the nonvolatile memory system C100 to write a storage command CMD_S in the selected command area CA. In example embodiments, the data signal DQ and the data strobe signal DQS of step CS22 may include a storage command CMD_S for a read operation. In example embodiments, steps CS21 and CS22 may compose transaction about the storage command CMD_S.

In step CS23, the processor C101 may provide the nonvolatile memory system C100 with the RAM address CMD_R and the RAM address ADDR_R for selecting the status area STA. In step CS24, the processor C101 may read status information STI stored in the selected status area STA through the data signal DQ and the data strobe signal DQS. In example embodiments, the status information STI may be included in the data signal DQ and the data strobe signal DQS of step CS24, which are provided to the RAM C111b from the processor C101.

In step CS25, the processor C101 may determine whether the read operation is completed, based on the read status information STI. In the case where the read operation is not completed, the processor C101 may periodically perform operations of steps CS23 and CS24. In example embodiments, operations of steps CS23 to CS25 may compose transaction for checking completion of the read operation.

In example embodiments, in the case where the read operation is not completed, the controller C112 of the nonvolatile memory system C100 may not write the status information STI, indicating completion of the read operation, in the RAM C111b. In this case, in step CS24, the status information STI may not be transmitted to the processor C101. In the case where the status information STI is not transmitted, the processor C101 may iteratively perform steps CS23 to CS25.

In the case where the read status information STI indicates completion of the read operation, in step CS26, the processor C101 may provide the nonvolatile memory system C100 with a RAM address CMD_R and a RAM address ADDR_R for selecting a read area RA. In step CS27, the processor C101 may read the read data DATA_R stored in the selected read area RA through the data signal DQ and the data strobe signal DQS. In example embodiments, the read data DATA_R may be included in the data signal DQ and the data strobe signal DQS of step CS27, which are signals to the processor C101 from the RAM C111b.

In example embodiments, the write operation and the read operation of the user system C10 may not be limited to an operating method illustrated in FIGS. 40 and 41. For example, the user system C10 may operate based on a read method and a write method described with reference to FIGS. 1 to 21.

FIG. 42 is a flow chart illustrating an operation of a nonvolatile memory system of FIG. 39. Referring to FIGS. 39 and 42, in step CS110, the nonvolatile memory system C100 may detect an activated save signal SAVE_n. For example, as described with reference to FIG. 39, the processor C101 may detect sudden power-off and may activate a save signal SAVE_n. Alternatively, the processor C101 may activate the save signal SAVE_n under a specific condition. In example embodiments, the specific condition may include the following conditions:

the case that an operation of the nonvolatile memory system C100 is unstable; the case that the nonvolatile memory system C100 is detached from the user system C10; and the case that initialization of the nonvolatile memory system C100 is required.

In step CS120, the nonvolatile memory system C100 may perform a flush operation in response to the activated save signal SAVE_n. For example, the nonvolatile memory system C100 may flush a mapping table, which is stored in the buffer memory C120, onto at least one of the nonvolatile memory devices C131 to C13n in response to the activated save signal SAVE_n. In example embodiments, the nonvolatile memory system C100 may flush pending data in the nonvolatile memory system C100 onto the nonvolatile memory devices C131 to C13n. In example embodiments, the pending data may mean data, not processed, from among data stored in the RAM C111b of the nonvolatile memory system C100 or in a separate storage device.

In step CS130, the nonvolatile memory system C100 according to an embodiment of the inventive concept may deactivate the save signal SAVE_n after completing the flush operation. In example embodiments, the processor C101 may recognize that the nonvolatile memory system C100 completes the flush operation, through the deactivated save signal SAVE_n.

Figure 43:
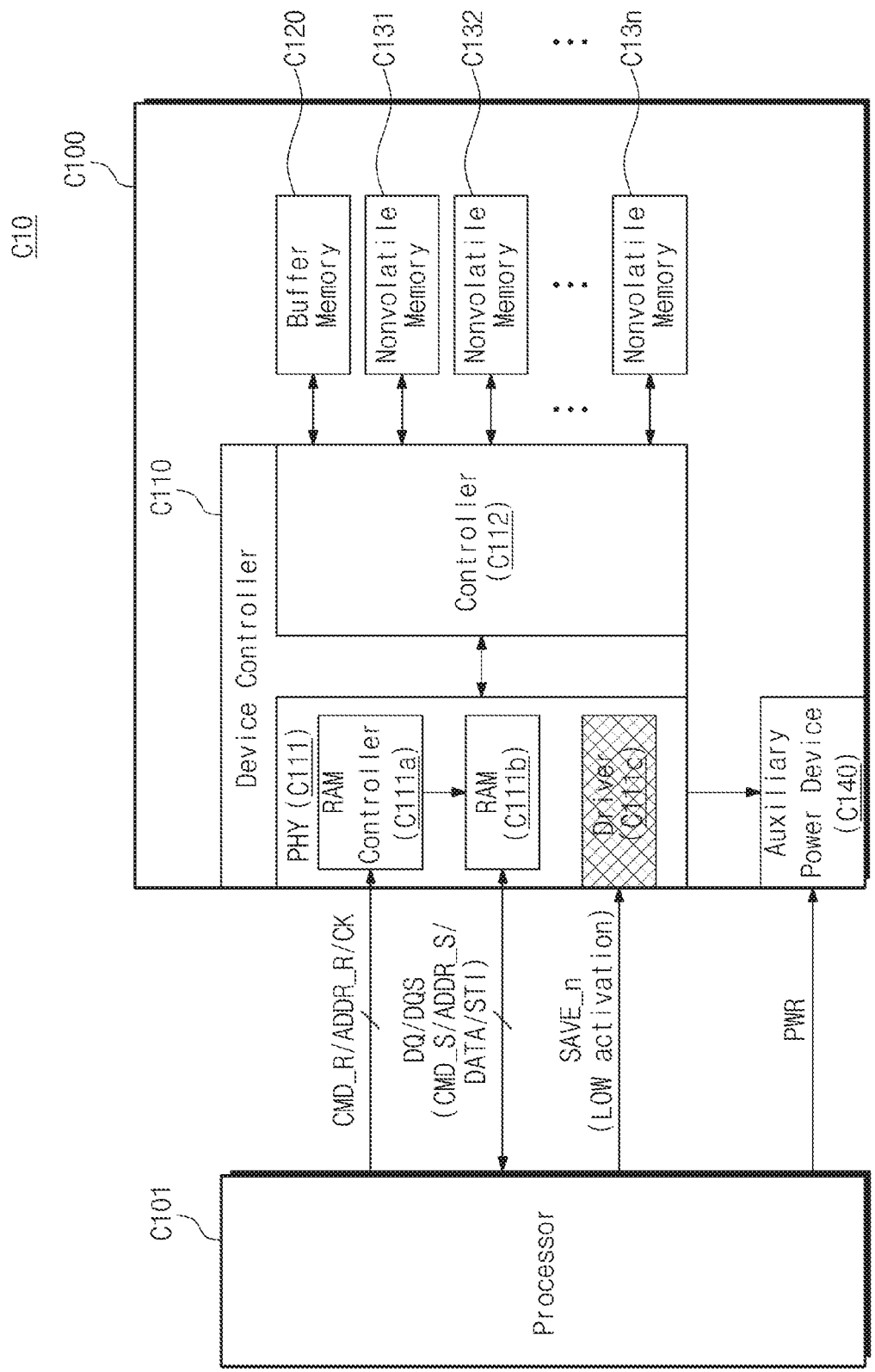
FIGS. 43 to 45 are block diagrams for describing an operation of FIG. 42.
Figure 44:
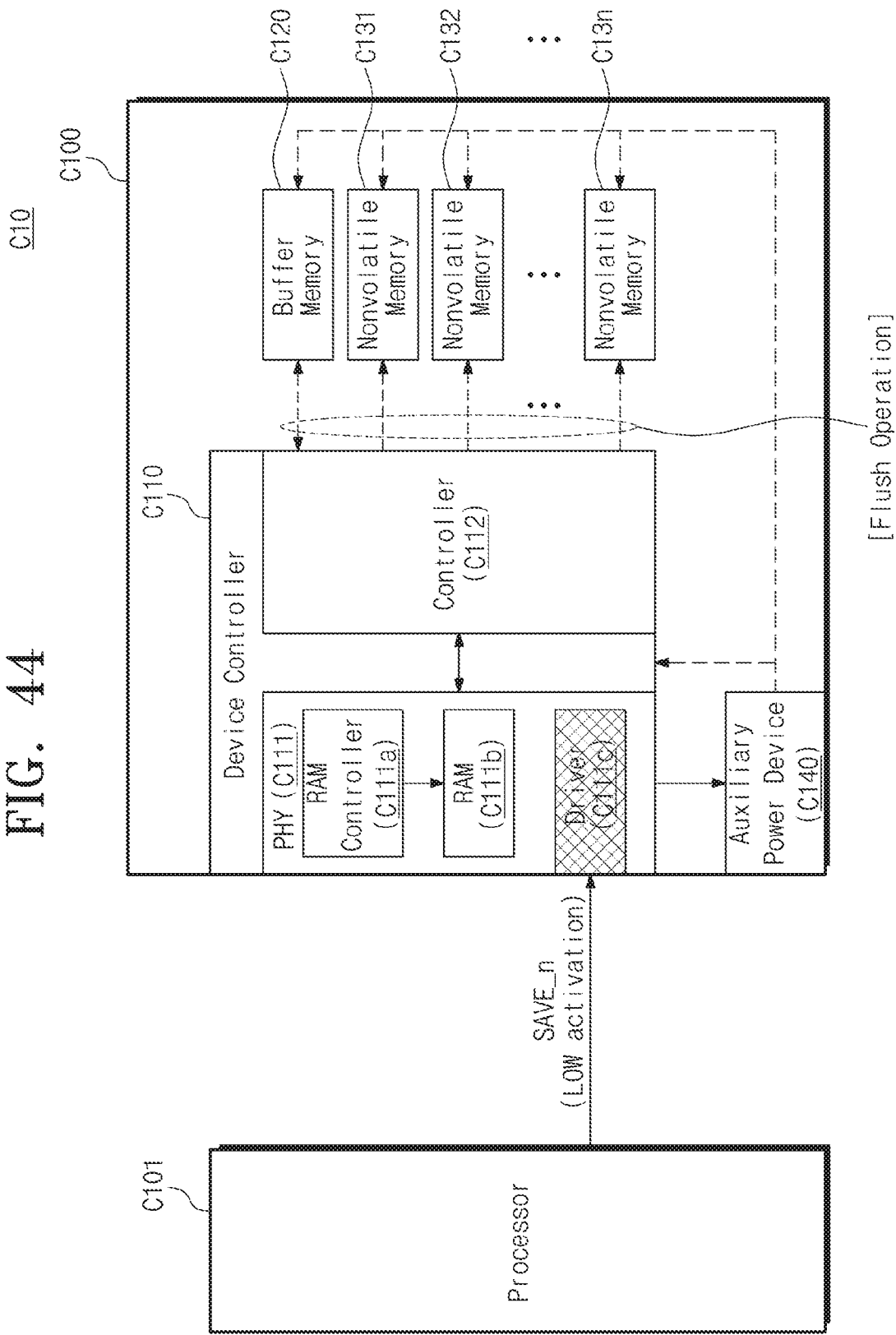

FIGS. 43 to 44 are block diagrams for describing an operation of FIG. 42. Referring to FIGS. 39 and 42 to 45, the user system C10 may include a processor C101 and a nonvolatile memory system C100. The nonvolatile memory system C100 may include a device controller C110, a buffer memory C120, a plurality of nonvolatile memory devices C131 to C13n, and an auxiliary power device C140. The device controller C110 may include a physical layer C111 and a controller C112. The physical layer C111 may include a RAM controller C111a, a RAM C111b, and a save signal driver C111c. For descriptive convenience, a further detailed description described with reference to FIG. 39 may be omitted.

Referring to FIGS. 42 and 43, the processor C101 may be supplied with power from the outside (not shown) and may control the nonvolatile memory system C100 using the supplied power. The power supplied to the processor C101 may be blocked. That is, sudden power-off (SPO) may occur. The processor C101 may detect the sudden power-off and may activate a save signal SAVE_n. In example embodiments, the save signal SAVE_n may be a low-level active signal. That is, the activated save signal SAVE_n may have a logical low level.

The save signal driver C111c may operate in response to the activated save signal SAVE_n. For example, the save signal driver C111c may include an open drain structure. In response to the activated save signal SAVE_n, the save signal drive C111c may operate such that the save signal SAVE_n maintains an active state. In example embodiments, the save signal driver C111c which operates in response to the activated save signal SAVE_n may maintain an active state of the save signal SAVE_n until controlled by the controller C112.

Referring to FIGS. 42 and 44, the nonvolatile memory system C100 may perform a flush operation in response to the activated save signal SAVE_n. For example, during the flush operation, the device controller C110 may read data stored in the buffer memory C120 and may store the read data in the nonvolatile memory devices C131 to C13n. In example embodiments, data stored in the buffer memory C120 may include various information, which is required for the nonvolatile memory system C100 to operate, such as a mapping table and metadata.

In example embodiments, during the flush operation, the device controller C110 may store pending data in the nonvolatile memory devices C131 to C13n together with data stored in the buffer memory C120. In example embodiments, the pending data may mean data which are not processed on the device controller C110. The pending data may include a command, write data, read data, or status information stored in the RAM C111b. The pending data may mean data or a data packet which is temporarily stored in a separate buffer memory (not shown) in the controller C112 with the data or the data packet not yet written in the nonvolatile memory C131.

In example embodiments, the auxiliary power device C140 may provide an auxiliary power to the buffer memory C120, the nonvolatile memory devices C131 to C13n, and the device controller C110 during the flush operation.

Figure 45:
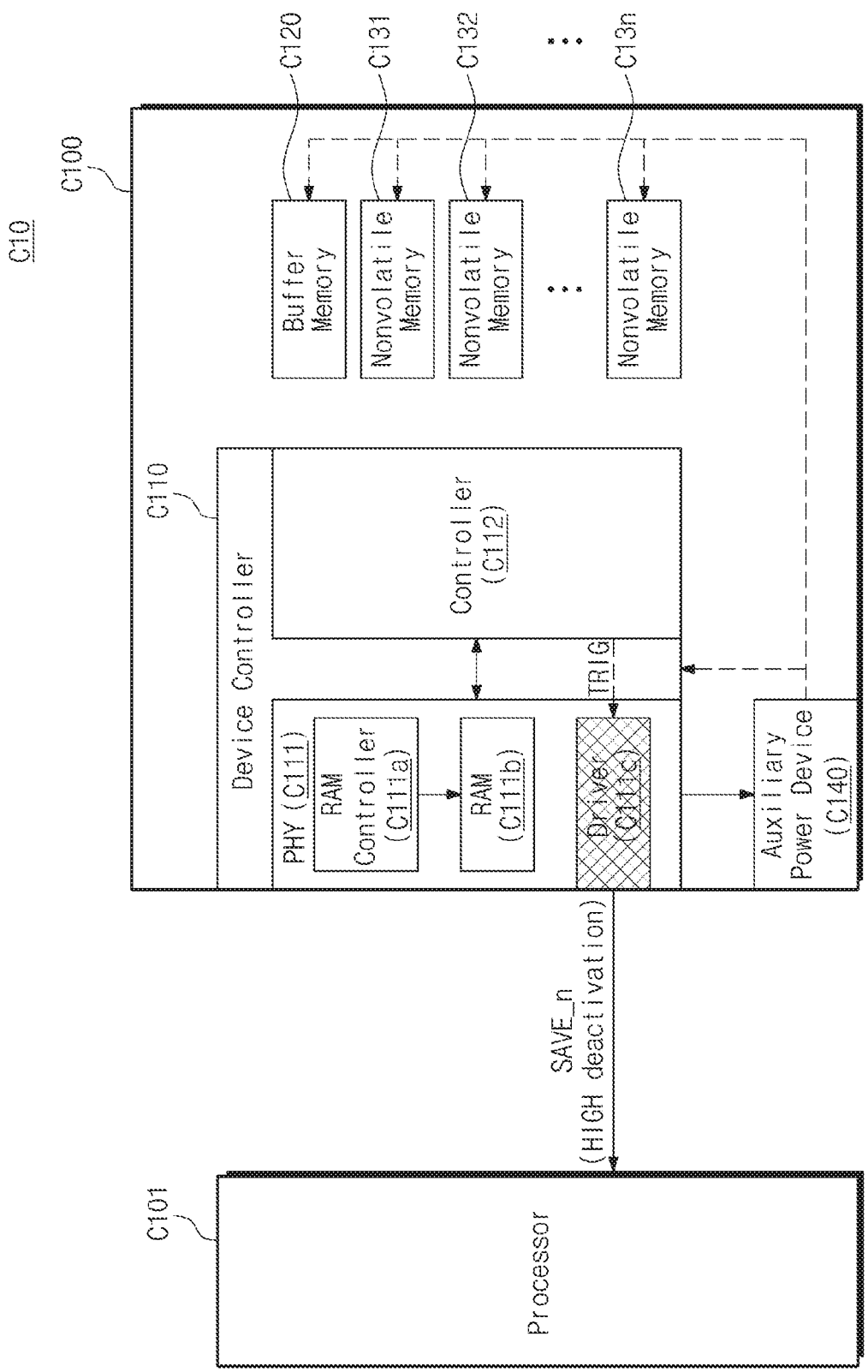

Referring to FIGS. 42 and 45, the nonvolatile memory system C100 may deactivate the save signal SAVE_n after completing the flush operation. For example, the controller C112 may provide a trigger signal TRIG to the save signal driver C111c after completing the flush operation. The save signal driver C111c may deactivate the save signal SAVE_n in response to the trigger signal TRIG. The deactivated save signal SAVE_n may be provided to the processor C101. The processor C101 may recognize completion of the flush operation of the nonvolatile memory system C100 through the deactivated save signal SAVE_n.

According to the above-described embodiment, the nonvolatile memory system C100 may perform a flush operation in response to the activated save signal SAVE_n. The nonvolatile memory system C100 may maintain an active state of the save signal SAVE_n while performing the flush operation. The nonvolatile memory system C100 may deactivate the save signal SAVE_n after completing the flush operation. The processor C101 may recognize completion of the flush operation of the nonvolatile memory system C100 through the deactivated save signal SAVE_n. This may mean that the performance and reliability of the nonvolatile memory system are improved.

Figure 46:
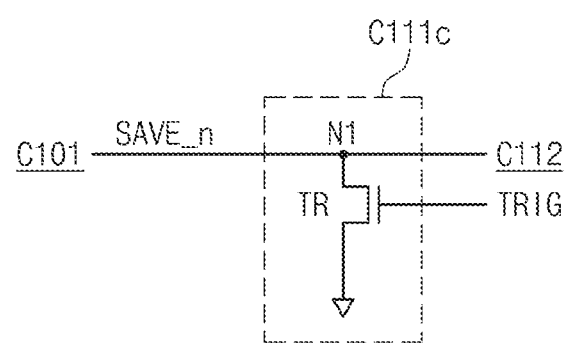
FIG. 46 is a circuit diagram schematically illustrating a save signal driver of FIG. 39 according to an embodiment of the inventive concept.
Figure 47:
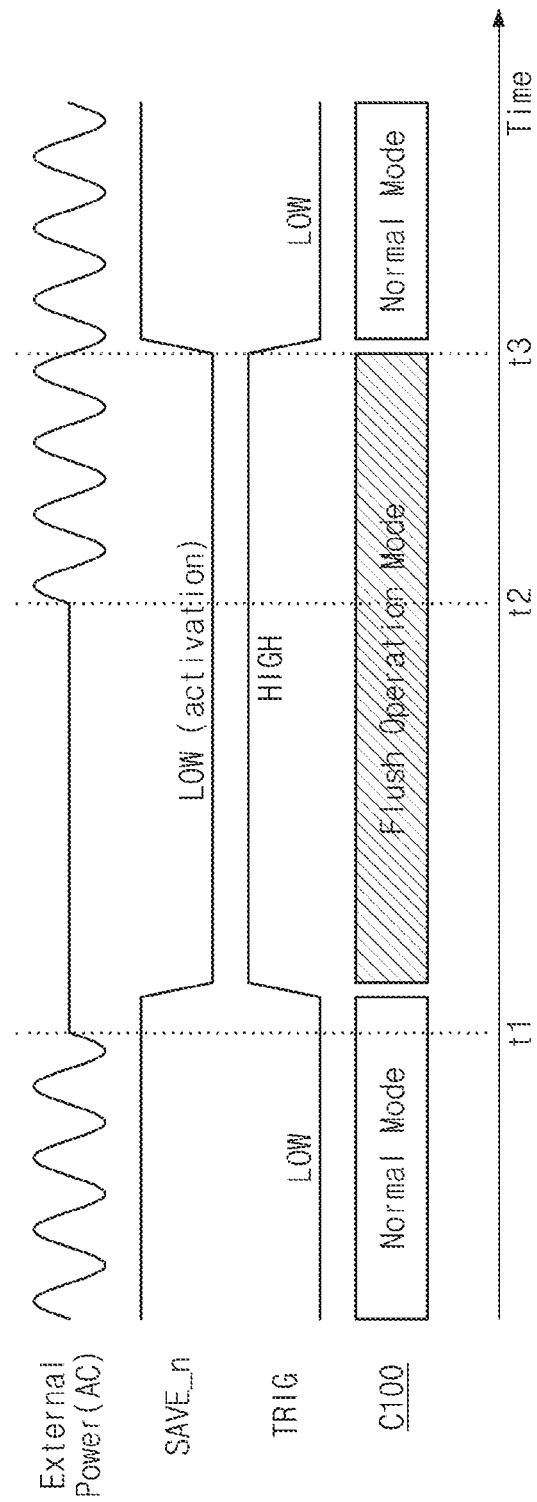
FIG. 47 is a timing diagram for describing an operation of a save signal driver of FIG. 46.

FIG. 46 is a circuit diagram schematically illustrating a save signal driver of FIG. 39 according to an embodiment of the inventive concept. FIG. 47 is a timing diagram for describing an operation of a save signal driver of FIG. 46.

For the descriptive convenience, components which are unnecessary at the time to describe the save signal driver C111c may be omitted.

Referring to FIGS. 39, 46, and 47, the save signal driver C111c may receive the save signal SAVE_n from the processor C101 through a first node N1. The save signal driver C111c may include a control transistor TR. One electrode of the control transistor TR may be connected with the first node N1, and the other electrode thereof may be grounded. The controller C112 may receive the save signal SAVE_n through the first node N1. A gate electrode of the control transistor TR may be connected to receive a trigger signal TRIG from the controller C112. An embodiment of the inventive concept is exemplified as the control transistor TR of FIG. 46 is an NMOS transistor, but the scope and spirit of the inventive concept may not be limited thereto. For example, the control transistor TR may be implemented with one of various switching elements such as a PMOS transistor, a BJT transistor, a thyristor, a SCR, a GTO, a MCT, an IGBT, a RCT, an NCT, an SSS, an SUS, an SBS, LAS, an SCS, an LASCS, and the like. For the descriptive convenience, it may be assumed that the control transistor TR is an NMOS transistor which is turned on in response to a trigger signal TRIG of logical high.

As illustrated in FIG. 47, an external power AC may be supplied to the processor C101. The processor C101 may perform various operations using the external power AC or may control the nonvolatile memory system C100. At t1, the external power AC may be suddenly blocked. In this case, the processor C101 may activate a save signal SAVE_n and may notify the nonvolatile memory system C1000 of the sudden power-off.

The nonvolatile memory system C100 may perform a flush operation in response to the activated save signal SAVE_n. At this time, the controller C112 of the nonvolatile memory system C100 may maintain the logical high of the trigger signal TRIG while performing the flush operation. The control transistor TR may be turned on in response to the trigger signal TRIG of the logical high. Logical low of the first node N1 may be maintained by the turned-on control transistor TR. That is, the save signal SAVE_n may maintain the logical low (i.e., an activation state) during the logical high of the trigger signal TRIG.

At t2, an external power AC may be normally supplied to the processor C101. In this case, the processor C101 may deactivate the save signal SAVE_n. However, as illustrated in FIG. FIG. 47, since the nonvolatile memory system C100 performs the flush operation at t2, the trigger signal TRIG may have logical high. The control transistor TR may be turned on according to the trigger signal TRIG of the logical high, and the save signal SAVE_n may maintain logical low (i.e., the activation state) through the turned-on control transistor TR.

At t3, the nonvolatile memory system C100 may complete the flush operation. After the flush operation is completed, the controller C112 may change the trigger signal TRIG from the logical low to the logical high, and thus the control transistor TR may be turned off by the trigger signal TRIG of the logical low. This may mean that the save signal SAVE_n is changed to the logical high from the logical low.

The above-described signal levels or elements may be to describe, but limit, an embodiment of the inventive concept. For example, the activated save signal SAVE_n may have the logical high, and the trigger signal TRIG may have the logical low during the flush operation.

In example embodiments, the save signal driver C111c is described with reference to FIGS. 46 and 47, but the scope and spirit of the inventive concept may not be limited thereto. The save signal driver C111c may further include passive elements or active elements and may be variously implemented such that an active state of the save signal SAVE_n is maintained during the flush operation.

According to the above-described embodiment, the nonvolatile memory system C100 may perform the flush operation in response to the activated save signal SAVE_n. The nonvolatile memory system C100 may maintain the active state of the save signal SAVE_n while performing the flush operation. The nonvolatile memory system C100 may deactivate the save signal SAVE_n after completing the flush operation. The processor C101 may recognize that the nonvolatile memory system C100 completes the flush operation, through the deactivated save signal SAVE_n. This may mean that the performance and reliability of the nonvolatile memory system are improved.

Figure 48:
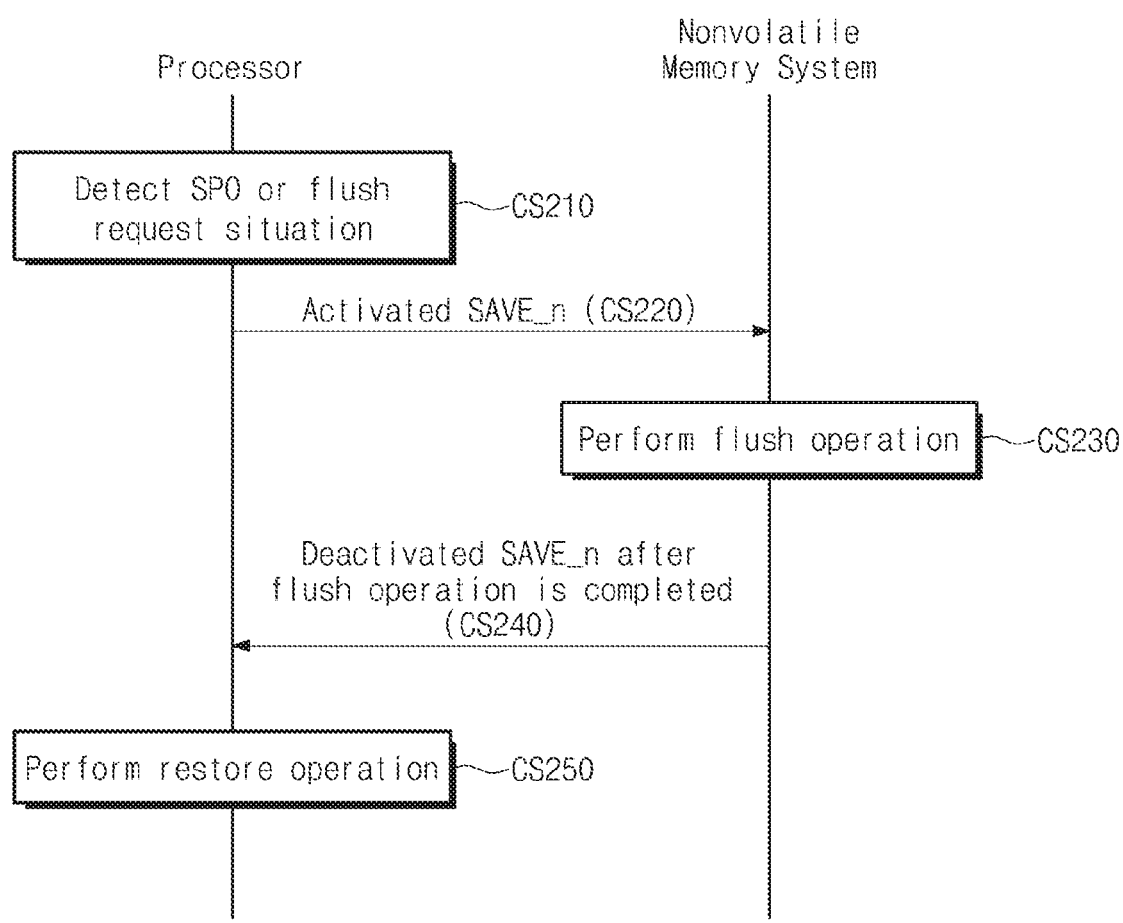
FIG. 48 is a flowchart illustrating an operation of a user system illustrated in FIG. 39.

FIG. 48 is a flowchart illustrating an operation of a user system illustrated in FIG. 39. Referring to FIGS. 39 and 48, in step CS210, the processor C101 may detect an SPO or flush request situation. The SPO situation may mean the situation when an external power is suddenly blocked. The flush request situation may include the following: the situation when the nonvolatile memory system C100 is removed or detached from the processor C101; the situation when an external power is unstable; the situation when an operation of the nonvolatile memory system C100 is unstable; and the situation when initialization of the nonvolatile memory system C100 is required.

In step CS220, the processor C101 may activate the save signal SAVE_n based on the detection result.

In step S230, the nonvolatile memory system C100 may perform a flush operation in response to the activated save signal SAVE_n. The flush operation is described with reference to FIG. 7, and a detailed description thereof is thus omitted. In example embodiments, the nonvolatile memory system C100 may maintain an active state of the save signal SAVE_n while performing an operation of step CS230.

After the flush operation is completed, in step CS240, the nonvolatile memory system C100 may deactivate the save signal SAVE_n.

In step CS250, the processor core C101 may perform an operation of restoring the nonvolatile memory system C100. For example, the processor C101 may recognize completion of the flush operation of the nonvolatile memory system C100 through the deactivated save signal SAVE_n. The external power may be recovered after the SPO situation. At this time, the processor C100 may control the nonvolatile memory system C100 such that data stored in the nonvolatile memory devices C131 to C13n is stored in the buffer memory C120 or the RAM C111b through the flush operation of the nonvolatile memory system C100. Alternatively, the processor C100 may reset the nonvolatile memory system C100 through a training operation. In example embodiments, an operation of the processor C101 described in step CS250 may be an example.

According to the above-described embodiment, the nonvolatile memory system C100 may perform the flush operation in response to the activated save signal SAVE_n and may deactivate the save signal SAVE_n after completing the flush operation. The processor C101 may recognize completion of the flush operation of the nonvolatile memory system C100 through the deactivated save signal SAVE_n. This may mean that the performance and reliability of the nonvolatile memory system are improved.

In example embodiments, a nonvolatile memory system and a processor described with reference to FIGS. 39 to 48 may be applied a nonvolatile memory system, a user system, or a server system described with reference to FIGS. 24 to 31.

According to the above-described embodiment, the nonvolatile memory system may perform a flush operation in response to an activated save signal. The nonvolatile memory system may maintain an active state of the save signal during the flush operation. The nonvolatile memory system may deactivate the save signal after completing the flush operation. The processor may recognize that the nonvolatile memory system completes the flush operation, through the deactivated save signal. This may mean that the performance and reliability of the nonvolatile memory system is improved.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A nonvolatile memory module comprising:
a nonvolatile memory device; and
a device controller configured to receive a random access memory (RAM) command, a RAM address, and a data signal including a storage command from an external device through a double data rate (DDR) interface, store the storage command in a command area of a RAM of the device controller in response to the RAM command and the RAM address, and control the nonvolatile memory device in response to the storage command stored in the RAM,
wherein the device controller comprises an error correction code (ECC) engine configured to detect an error of the storage command,
the device controller is further configured to transmit an alert signal to the external device, in response to detecting by the ECC engine the error of the storage command.

2. The nonvolatile memory module of claim 1, wherein the ECC engine is further configured to correct the error of the storage command based on an error correction code from the external device.

3. The nonvolatile memory module of claim 2, wherein when the error of the storage command is not detected by the ECC engine or the error of the storage command is correctable by the ECC engine, the device controller is further configured to perform a storage operation on the nonvolatile memory device corresponding to the storage command.

4. The nonvolatile memory module of claim 2, wherein the device controller further comprises a multi-purpose register,
wherein when the error of the storage command is detected by the ECC engine or the error of the storage command is uncorrectable by the ECC engine, the device controller is further configured to write information on the error in the multi-purpose register.

5. The nonvolatile memory module of claim 4, wherein after transmitting the alert signal, the device controller is further configured to transmit, under a control of the external device, the information on the error written in the multi-purpose register to the external device.

6. The nonvolatile memory module of claim 2, wherein after transmitting the alert signal, the device controller is further configured to transmit, under a control of the external device, information on the error to the external device through a serial bus.

7. The nonvolatile memory module of claim 1, wherein after transmitting the alert signal, the device controller is further configured to re-receive the RAM command, the RAM address, and the data signal including the storage command from the external device, and store the storage command in the RAM in response to the RAM command and the RAM address.

8. The nonvolatile memory module of claim 1, wherein the device controller is further configured to receive an additional RAM command, an additional RAM address, and an additional data signal including write data from the external device, and store the write data in the RAM in response to the additional RAM command and the additional RAM address.

9. The nonvolatile memory module of claim 8, wherein the ECC engine is further configured to detect or correct an error of the write data,
wherein when the error of the write data is detected by the ECC engine or the error of the write data is uncorrectable by the ECC engine, the device controller is further configured to transmit the alert signal to the external device.

10. The nonvolatile memory module of claim 9, wherein after transmitting the alert signal corresponding to the error of the write data, the device controller is further re-receive the additional RAM command, the additional RAM address, and the additional data signal including the write data from the external device, and store the write data in the RAM in response to the additional RAM command and the additional RAM address.

11. The nonvolatile memory module of claim 10, wherein the RAM command and the additional RAM command are a write command based on the DDR interface, and the RAM address is an address indicating the command area of the RAM, and the additional RAM address is an address indicating a write area of the RAM.

12. The nonvolatile memory module of claim 3, wherein when the storage command is a read command for reading data stored in the nonvolatile memory device, the device controller performs the storage operation on the nonvolatile memory device to read the data stored in the nonvolatile memory device, and transmit the read data to the external device.

13. The nonvolatile memory module of claim 3, wherein when the storage command is a write command for writing data in the nonvolatile memory device, the device controller performs the storage operation on the nonvolatile memory device to write the data in the nonvolatile memory device, and transmit, to the external device, a response indicating that the data is written in the nonvolatile memory device.

14. An operation method of a nonvolatile memory device, which comprises a nonvolatile memory device and a device controller controlling the nonvolatile device, the method comprising:
receiving a random access memory (RAM) command, a RAM address, and a data signal including a storage command from an external device through a double data rate (DDR) interface;
storing the storage command in a RAM of the device controller, in response to the RAM command and the RAM address;
performing an error detecting and correcting operation on an error of the storage command stored in the RAM; and
transmitting an alert signal to the external device according to a result of the error detecting and correcting operation,
wherein if the error of the storage command is not detected, the device controller performs a storage operation on the nonvolatile memory device corresponding to the storage command.

15. The operation method of claim 14, wherein when the error of the storage command is detected by the error detecting and correcting operation or the error of the storage command is uncorrectable by the error detecting and correcting operation, the alert signal is transmitted to the external device.

16. The operation method of claim 15, further comprising:
re-receiving the RAM command, the RAM address, and the data signal including the storage command from the external device, after transmitting the alert signal; and
re-storing the re-received storage command in the RAM in response to the re-received RAM command and the re-received RAM address.

17. The operation method of claim 15, further comprising:
storing, in a multi-purpose register of the device controller, information on the error of the storage command; and
transmitting, under a control of the external device, the information on the error of the storage command to the external device.

18. A nonvolatile memory module comprising:
a nonvolatile memory device;
a controller configured to control the nonvolatile memory device;
a random access memory (RAM) device; and
a RAM controller configured to receive a RAM command and a RAM address from an external device, and store, in a command area of the RAM, a storage command provided through a data signal from the external device,
wherein the controller is further configured to read the storage command from the RAM, and perform an error detecting and correcting operation on the storage command, and transmit an alert signal to the external device according to a result of the error detecting and correcting operation,
wherein when an error of the storage command is not detected by the error detecting and correcting operation or an error of the storage command is corrected by the error detecting and correcting operation, the controller performs a storage operation on the nonvolatile memory device cone sponding to the storage command.

19. The nonvolatile memory module of claim 18, wherein the controller comprises an error correction code (ECC) engine configure to perform the error detecting and correcting operation on the storage command.

20. The nonvolatile memory module of claim 19, wherein the ECC engine performs the error detecting and correcting operation based on an error code provided from the external device.

* * * * *